(12) United States Patent
Pyo

(10) Patent No.: US 12,072,738 B2
(45) Date of Patent: Aug. 27, 2024

(54) DISPLAY DEVICE

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 17/758,006

(22) PCT Filed: Dec. 27, 2019

(86) PCT No.: PCT/KR2019/018650
§ 371 (c)(1),
(2) Date: Jun. 24, 2022

(87) PCT Pub. No.: WO2021/132781
PCT Pub. Date: Jul. 1, 2021

(65) Prior Publication Data
US 2023/0140447 A1   May 4, 2023

(51) Int. Cl.
*G06F 1/16* (2006.01)
(52) U.S. Cl.
CPC .................................. *G06F 1/1652* (2013.01)
(58) Field of Classification Search
CPC .......... G06F 1/1652; F16H 25/20; F16H 1/04; G09F 9/301
See application file for complete search history.

(56) References Cited

U.S. PATENT DOCUMENTS

| 2006/0000955 | A1 | 1/2006 | Cvek | |
| 2011/0235173 | A1* | 9/2011 | Tsai Chen | G03B 21/56 |
| | | | | 359/461 |
| 2020/0035133 | A1* | 1/2020 | Pyo | F16M 13/02 |

FOREIGN PATENT DOCUMENTS

| KR | 1020070018556 | 2/2007 |
| KR | 1020120100881 | 9/2012 |
| KR | 1020170017157 | 2/2017 |
| KR | 1020180022309 | 3/2018 |

OTHER PUBLICATIONS

PCT International Application No. PCT/KR2019/018650, International Search Report dated Sep. 21, 2020, 3 pages.
European Patent Office Application Serial No. 19957277.7, Search Report dated Aug. 25, 2023, 9 pages.

* cited by examiner

*Primary Examiner* — Abhishek M Rathod
*Assistant Examiner* — Keon Kim
(74) *Attorney, Agent, or Firm* — LEE, HONG, DEGERMAN, KANG & WAIMEY

(57) ABSTRACT

A display device is disclosed. The display device of the present disclosure includes: a flexible display panel; a roller on which the display panel is rolled or unrolled; a housing having an opening through which the display panel passes, and providing an internal accommodation space, the roller rotatably mounted in the internal accommodation space; and a door assembly mounted in the internal accommodation space at a position adjacent to the opening of the housing, and opening and closing the opening.

14 Claims, 72 Drawing Sheets

DISPLAY DEVICE

CROSS-REFERENCE TO RELATED APPLICATION(S)

This application is the National Stage filing under 35 U.S.C. 371 of International Application No. PCT/KR2019/018650, filed on Dec. 27, 2019, the contents of which are all incorporated by reference herein in its entirety.

TECHNICAL FIELD

The following description relates to a display device.

BACKGROUND ART

With the development of the information society, there have been growing demands for various types of display devices, and in order to meet these demands, research has been conducted thereon and various display devices have been used recently, including a liquid crystal display (LCD), a plasma display panel (PDP), an electroluminescent display (ELD), a vacuum fluorescent display (VFD), and the like.

Among them, a display device using an organic light emitting diode (OLED) has excellent luminance and viewing angle characteristics in comparison with a liquid crystal display device, and requires no backlight unit, such that the OLED display device can be implemented as an ultrathin display device.

In addition, a flexible display panel may be bent or rolled on a roller. By using the flexible display panel, a display device rolled or unrolled on the roller may be implemented. Many studies are conducted on the structure of rolling or unrolling the flexible display on the roller.

Disclosure of Invention

Technical Problem

It is an object of the present disclosure to solve the above and other problems.

It is another object of the present disclosure to provide a display device having shafts for providing power for opening and closing a door of the display device.

It is yet another object of the present disclosure to provide a display device capable of reducing noise and vibration produced during driving of the door of the display device.

Solution to Problem

According to an aspect of the present disclosure in order to achieve the above objects, there is provided a display device including: a flexible display panel; a roller on which the display panel is rolled or unrolled; a housing having an opening through which the display panel passes, and providing an internal accommodation space, the roller rotatably mounted in the internal accommodation space; and a door assembly mounted in the internal accommodation space at a position adjacent to the opening of the housing, and opening and closing the opening, wherein the door assembly includes: a door for opening and closing the opening; a motor for providing power to the door; a first shaft gear disposed between the motor and the door, and transmitting the power, provided by the motor, to the door; a first shaft having a first end connected to the first shaft gear, and rotating together with the first shaft gear; a joint connected to a second end of the first shaft; a second shaft having a first end connected to the joint, and rotating together with the first shaft; and a second shaft gear connected to a second end of the second shaft, and transmitting power to the door.

Advantageous Effects of Invention

The display device according to the present disclosure has the following effects.

According to at least one of embodiments of the present disclosure, shafts for providing power for opening and closing a door of a display device may be provided.

According to at least one of embodiments of the present disclosure, noise and vibration produced during driving of the door of the display device may be reduced.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

MODE FOR THE INVENTION

Figure 1:
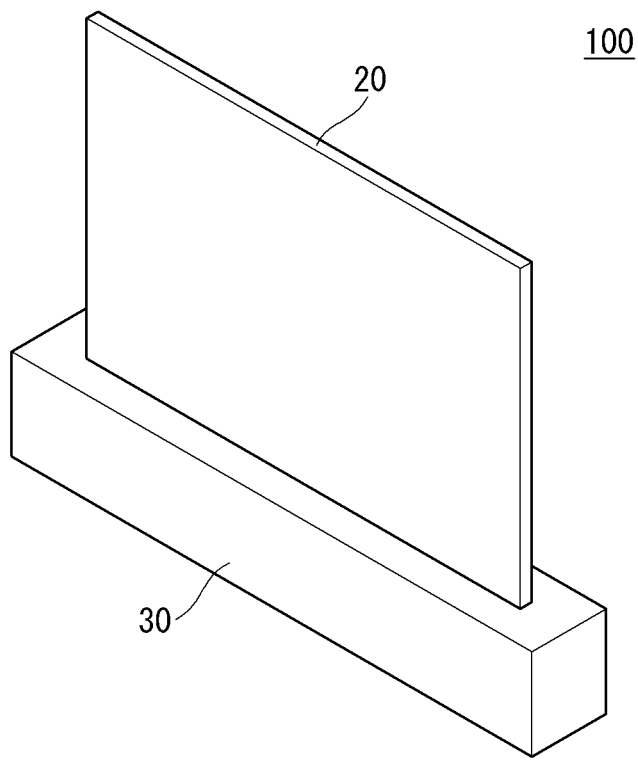
FIGS. 1 to 72 are diagrams illustrating examples of a display device according to embodiments of the present disclosure.
Figure 1:
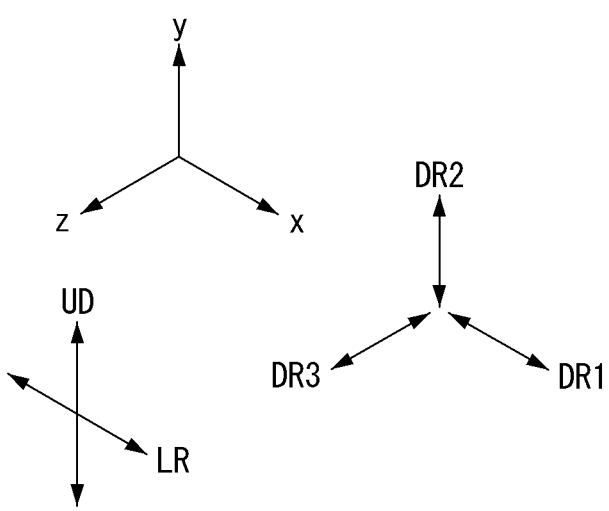

Hereinafter, embodiments of the present disclosure will be described in detail with reference to the accompanying drawings, in which the same or similar elements are designated by the same reference numerals, and a redundant description thereof will be omitted.

The terms "module" and "unit" for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings, and the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

In the following description, even if an embodiment is described with reference to a specific figure, if necessary, reference numeral not shown in the specific figure may be referred to, and reference numeral not shown in the specific figure is used when the reference numeral is shown in the other figures.

Referring to FIG. 1, a display device 100 may include a display unit 20 and a housing 30. The housing 30 may have an internal space. At least a portion of the display unit 20 may be located inside the housing 30. At least a portion of the display unit 20 may be located outside of the housing 30. The display unit 20 may display an image.

A direction parallel to a longitudinal direction of the housing 30 may be referred to as a first direction DR1, a positive x-axis direction, a negative x-axis direction, a left direction, or a right direction. A direction in which the display unit 20 displays an image may be referred to as a positive z-axis direction, a forward direction or the front. A direction opposite to the direction in which the display unit 20 displays the image may be referred to as a negative z-axis direction, a rearward direction or the rear. A third direction DR3 may be parallel to the positive z-axis direction or the negative z-axis direction. A direction parallel to a height direction of the display device 100 may be referred to as a second direction DR2, a positive y-axis direction, a negative y-axis direction, an upward direction, or a downward direction.

The third direction DR3 may be a direction perpendicular to the first direction DR1 and/or the second direction DR2. The first direction DR1 and the second direction DR2 may be collectively referred to as a horizontal direction. Also, the third direction DR3 may be referred to as a vertical direction. A left-right direction LR may be parallel to the first direction DR1, and an up-down direction UD may be parallel to the second direction DR2.

Figure 2:
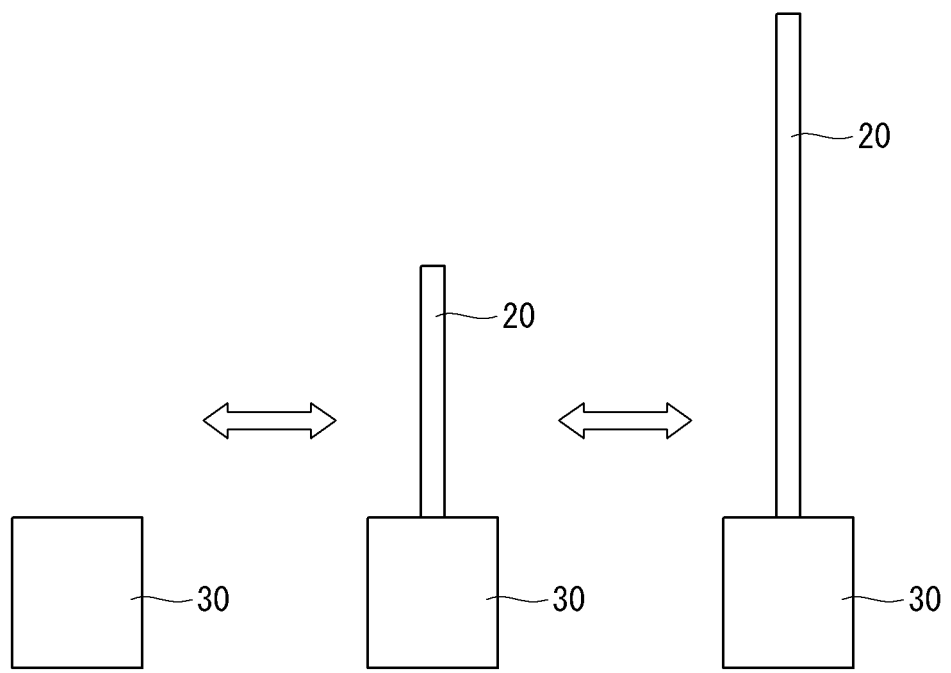

Referring to FIG. 2, the entire display unit 20 may be located inside the housing 30. At least a portion of the display unit 20 may be located outside of the housing 30. A degree of exposure of the display unit 20 to the outside of housing 30 may be adjusted as needed.

Figure 3:
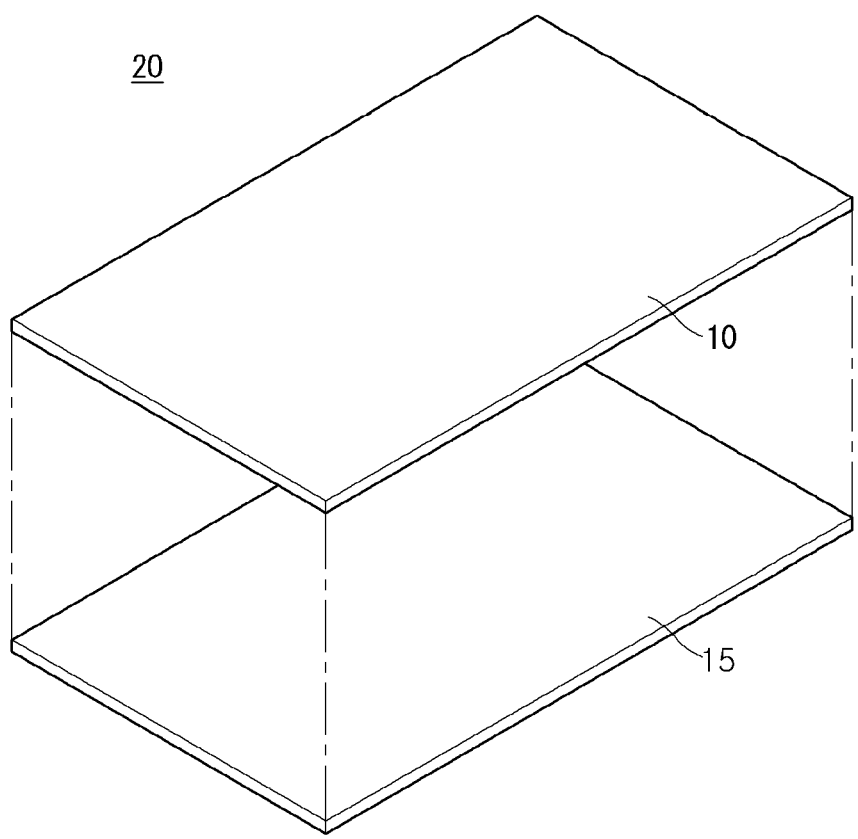

Referring to FIG. 3, the display unit 20 may include a display panel 10 and a plate 15. The display panel 10 may be flexible. For example, the display panel 10 may be an Organic Light Emitting Display (OLED).

The display panel 10 may have a front surface for displaying an image. The display panel 10 may have a rear surface disposed opposite the front surface. The front surface of the display panel 10 may be covered with a light-transmissive material. For example, the light-transmissive material may be a synthetic resin or plastic.

The plate 15 may be coupled, fastened, or attached to the rear surface of the display panel 10. The plate 15 may include a metal material. The plate 15 may be referred to as a module cover 15, a cover 15, a display panel cover 15, a panel cover 15, and an apron 15.

Figure 4:
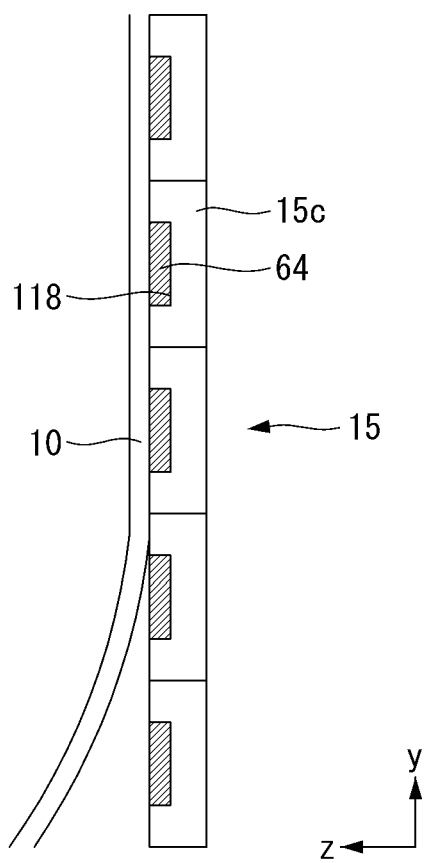

Referring to FIG. 4, the plate 15 may include a plurality of segments 15c. A magnet 64 may be disposed in a recess 118 of the segment 15c. The recess 118 may be formed in a surface facing the display panel 10 of the segment 15c. The recess 118 may be formed in a front surface of each segment 15c. The magnet 64 is received in the recess 118, such that the magnet 64 may be prevented from being exposed to the outside of the segment 15c. Even when being in contact with the segments 15c, the display panel 10 may be flat without being creased.

Figure 5:
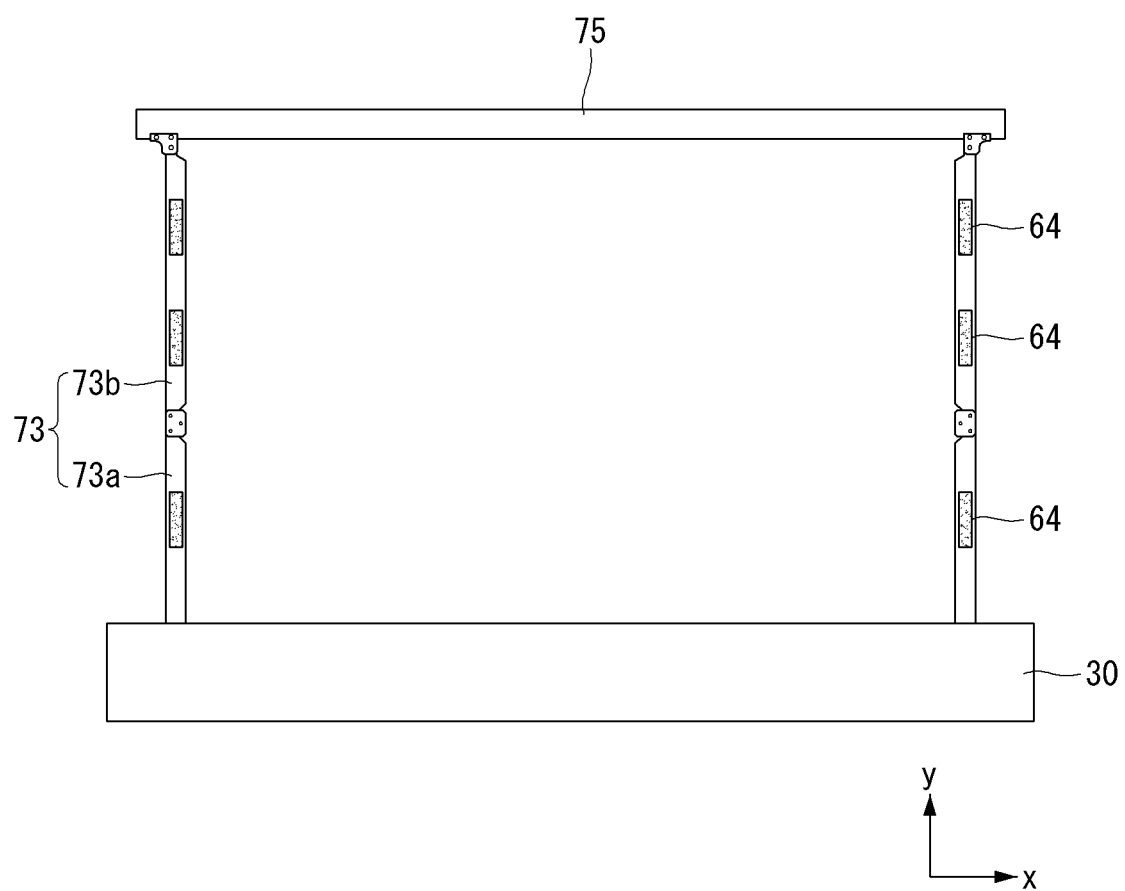

Referring to FIG. 5, a plurality of magnets 64 may be disposed on a link 73. For example, at least one magnet 64 may be disposed on a first arm 73a, and at least one magnet 64 may be disposed on a second arm 73b. The plurality of magnets 64 may be spaced apart from each other.

Figure 6:
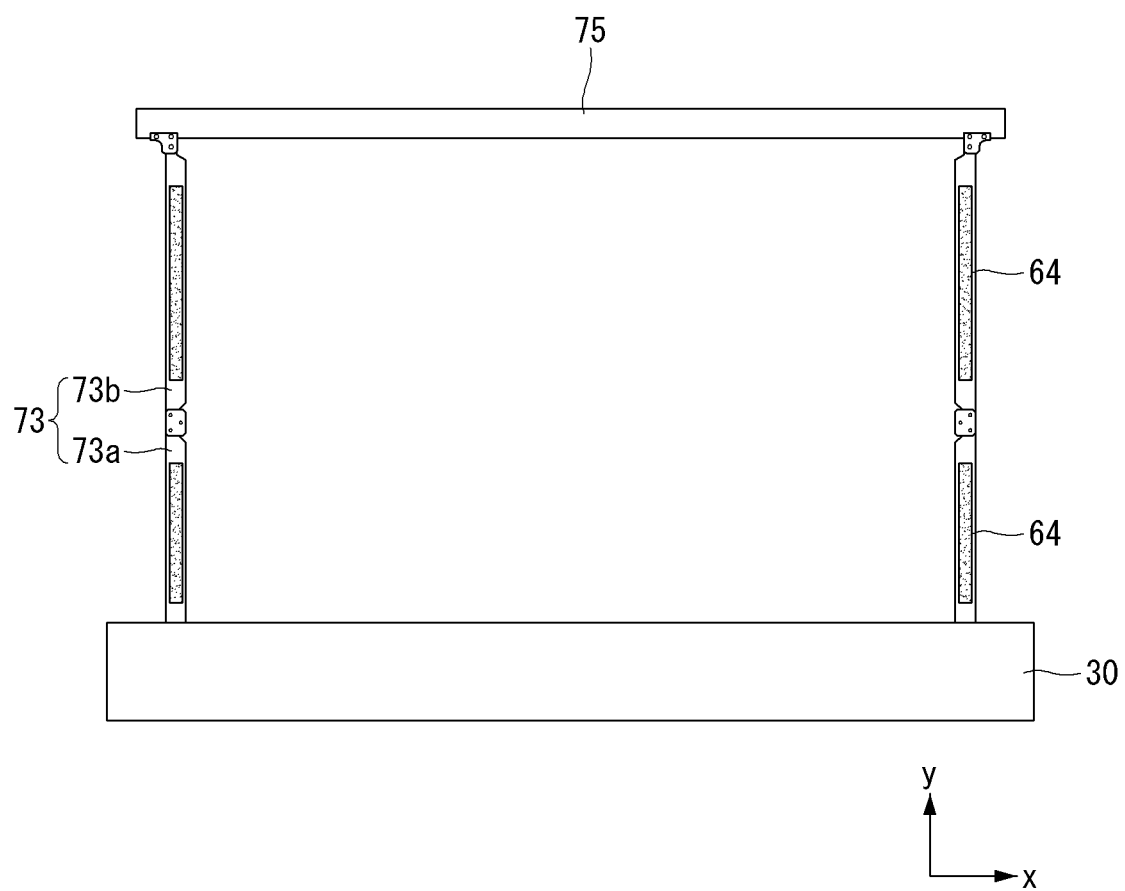

Referring to FIG. 6, one magnet 64 may be disposed on the first arm 73a and the second arm 73b, respectively. The magnet 64 may have a shape which is elongated toward a long side of the first arm 73a and the second arm 73b. As the magnet 64 has a shape which is elongated toward the long side of the first arm 73a and the second arm 73b, an area of a portion of the link 73 that comes into close contact with the display panel and the module cover may increase. Accordingly, adhesion force between the link 73, the display panel, and the module cover may be enhanced.

Figure 7:
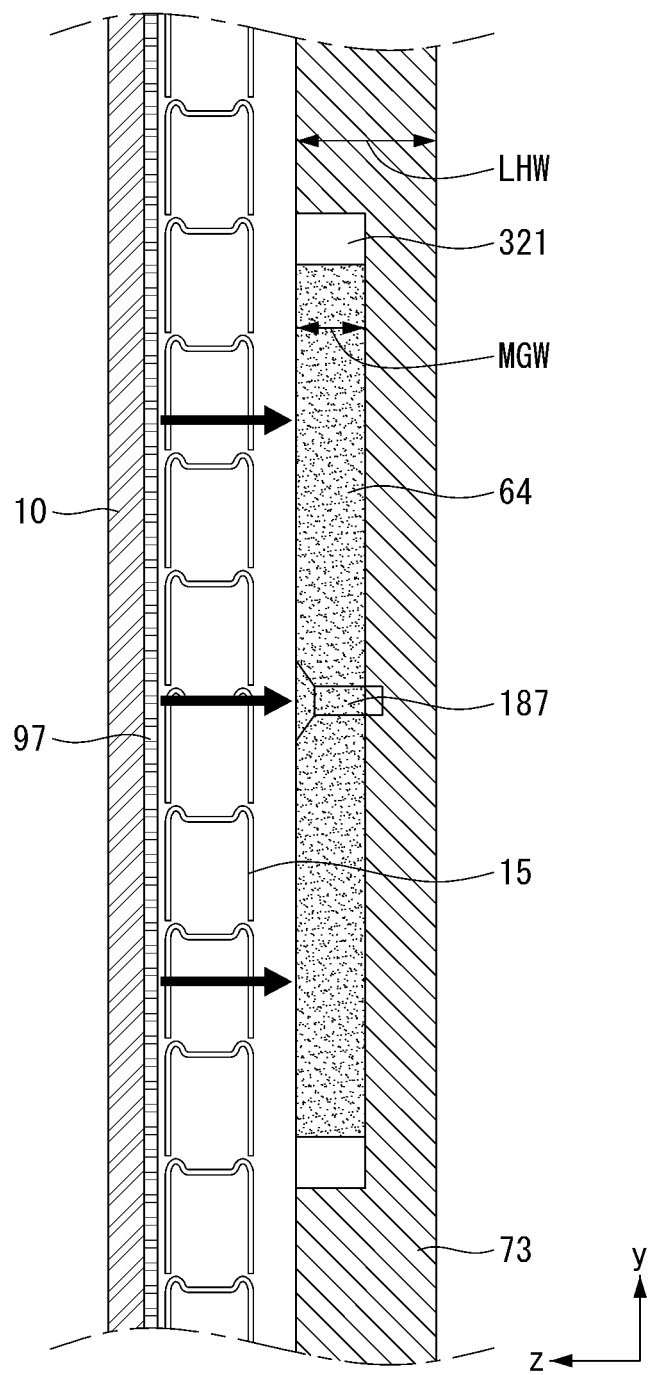

Referring to FIG. 7, the magnet 64 may be disposed in a recessed portion 321 formed in the link 73. The recessed portion 321 may have a shape which is recessed inwardly of the link 73. The magnet 64 may be coupled to the link 73 by at least one screw 187.

A width LHW of the recessed portion 321 which is recessed inwardly of the link 73 may be equal to or greater than a thickness MGW of the magnet 64. If the thickness MGW of the magnet 64 is greater than the width LHW of the recessed portion 321, the display panel 10 and the module cover 15 may not come into close contact with the link 73. In this case, the display panel 10 may be creased or may not be flat.

A panel protection part 97 may be disposed on a rear surface of the display panel 10. The panel protection part 97 may protect the display panel 10 from damage due to friction between the display panel 10 and the module cover 15. The panel protection part 97 may include a metal material. The panel protection part 97 may be ultra-thin. For example, the panel protection part 97 may have a thickness of about 0.1 mm.

As the panel protection part 97 includes a metal material, an attraction force may be generated between the panel protection part 97 and the magnet 64. Accordingly, even when the module cover 15, disposed between the panel protection part 97 and the link 73, does not include a metal material, the module cover 15 may come into close contact with the magnet 64.

Figure 8:
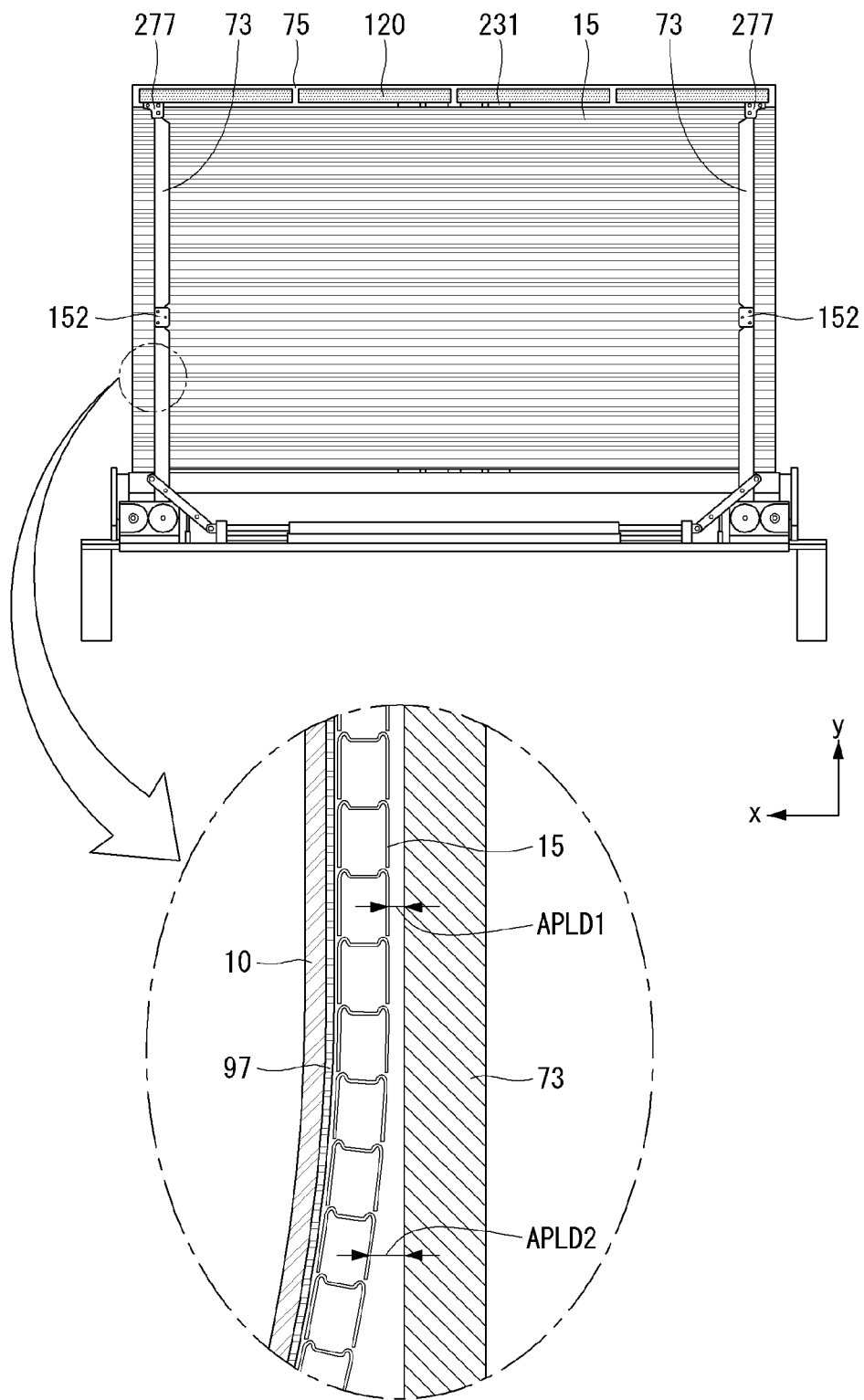

Referring to FIG. 8, the module cover 15 may come into close contact with the link 73 by an upper bar 75 disposed at an upper side, and a guide bar 234 (see FIG. 15) disposed at a lower side. In the link 73, a portion between the upper bar 75 and the guide bar 234 may not come into close contact with the module cover 15. Alternatively, a center portion of the link 73 may not come into close contact with the module cover 15. The center portion of the link 73 may be in the vicinity of an arm joint 152. In this case, distances APRD1 and APRD2 between the module cover 15 and the link 73 may not be kept constant. In this case, the display panel 10 may be curved or bent.

Figure 9:
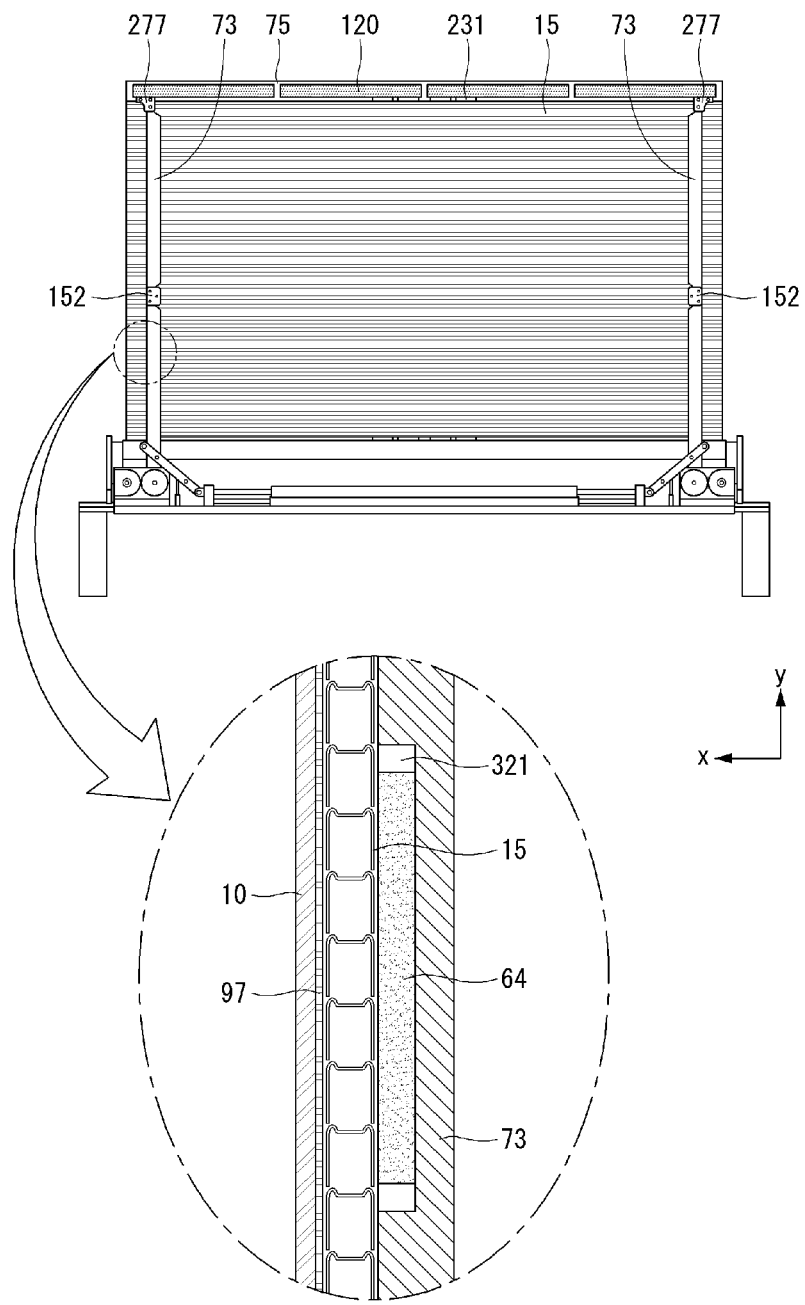

Referring to FIG. 9, in the case where the magnet 64 is disposed in the recessed portion 321 of the link 73, the magnet 64 attracts the panel protection part 97, such that the module cover 15 may also come into close contact with the magnet 64. That is, the center portion of the link 73 may come into close contact with the module cover 15.

Figure 10:
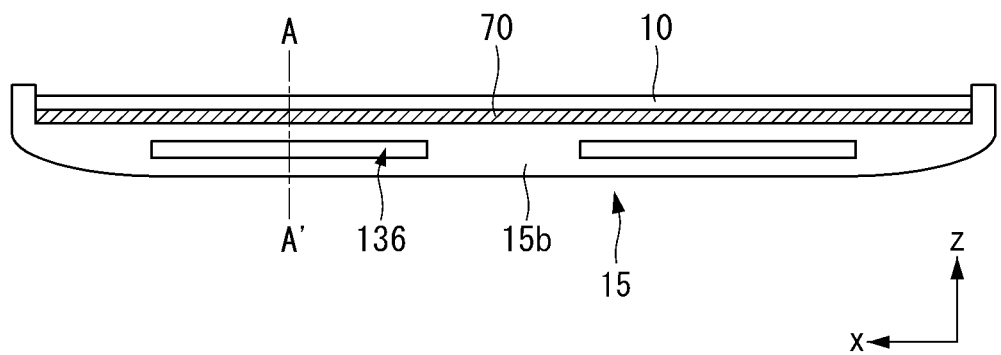
Figure 10:
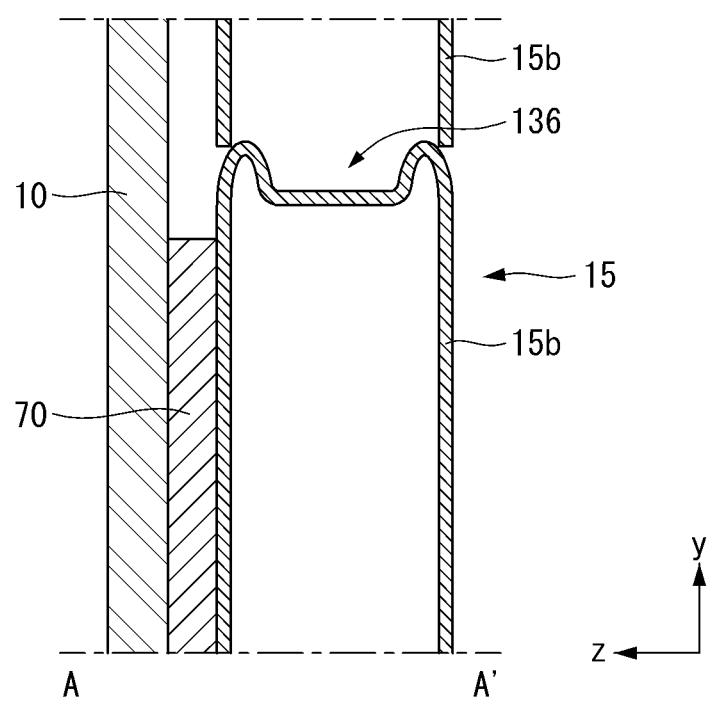

Referring to FIG. 10, a bead 136 may be formed on an upper surface of a segment 15b. The bead 136 may have a shape which is recessed inwardly of the segment 15b. The bead 136 may have a shape which is recessed in the negative y-axis direction. For example, the bead 136 may be formed by pressing the segment 15b. A plurality of beads 136 may be formed on the segment 15b. The plurality of beads 136 may be spaced apart from each other. The bead 136 may improve rigidity of the segment 15b. The bead 136 may prevent the segment 15b from being deformed due to external impact. The segment 15b may be fixed to a rear side of the display panel 10 by an adhesive member 70. The panel protection part 97 (see FIG. 8) may be disposed between the adhesive member 70 and the display panel 10. For example, the adhesive member 70 may be a double-sided tape.

Figure 11:
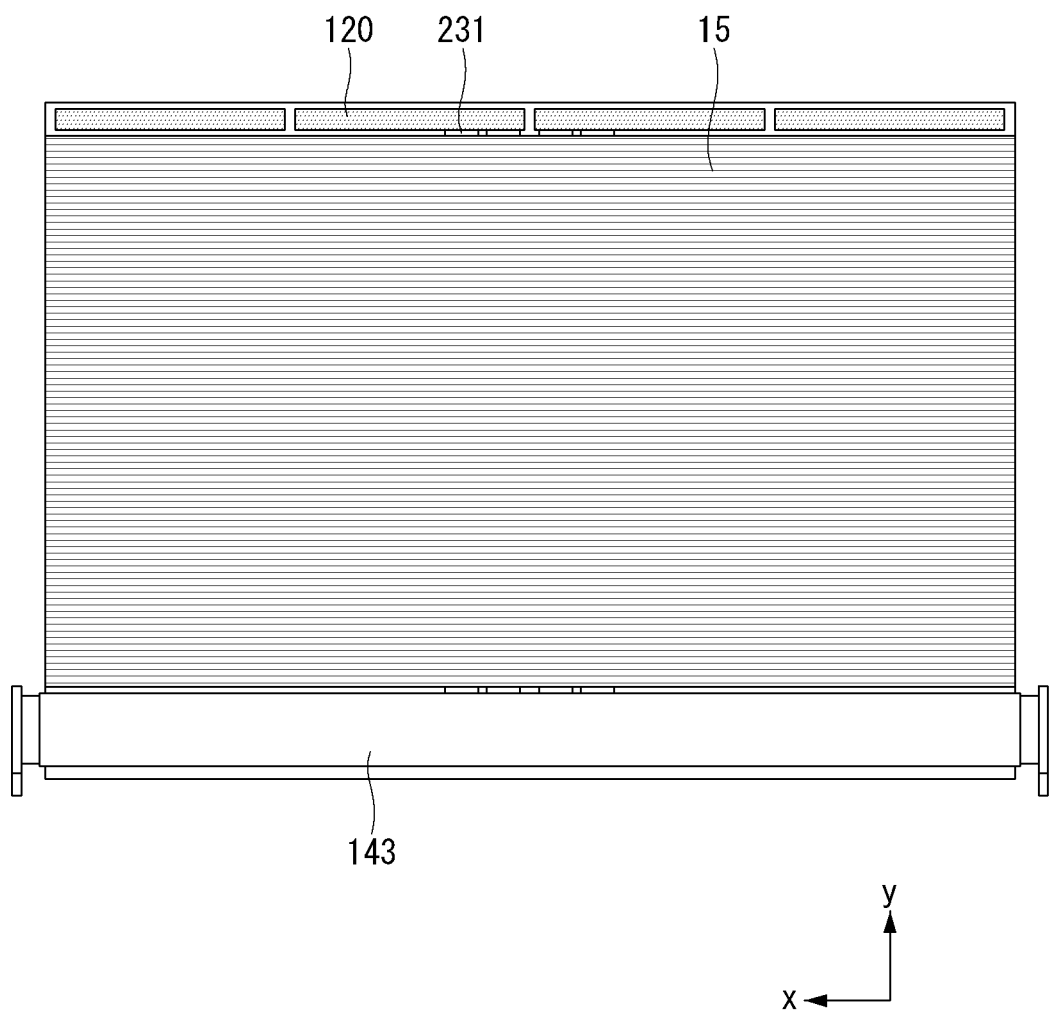

Referring to FIG. 11, a source PCB 120 may be disposed over the module cover 15. During rolling up or rolling down, the source PCB 120 may be changed in position in accordance with the movement of the module cover 15. An FFC cable 231 may be disposed at the center of the module cover 15 in the first direction. The FFC cable 231 may also be disposed at both ends of the module cover 15 in the first direction.

Figure 12:
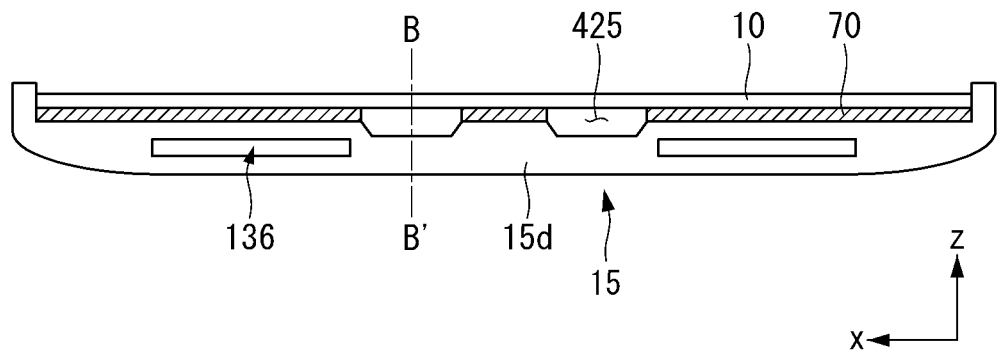
Figure 12:
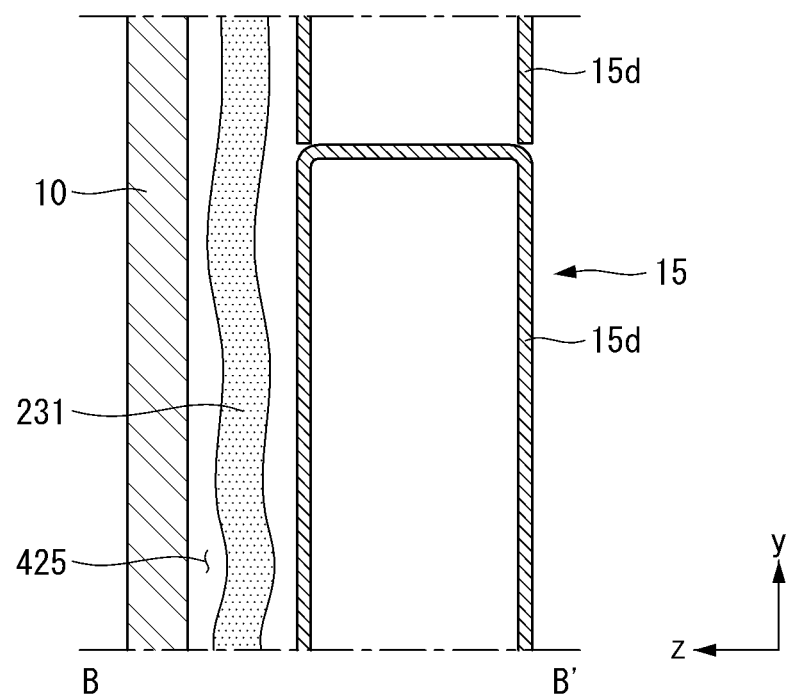

Referring to FIG. 12, a segment 15d may include a recessed portion 425 which is recessed in the negative z-axis direction. The recessed portion 425 may form a space between the display panel 10 and the module cover 15. The FFC cable 231 may be accommodated in the space formed by the recessed portion 425. In addition, the recessed portion 425 may improve rigidity of the segment 15d.

The bead 136 may be disposed on the segment 15d, except for a portion where the recessed portion 425 is formed. At the portion where the recessed portion 425 is formed, the thickness of the segment 15d decreases in the third direction, such that the bead 136 may not be disposed at the portion.

Figure 13:
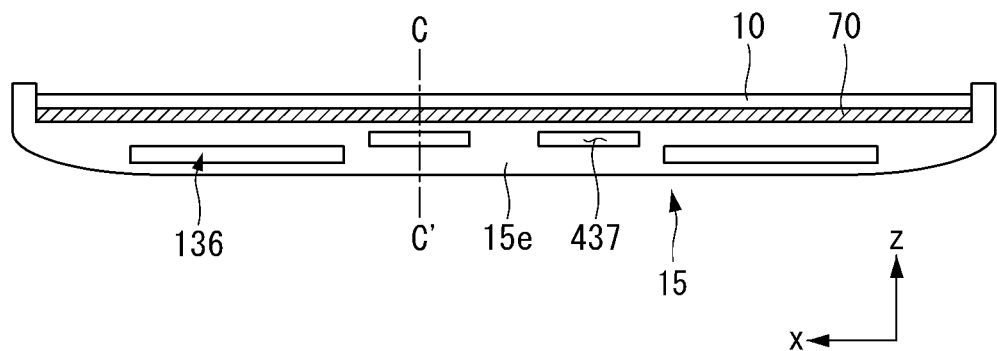
Figure 13:
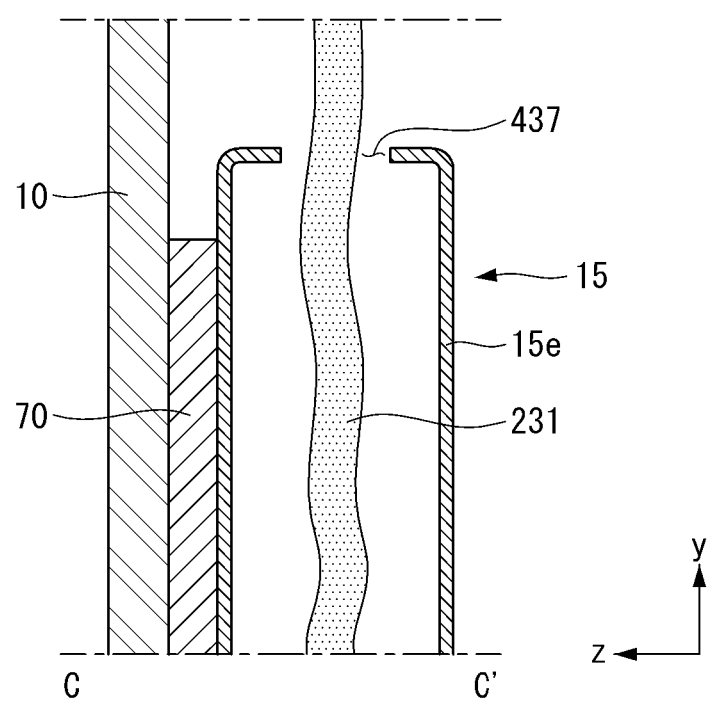

Referring to FIG. 13, a segment 15e may have a pass-through portion 437 formed at the center thereof in the first direction. The pass-through portion 437 may pass through the center of the segment 15e in the second direction. That is, the pass-through portion 437 may be a hole formed in the segment 15e. The pass-through portion 437 may be a portion where the FFC cable 231 is disposed. The pass-through portion 43 is formed in the segment 15e, such that a thickness of the segment 15e may be reduced, compared to the case where the FFC cable 231 is disposed in the recessed portion 425.

The bead 136 may be disposed on the segment 15e, except for a portion where the pass-through portion 437 is disposed. At the portion where the pass-through portion 437 is disposed, the thickness of the segment 15e decreases in the third direction, such that the bead 136 may not be disposed at the portion.

Figure 14:
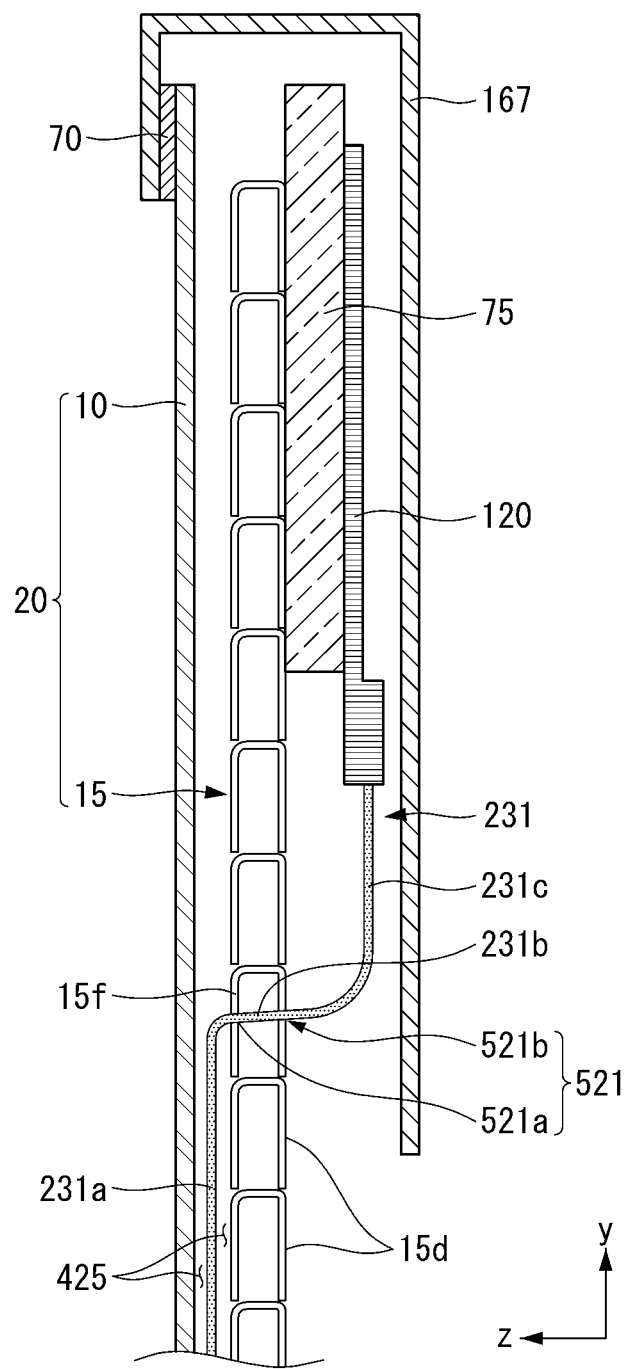

Referring to FIG. 14, a top case 167 may cover the source PCB 120 and the upper bar 75, in addition to the display panel 10 and the module cover 15. The upper bar 75 has one surface coupled to a rear surface of the module cover 15, and the other surface coupled to the source PCB 120. The upper bar 75 may be fixed to the module cover 15 to support the source PCB 120.

Figure 15:
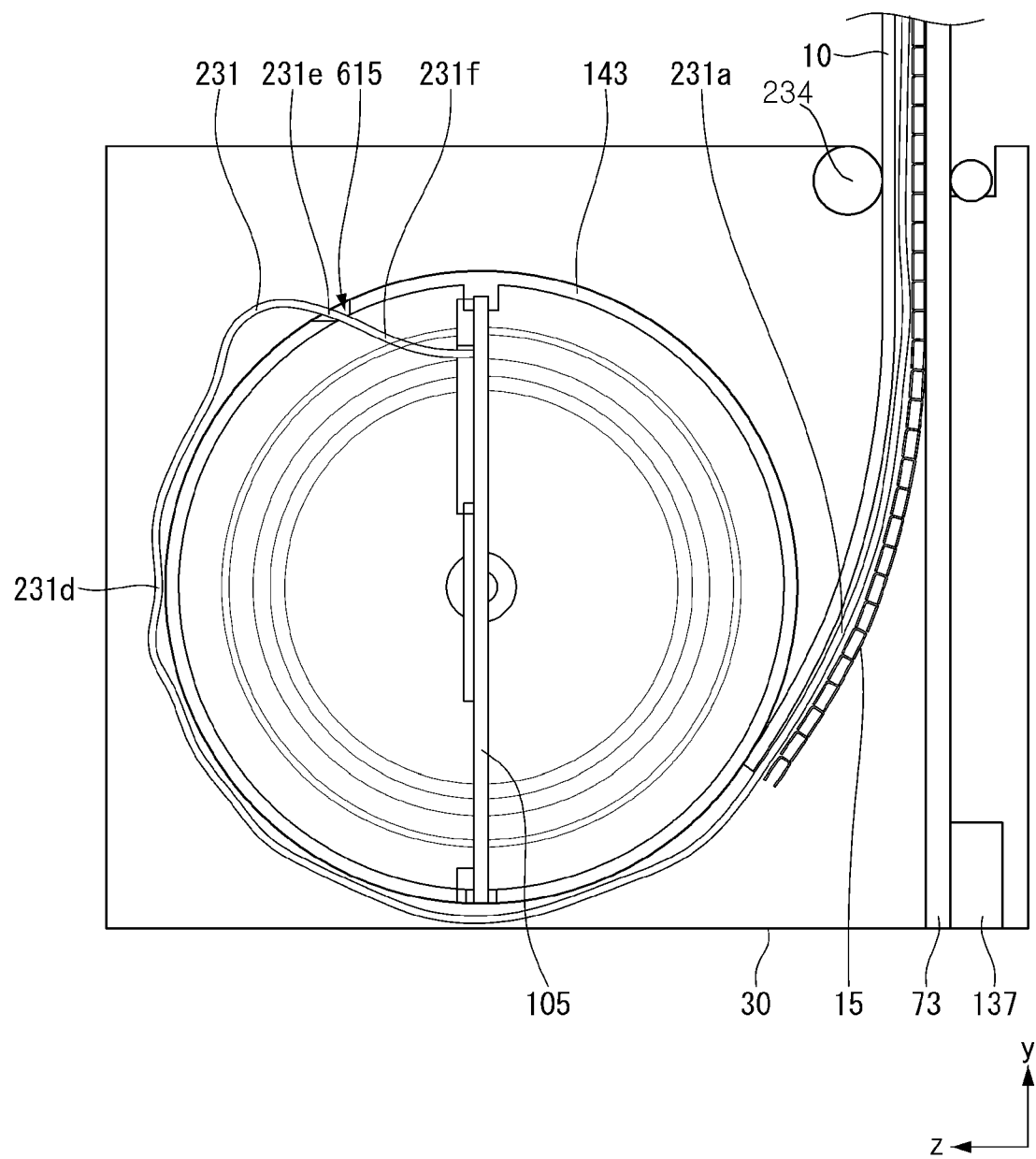

A lower end of the FFC cable 231 may be connected to a timing controller board 105 (see FIG. 15) in a panel roller 143 (see FIG. 15). The FFC cable 231 may be wound around or unwound from the panel roller 143 along with the display unit 20.

A portion of the FFC cable 231 may be disposed between the display panel 110 and the module cover 15. The portion of the FFC cable 231, which is disposed between the display panel 110 and the module cover 15, may be referred to as a first portion 231a. The first portion 231a may be disposed in the recessed portion 425 of the segment 15d. Alternatively, the first portion 231a may be received in the recessed portion 425 of the plurality of segments 15d.

A portion of the FFC cable 231 may pass through a segment 15f. The portion of the FFC cable 231, which passes through the segment 15f, may be referred to as a second portion 231b. The segment 15f may include a first hole 521a formed in a front surface, and a second hole 521b formed in a rear surface. The first hole 521a and the second hole 521b may be connected to each other to form one hole 521. The hole 521 may pass through the segment 15f in the third direction. The second portion 231b may pass through the hole 521. The hole 521 may be referred to as a connection hole 521.

An upper end of the FFC cable 231 may be electrically connected to the source PCB 120. A portion of the FFC cable 231 may be disposed on the rear surface of the module cover 15. The portion of the FFC cable 231, which is disposed on the rear surface of the module cover 15, may be referred to as a third portion 231c. The third portion 231c may be electrically connected to the source PCB 120.

The third portion 231c may be covered by the top case 167. Accordingly, the third cover 231c may be prevented from being exposed to the outside.

Referring to FIG. 15, the FFC cable 231 may be connected to the timing controller board 105 mounted in the panel roller 143. A through-hole 615 may be formed in the panel roller 143, and the FFC cable 231 may pass through the through-hole 615 to be connected to the timing controller board 105.

The through-hole 615, formed at a first side of the panel roller 143, may pass through an outer circumference of the panel roller 143. The FFC cable 231 may pass through the through-hole 615 to be connected to a first side of the timing controller board 105.

Even when the FFC cable 231 is disposed on the outer circumference of the panel roller 143, the through-hole 615 may allow the FFC cable 231 to remain connected to the timing controller board 105. Accordingly, the FFC cable 231 may be rotated together with the panel roller 143 without being twisted.

A portion of the FFC cable 231 may be wound around the panel roller 143. The portion of the FFC cable 231, which is wound around the panel roller 143, may be referred to as a fourth portion 231d. The fourth portion 231d may come into contact with an outer circumferential surface of the panel roller 143.

A portion of the FFC cable 231 may pass through the through-hole 615. The portion of the FFC cable 231, which passes through the through-hole 615, may be referred to as a fifth portion 231e.

A lower end of the FFC cable 231 may be electrically connected to the timing controller board 105. A portion of the FFC cable 231 may be disposed inside the panel roller 143. The portion of the FFC cable 231, which is disposed inside the panel roller 143, may be referred to as a sixth portion 231f. The sixth portion 231f may be electrically connected to the timing controller board 105.

Figure 16:
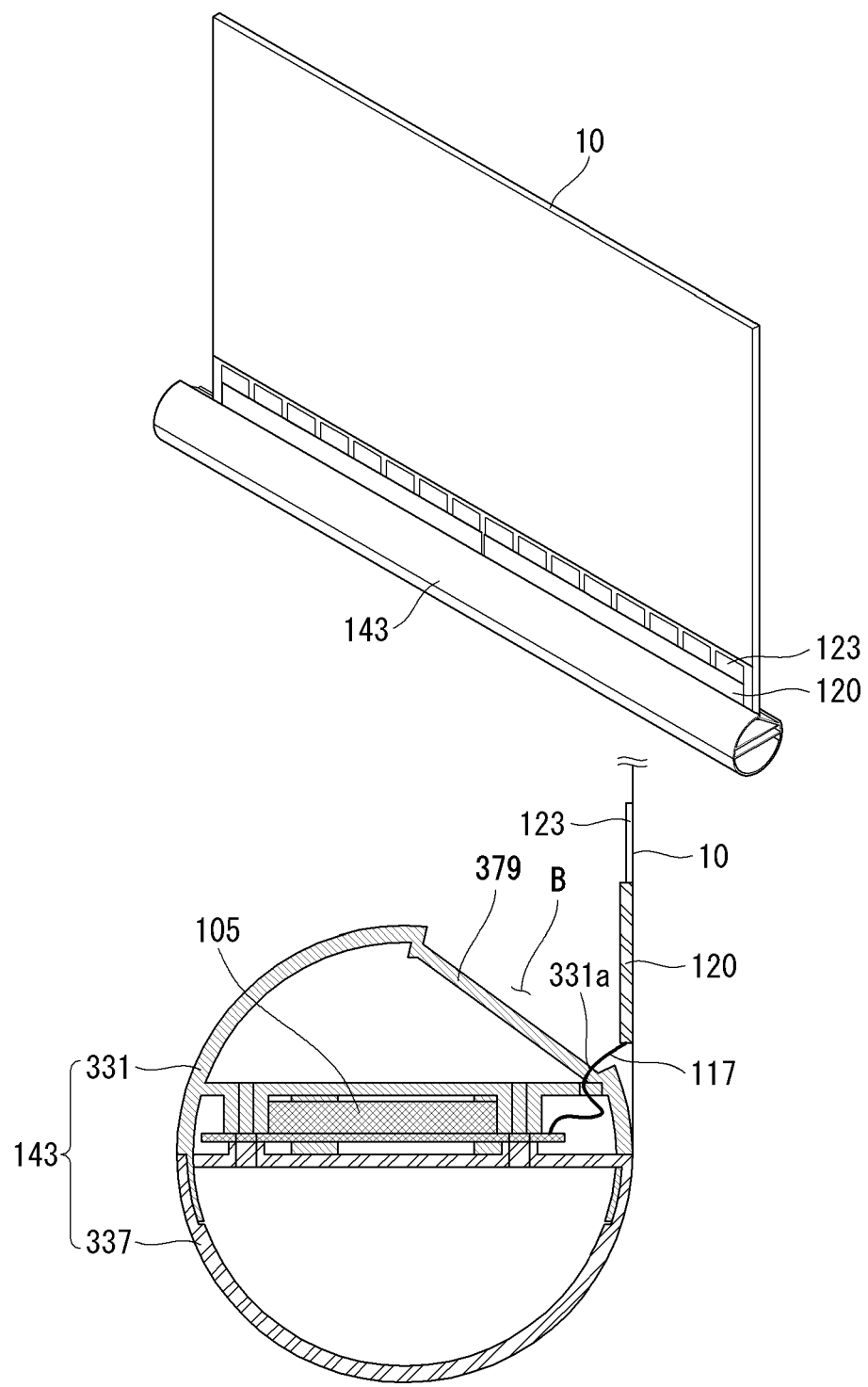

Referring to FIG. 16, a lower end of the display panel 10 may be connected to the roller 143. The display panel 10 may be rolled on or unrolled from the roller 143. A front surface of the display panel 10 may be coupled to the plurality of source PCBs 120. The plurality of source PCBs 120 may be spaced apart from each other.

A source chip-on film (COF) 123 may connect the display panel 10 and the source PCBs 120. The source COF 123 may be located on the front surface of the display panel 10. The roller 143 may include a first part 331 and a second part 337.

The first part 331 and the second part 337 may be fastened by a screw. The timing controller board 105 may be mounted in the roller 143.

The source PCBs 120 may be electrically connected to the timing controller board 105. The timing controller board 105 may transmit digital video data and a timing control signal to the source PCBs 120.

A cable 117 may electrically connect the source PCBs 120 and the timing controller board 105. For example, the cable 117 may be a flexible flat cable (FFC). The cable 117 may pass through a hole 331a. The hole 331a may be formed in a seating part 379 or the first part 331. The cable 117 may be disposed between the display panel 10 and the second part 337.

The seating part 379 may be formed on an outer circumference of the first part 331. The seating part 379 may be formed on a stepped portion of the outer circumference of the first part 331. The seating part 379 may form a space B. When the display unit 20 is rolled on the roller 143, the source PCBs 120 may be accommodated in the seating part 379. As the source PCBs 120 are accommodated in the seating part 379, the source PCBs 120 may not be twisted or bent, and durability may be improved.

The cable 117 may electrically connect the timing controller board 105 and the source PCBs 120.

Figure 17:
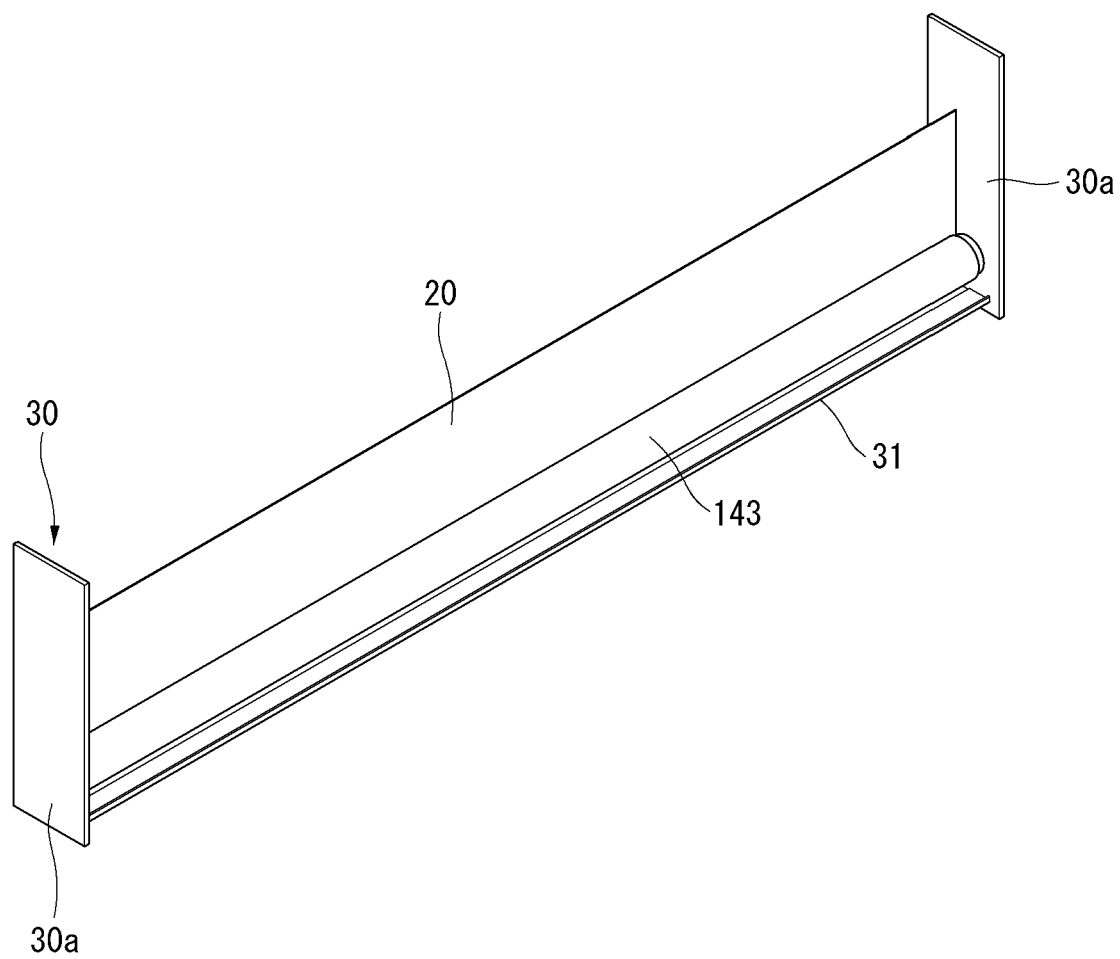

Referring to FIG. 17, the roller 143, around which the display unit 20 is rolled, may be mounted on the first base 31. The first base 31 may be a base of the housing 30. The roller 143 may be elongated in the longitudinal direction of the housing 30. The first base 31 may be connected to a side surface 30a of the housing 30.

Figure 18:
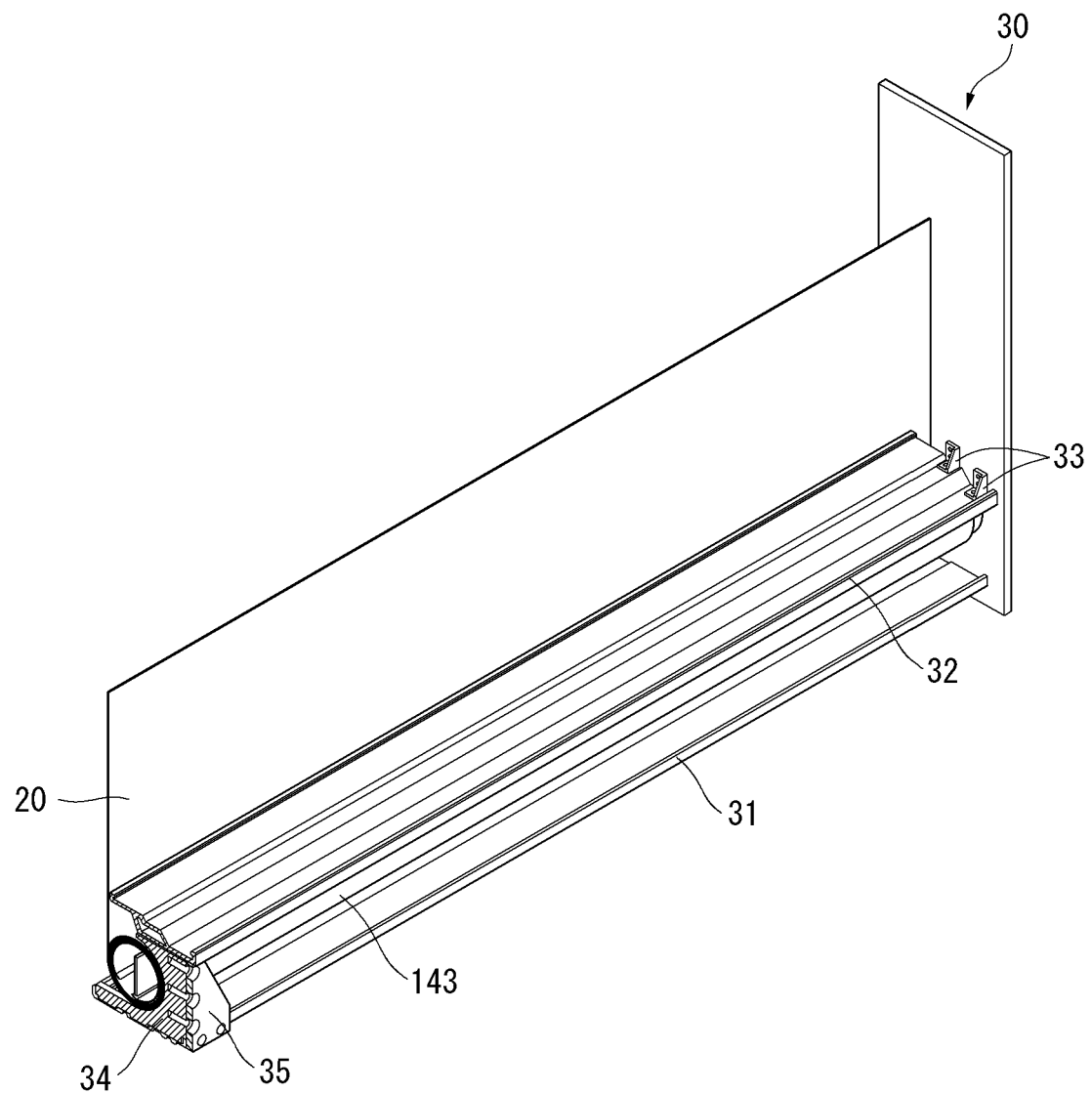
Figure 19:
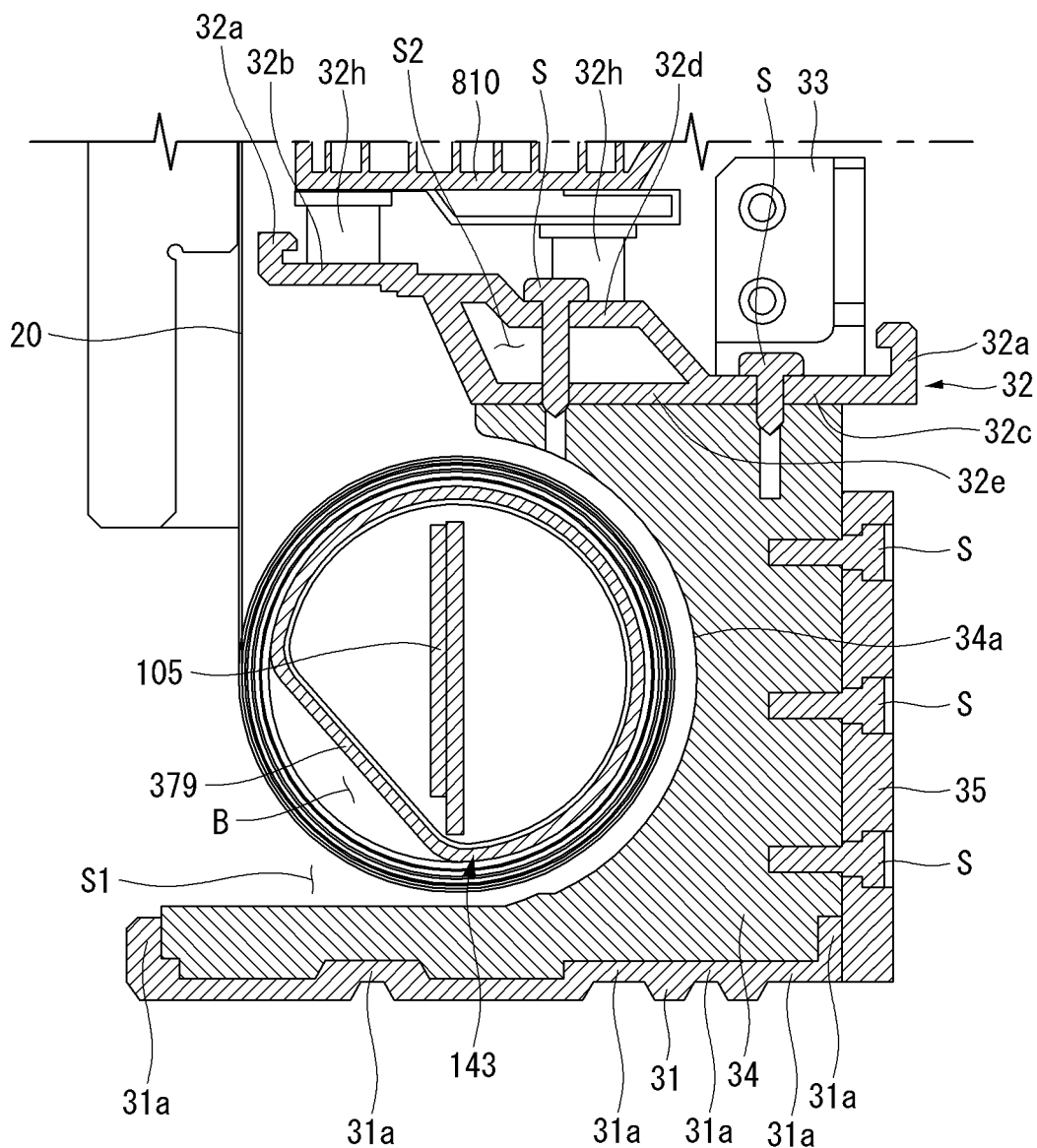

Referring to FIGS. 18 and 19, beams 31a may be formed at the first base 31. The beams 31a may improve bending or torsional rigidity of the first base 31. Many components may be mounted on the first base 31, such that the first base 31 may be under a heavy load. As the rigidity of the first base 31 is improved, sagging of the first base 31 due to the load may be prevented. For example, the beams 31a may be formed by a press process.

A second base 32 may be spaced upwardly from the first base 31. A space 51 may be formed between the first base 31 and the second base 32. The roller 143, around which the display unit 20 is rolled, may be accommodated in the space 51. The roller 143 may be disposed between the first base 31 and the second base 32.

The second base 32 may be connected to the side surface 30a of the housing 30. A bracket 33 may be fastened to an upper surface of the first base 31. The bracket 33 may be fastened to the side surface 30a of the housing 30.

Beams 32a may be formed at the second base 32. The beams 32a may improve bending or torsional rigidity of the second base 32. The beams 32a may be formed by a press process.

A third part 32d may be connected to the first part 32b and the second part 32c. A fourth part 32e may be connected to the first part 32b and the second part 32c. A space S2 may be formed between the third part 32d and the fourth part 32e. Accordingly, bending or torsional rigidity of the second base 32 may be improved. The third part 32d may be referred to as a reinforcing rib 32d or a rib 32d. The fourth part 32e may be referred to as a reinforcing rib 32e or a rib 32e.

Many components may be mounted on the second base 32, such that the second base 32 may be under a heavy load. As the rigidity of the second base 32 is improved, sagging of the second base 32 due to the load may be prevented.

A first reinforcing plate 34 may be disposed between the first base 31 and the second base 32. The first reinforcing plate 34 and the second base 32 may be fastened by a screw. The first reinforcing plate 34 may support the second base 32. The first reinforcing plate 34 may prevent sagging of the second base 32. The first reinforcing plate 34 may be disposed at a center portion of the first base 31 or at a center portion of the second base 32. The first reinforcing plate 34 may have a curved portion 34a. The curved portion 34a may be formed along the roller 143. The curved portion 34a may not come into contact with the roller 143 or the display unit 20 rolled on the roller 143. The curved portion 34 may be maintained at a predetermined distance from the roller 143, so as not to interrupt rotation of the roller 143.

A second reinforcing plate 35 may be fastened to the first base 31 and the first reinforcing plate 34. The second reinforcing plate 35 may support the first reinforcing plate 34. The second reinforcing plate 35 may be disposed at the rear of the first reinforcing plate 34. The second reinforcing plate 35 may be disposed at the rear of the first base 31. The second reinforcing plate 35 may be disposed perpendicular to the first base 31. The second reinforcing plate 35 may be fastened to the beams 31a of the first base 31. The second base 32 may face the front surface or the rear surface of the housing 30.

Figure 20:
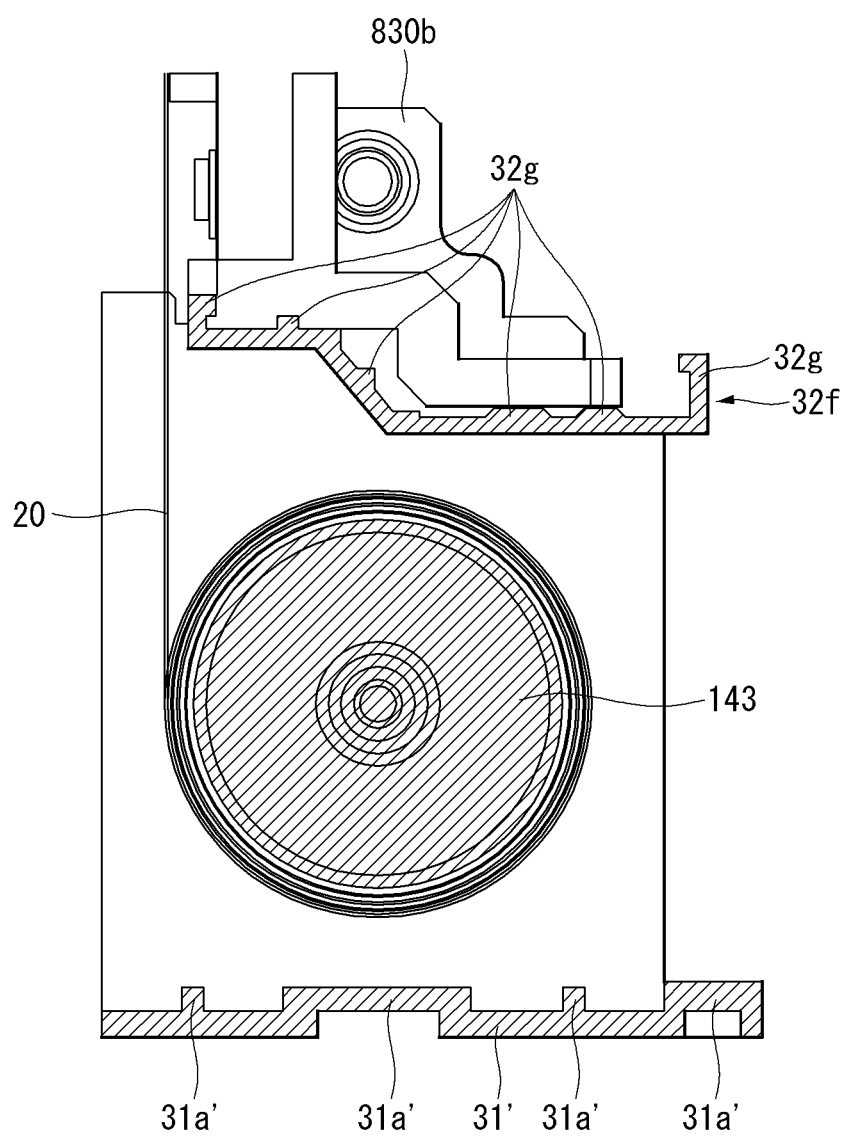

Referring to FIG. 20, a second base 32f may not form a space. If the second base 32f is not under a heavy load, beams 32g of the second base 32f may provide sufficient rigidity to the second base 32f. A first base 31' may include beams 31a'.

Figure 21:
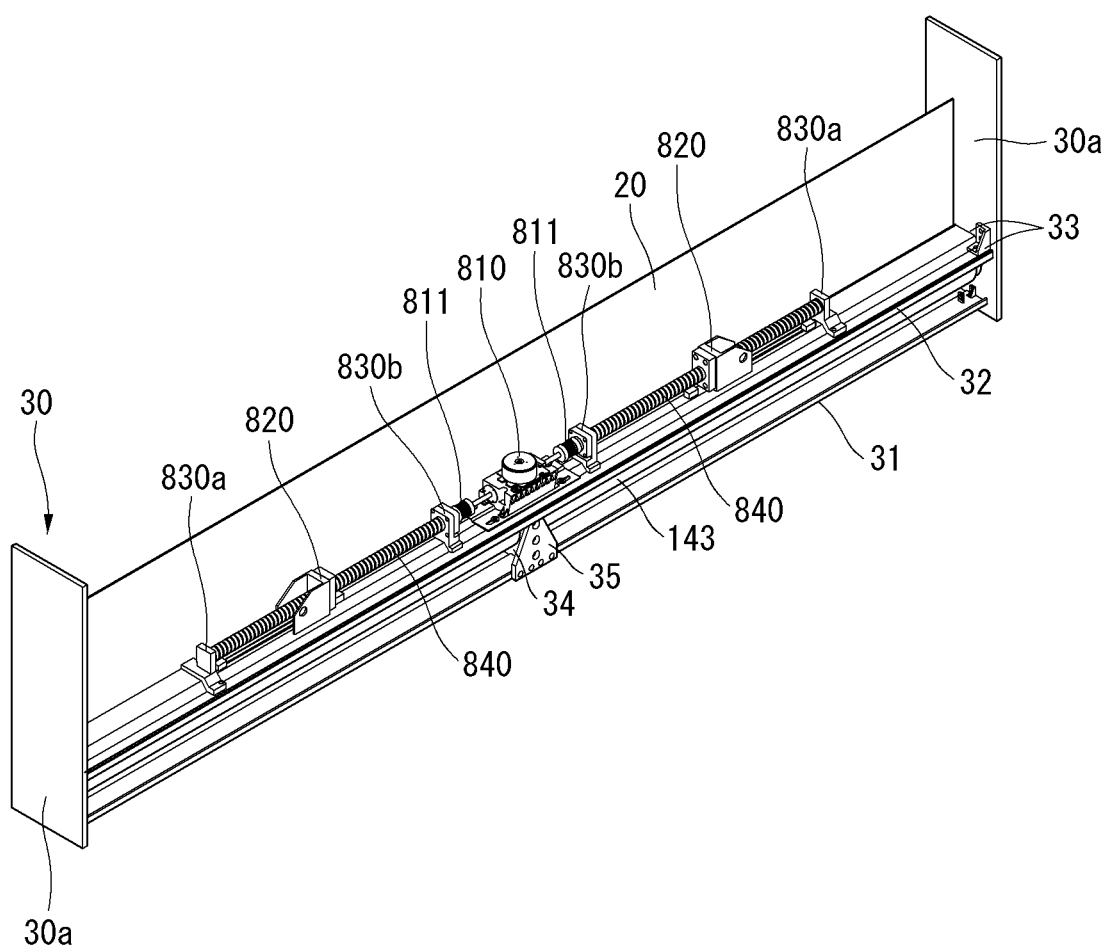
Figure 22:
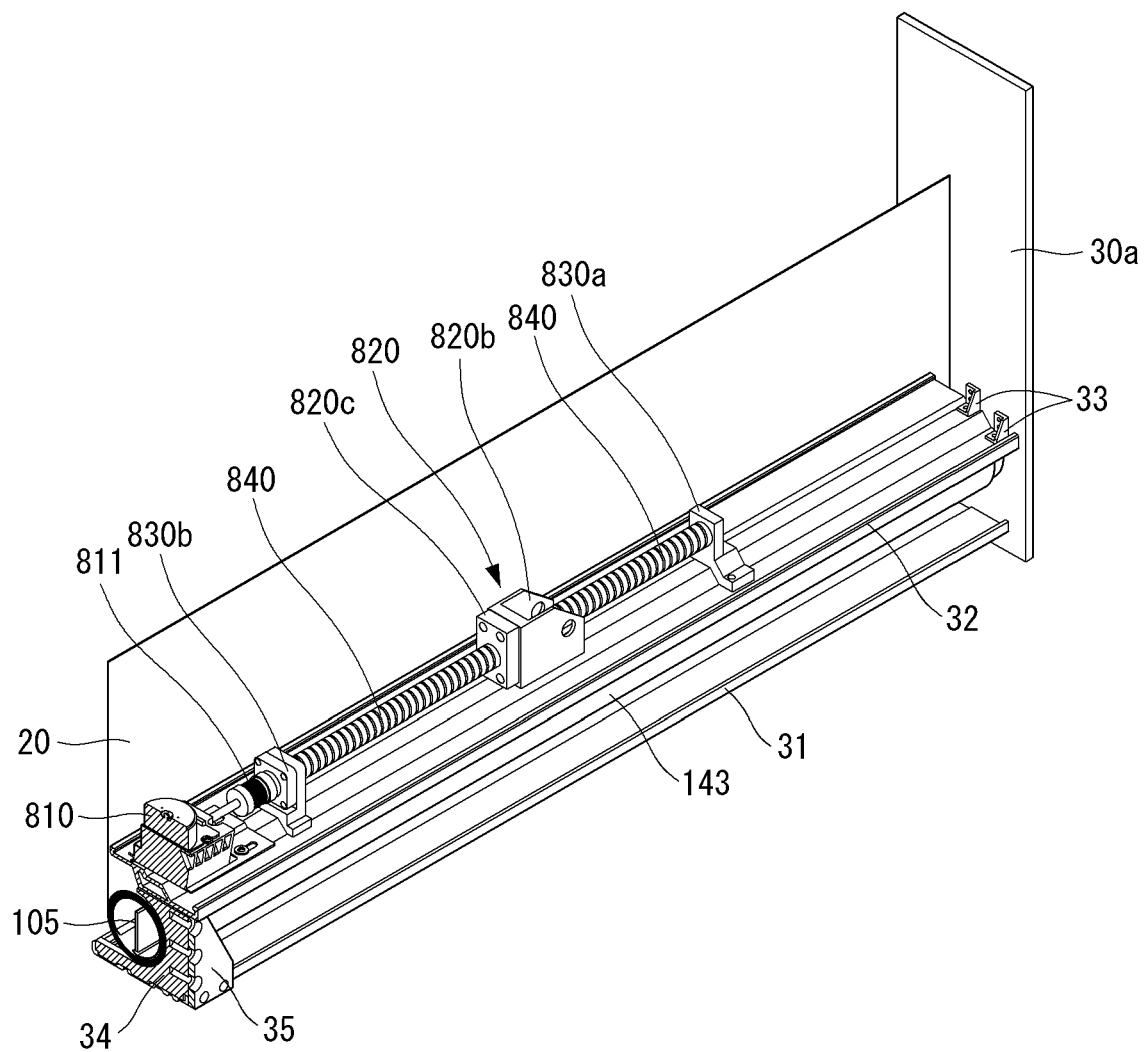

Referring to FIGS. 21 and 22, a motor assembly 810 may be mounted on the second base 32. The motor assembly 810 may have drive shafts formed on both sides thereof. A right drive shaft and a left drive shaft of the motor assembly 810 may rotate in the same direction. Alternatively, the right drive shaft and the left drive shaft of the motor assembly 810 may rotate in opposite directions.

The motor assembly 810 may include a plurality of motors. The plurality of motors may be connected in series to each other. The plurality of motors of the motor assembly 810 are connected in series, thereby outputting high torque.

Lead screws 840 may be disposed on each of the left side and the right side of the motor assembly 810. The motor assembly 810 may be connected to the lead screws 840. Couplings 811 may connect the lead screws 840 with the drive shafts of the motor assembly 810.

The lead screw 840 may have a screw thread formed in a longitudinal direction. A direction of the screw thread formed on the right lead screw 840 may be opposite to a direction of the screw thread formed on the left lead screw 840. The direction of the screw thread formed on the right lead screw 840 may be the same as the direction of the screw thread formed on the left lead screw 840. A pitch of the left lead screw 840 may be the same as a pitch of the right lead screw 850.

Bearings 830a and 830b may be mounted on the second base 32. The bearings 830a and 830b may support both sides of the lead screws 840. The bearings 830a and 830b may include inner bearings 830b disposed close to the motor assembly 810, and outer bearings 830a disposed away from the motor assembly 810. The lead screws 840 may be rotated stably by the bearings 830a and 830b.

Slides 820 may be engaged with the lead screws 840. The slides 820 may be movable in a longitudinal direction of the lead screws 840 during rotation of the lead screws 40. The slide 820 may move between the outer bearing 830a and the inner bearing 830b. The slides 820 may be disposed at the left lead screw 840 and the right lead screw 840, respectively. A left slide 820 may be engaged with the left lead screw 840. A right slide 20 may be engaged with the right lead screw 840.

The left slide 820 and the right slide 820 may be disposed symmetrically with respect to the motor assembly 810. By driving the motor assembly 810, the left slide 820 and the right slide 820 may be moved away from or closer to each other by the same distance.

Figure 23:
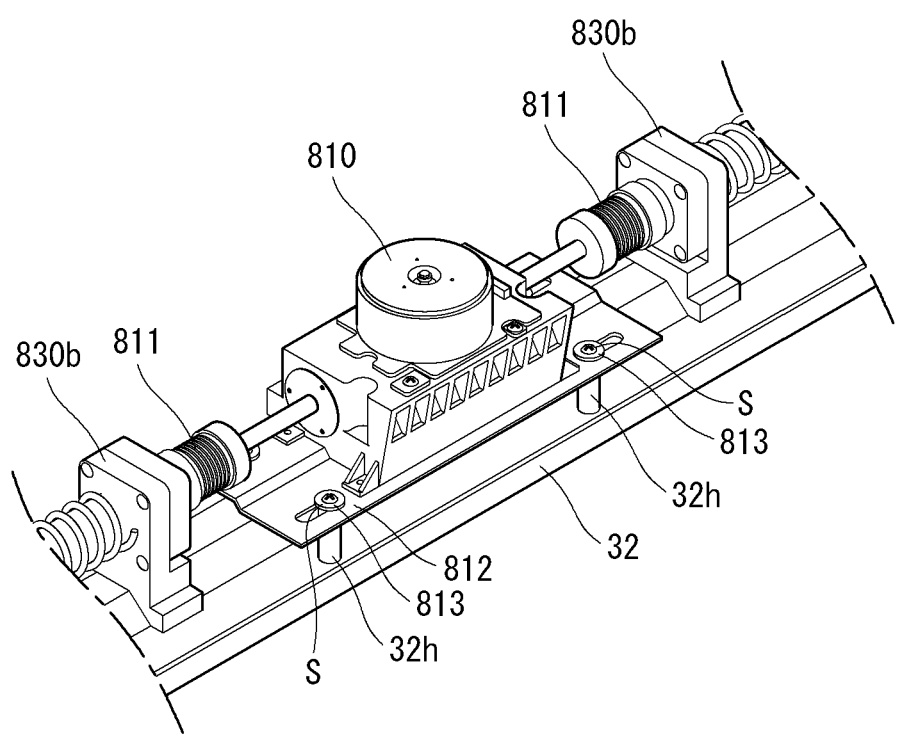

Referring to FIG. 23, the motor assembly 810 may include a plate 813. The plate 813 may be referred to as a mount plate 813 or a motor mount plate 813. Coupling portions 32h may be formed on an upper surface of the second base 32. The plate 813 may be fastened to the coupling portions 32h b screws S. The motor assembly 810 may be spaced apart from the upper surface of the second base 32. Washers 813 may be disposed between the plate 813 and the screws S. The washers 813 may include a rubber material. The washers 813 may reduce vibration occurring in the motor assembly 810. The washers 813 may improve driving stability of the display device 100.

Figure 24:
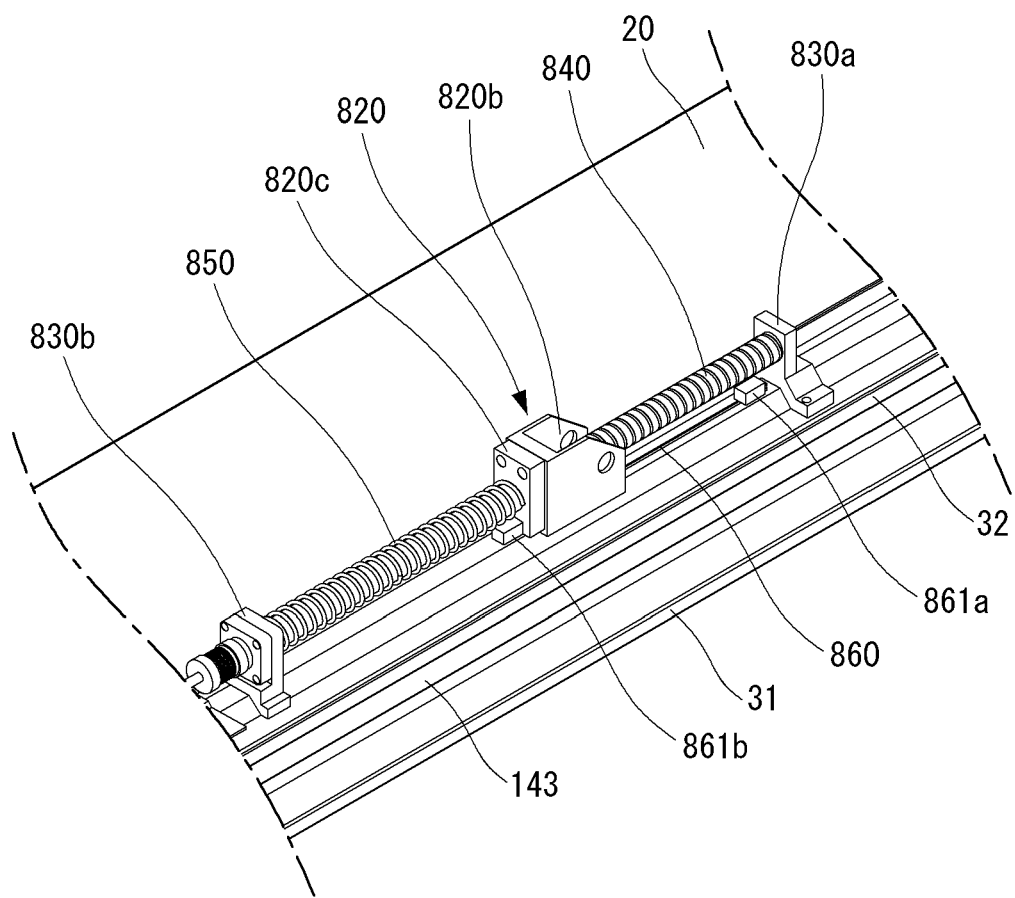

Referring to FIG. 24, a guide rail 860 may be disposed at the second base 32. The guide rail 860 may be disposed in parallel to the lead screw 840. The slide 820 may be engaged with the guide rail 860. A first stopper 861b may be disposed on a first side of the guide rail 860, and a second stopper 861a may be disposed on a second side of the guide rail 860. The slide 820 may move within a limited range between the first stopper 861b and the second stopper 861a.

A spring 850 may surround the lead screw 840. The lead screw 840 may pass through the spring 850. The spring 850 may be disposed between the inner bearing 830b and the slide 820. A first side of the spring 850 may come into contact with the inner bearing 830b, and a second side of the spring 850 may come into contact with the slide 820. The spring 850 may provide elasticity to the slide 820.

When the slide 820 is stopped by the first stopper 861b, the spring 850 may be compressed to the maximum. When the slide 820 is stopped by the first stopper 861b, the spring 850 has a minimum length. When the slide 820 is stopped by the first stopper 861b, a distance between the slide 820 and the inner bearing 830b may be minimum.

Figure 25:
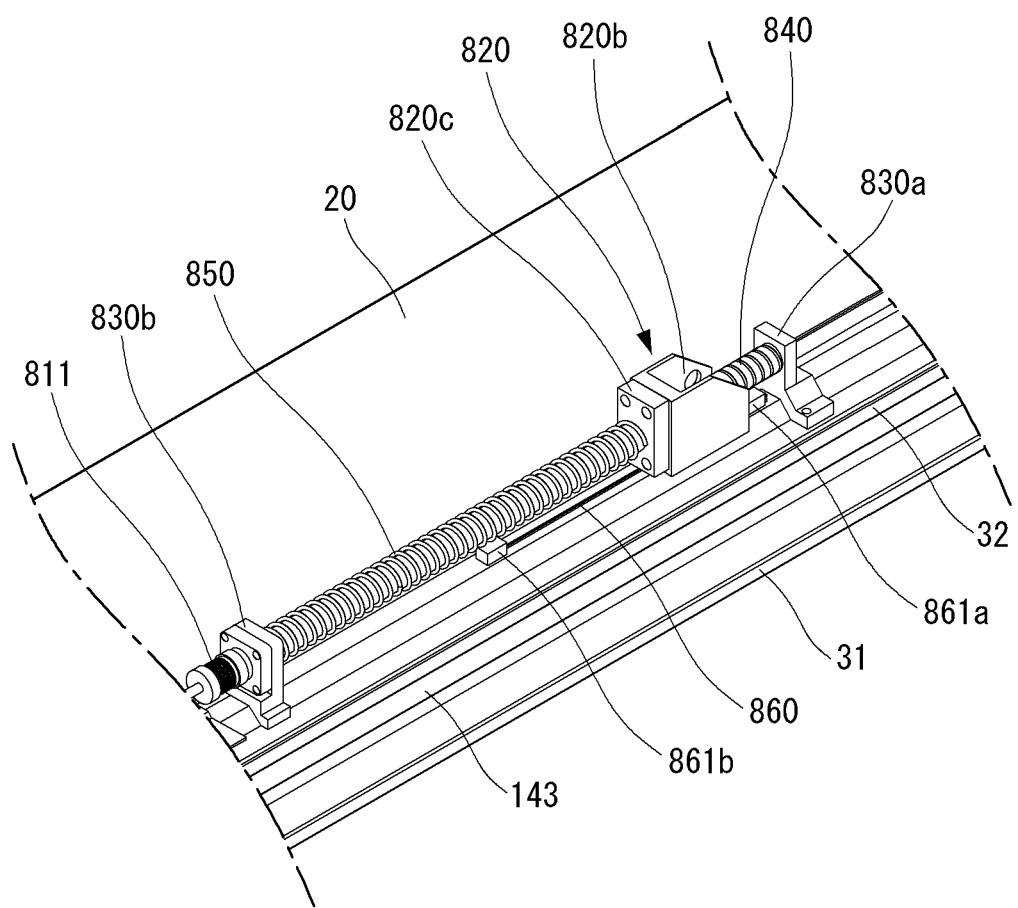

Referring to FIG. 25, when the slide 820 is stopped by a second stopper 861a, the spring 850 may be stretched to the maximum. When the slide 820 is stopped by the second stopper 861b, the spring 850 may have a maximum length. When the slide 820 is stopped by the second stopper 861a, a distance between the slide 820 and the inner bearing 830b may be maximum.

Figure 26:
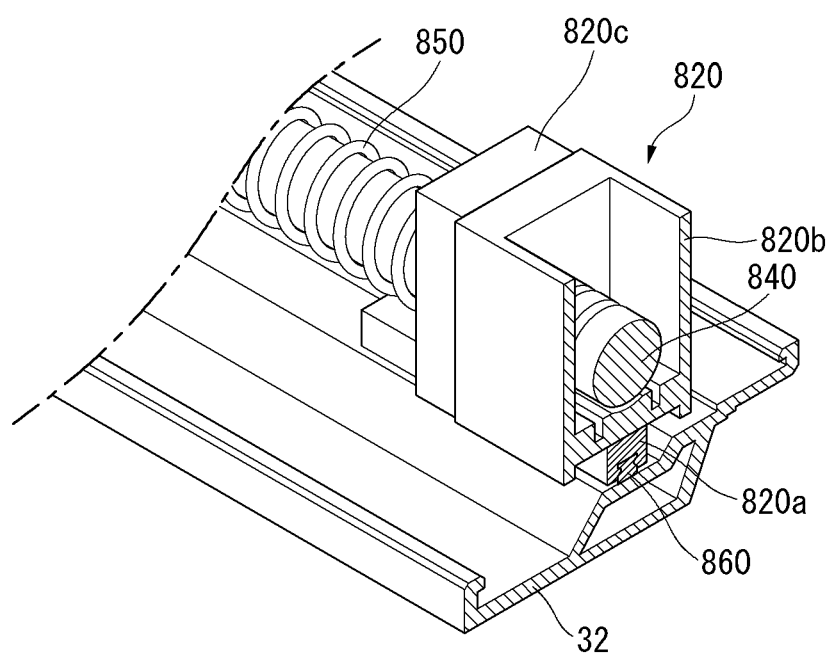

Referring to FIG. 26, the first part 820a may be engaged with the guide rail 860. The first part 820a may move along the guide rail 860. The first part 820a may be restricted from moving in a longitudinal direction of the guide rail 860. The second part 820b may be disposed over the first part 820a. The first part 820a and the second part 820b may be fastened to each other by a screw. The second part 820b may be spaced apart from the guide rail 860. The lead screw 840 may pass through the second part 820b. For example, the second part 820b may include a male thread engaged with a female thread. Accordingly, even when the lead screw 840 is rotated, the slide 820 is stably movable along the guide rail 860 without being rotated.

The third part 820c may be coupled to a first side of the second part 820b. The third part 820c may come into contact with the spring 850. The third part 820c may receive elastic force from the spring 850.

Figure 27:
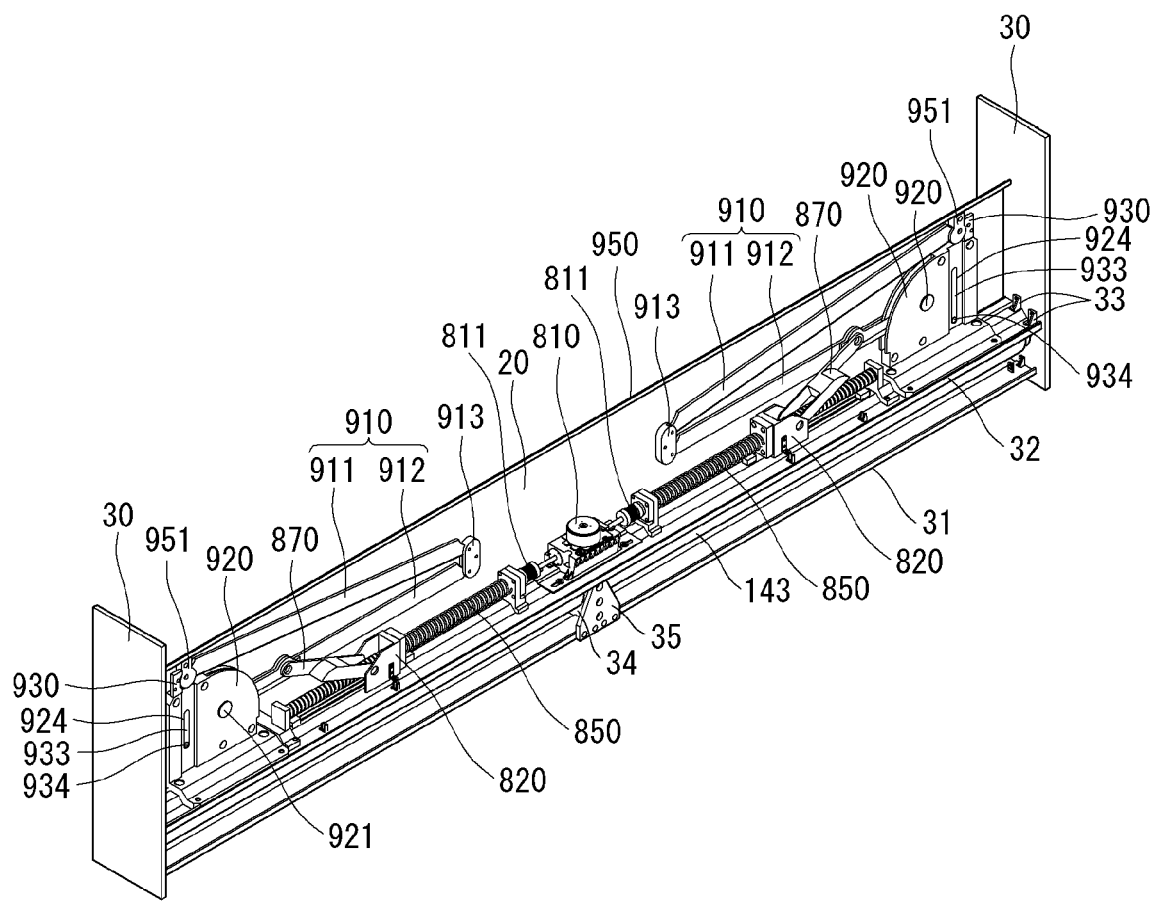
Figure 28:
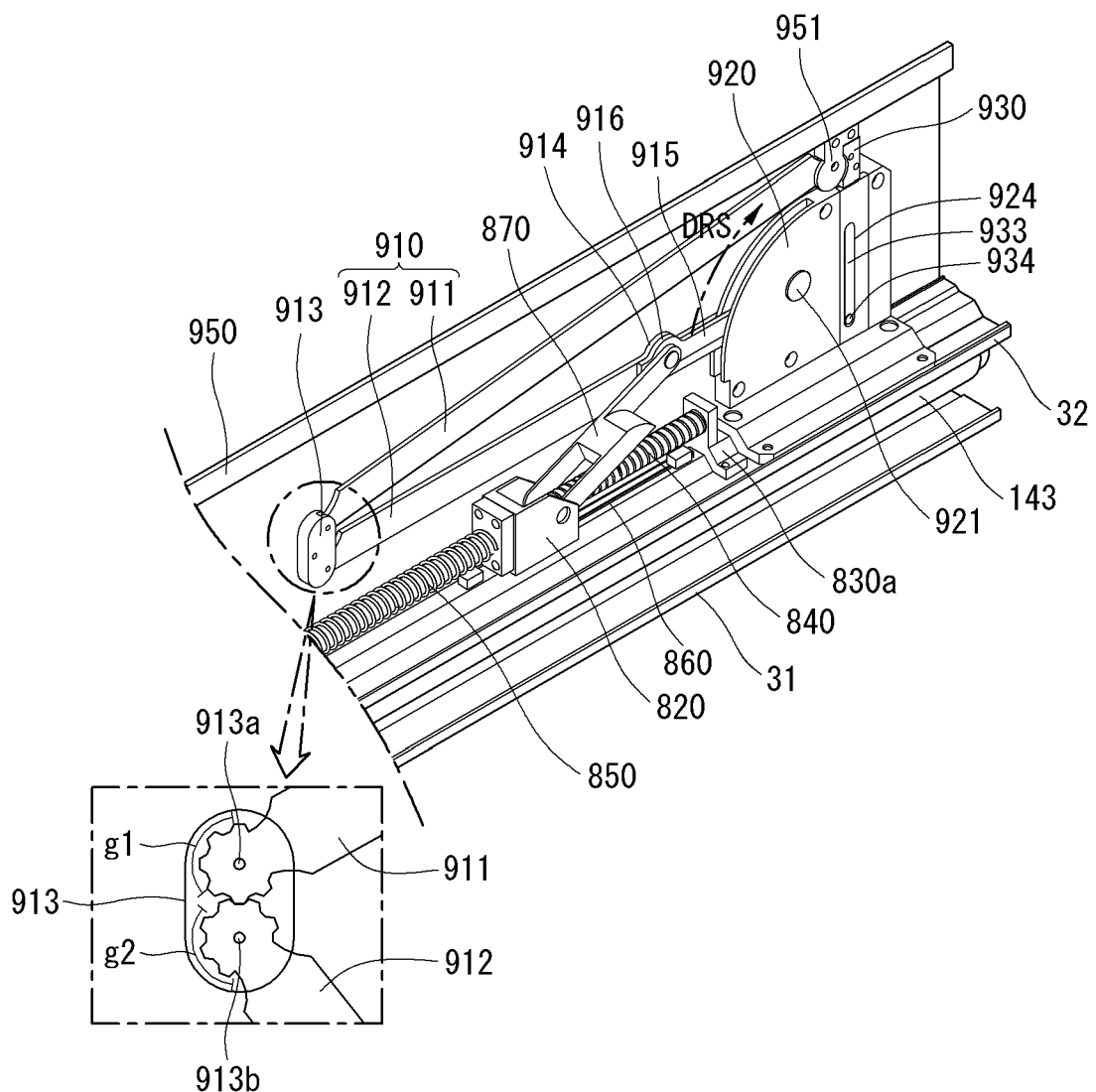

Referring to FIGS. 27 and 28, a link mount 920 may be mounted on the second base 32. A first side of a second arm 912 may be pivotally connected to the link mount 920. A second side of the second arm 912 may be pivotally connected to a joint 913. The second side of the second arm 912 may be pivotally connected to a second shaft 913b. A first side of a rod 870 may be pivotally connected to the slide 820. A second side of the rod 870 may be pivotally connected to the second arm 912 or a third arm 915. A first side of the third arm 915 may be pivotally connected to the link mount 920. A second side of the third arm 915 may be pivotally connected to the second side of the rod 870. The link mount 920 may include a shaft 921. The second arm 912 or the third arm 911 may be pivotally connected to the shaft 921.

A link bracket 951 may be referred to as a link cap 951. The link bracket 951 may be coupled to a top case 950. The top case 950 may be referred to as a case top 950, an upper bar 950, a top 950, or a bar 950. The top case 950 may be disposed at an upper end of the display unit 20. The display unit 20 may be fixed to the top case 950.

A first side of a first arm 911 may be pivotally connected to the joint 913. The first side of the first arm 911 may be pivotally connected to a first shaft 913a. A second side of the first arm 911 may be pivotally connected to the link bracket 951 or the top case 950.

A gear g1 may be formed on the first side of the first arm 911. A gear g2 may be formed on the second side of the second arm 912. The gear g1 of the first arm 911 and the gear g2 of the second arm 912 may be engaged with each other.

When the slide 820 moves closer to the outer bearing 830a, the second arm 912 or the third arm 915 may be raised. In this case, a direction in which the second arm 912 or the third arm 915 is raised may be referred to as a raised direction DRS.

The second arm 912 may include a protrusion 914 protruding in the raised direction DRS. The protrusion 914 may be referred to as a connection part 914. The third arm 915 may include a protrusion 916 protruding in the raised direction DRS. The protrusion 916 may be referred to as a connection part 916. The protrusion 914 of the second arm 912 and the protrusion 916 of the third arm 915 may face or come into contact with each other. The second side of the rod 870 may be fastened to the protrusion 914 of the second arm 912 or the protrusion 916 of the third arm 915.

A link 910 may include the first arm 911, the second arm 912, the third arm 915, and/or the joint 913.

Figure 29:
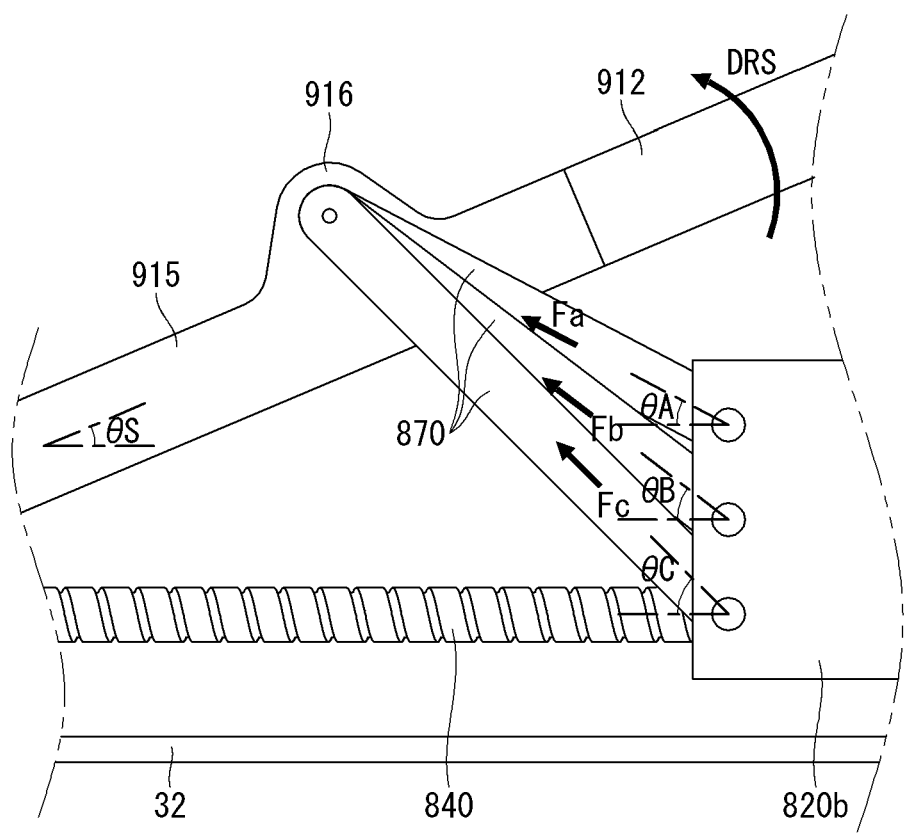
Figure 30:
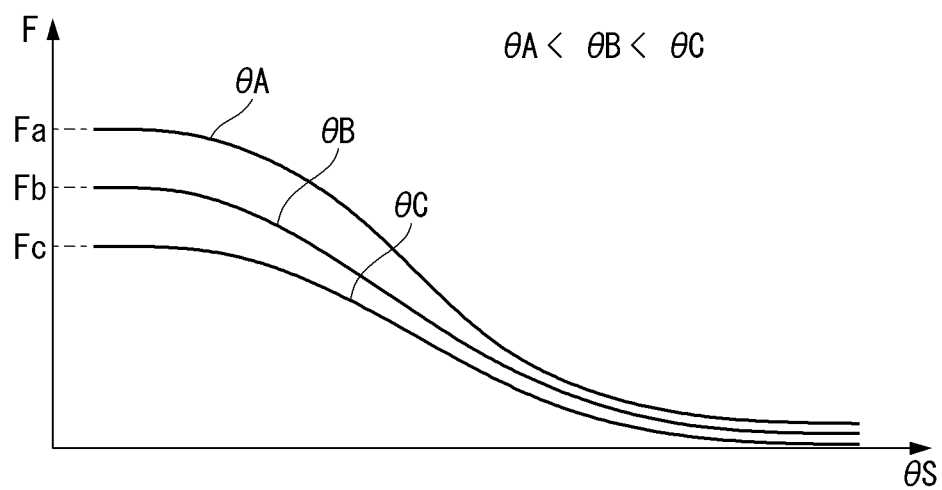

Referring to FIGS. 29 and 30, an angle formed between the second arm 912 or the third arm 915 and the second base 32 may be referred to as theta S. When the rod 870 is connected to an upper side of the second part 820b, an angle formed between the rod 870 and the second base 32 may be referred to as theta A, and a minimum force required for the rod 870 to raise the second arm 912 or the third arm 915 may be referred to as Fa. When the rod 870 is connected to the middle of the second part 820b, an angle formed between the rod 870 and the second base 32 may be referred to as theta B, and a minimum force required for the rod 870 to raise the second arm 912 or the third arm 915 may be referred to as Fb. When the rod 870 is connected to a lower side of the second part 820b, an angle formed between the rod 870 and the second base 32 may be referred to as theta C, and a minimum force required for the rod 870 to raise the second arm 912 or the third arm 915 may be referred to as Fc.

If theta S is the same, a relationship of theta A<theta B<theta C may be formed. Further, if theta S is the same, a relationship of Fc<Fb<Fa may be formed. If the angle formed between the second arm 912 or the third arm 915 and the second base 32 is the same, as an angle between the rod 870 and the second base 32 increases, a force required for raising the second arm 912 or the third arm 915 may be reduced. As the rod 870 is connected to the lower side of the second part 820b, load applied to the motor assembly 810 may be reduced.

Figure 31:
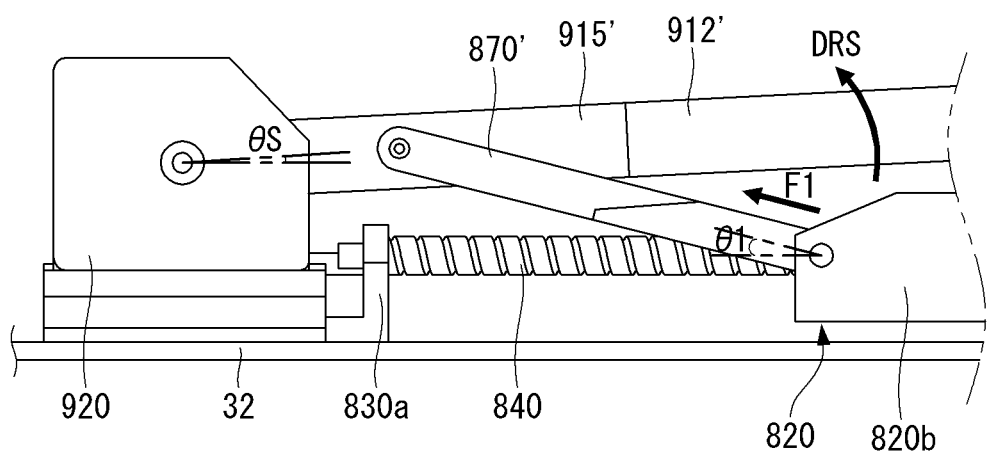

Referring to FIG. 31, a rod 870' may not be connected to a protrusion of a second arm 912' or a protrusion of a third arm 915'. If an angle formed between the second arm 912' or the third arm 915' and the second base 32 is theta S, an angle formed between the rod 870' and the second base 32 may be referred to as theta 1, and a minimum force required for the rod 870' to raise the second arm 912' or the third arm 915' may be referred to as F1.

Figure 32:
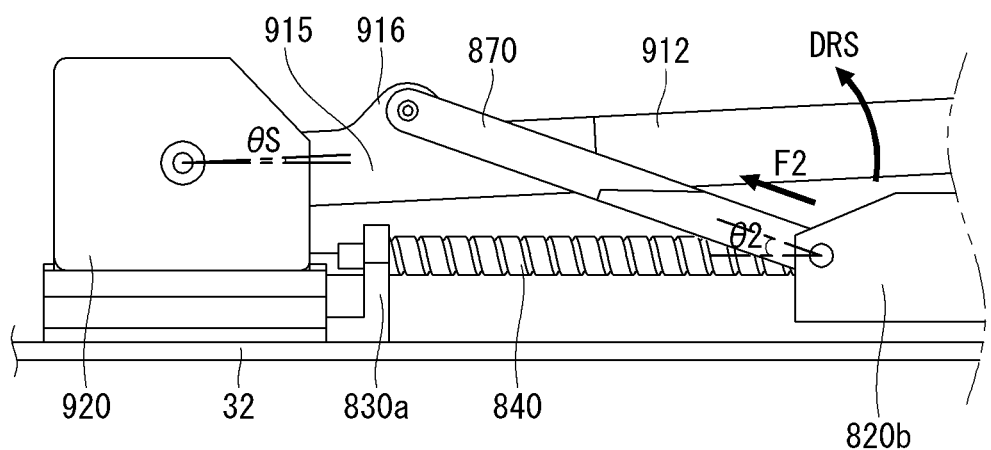

Referring to FIG. 32, the rod 870 may be connected to the protrusion 914 of the second arm 912 or the protrusion 916 of the third arm 915. If an angle formed between the second arm 912 or the third arm 915 and the second base 32 is theta S, an angle formed between the rod 870 and the second base 32 may be referred to as theta 2, and a minimum force required for the rod 870 to raise the second arm 912 or the third arm 915 may be referred to as F2.

Figure 33:
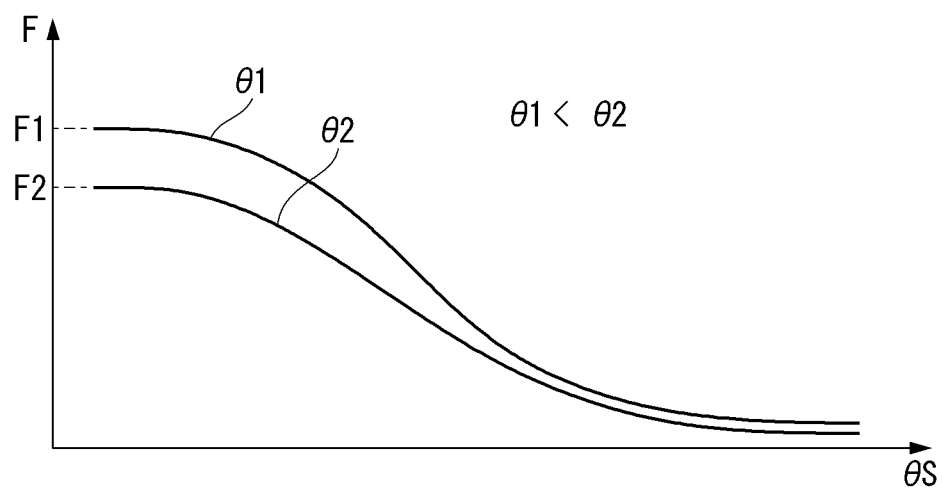

Referring to FIG. 33, if theta S is the same, theta 2 may be greater than theta 1. If theta S is the same, F1 may be greater than F2. If the angle formed between the second arms 912 and 912' and the second base 32 is the same, as an angle formed between the rods 870 and 870' and the second base 32 increases, a force required for raising the second arms 912 and 912' may be reduced. As the rod 870 is connected to the protrusions 914 and 916, a less force is required to raise the second arm 912, compared to the case where the rod 870' is not connected to the protrusions. As the rod 970 is connected to the protrusions 914 and 916, load applied to the motor assembly 810 may be reduced.

Figure 34:
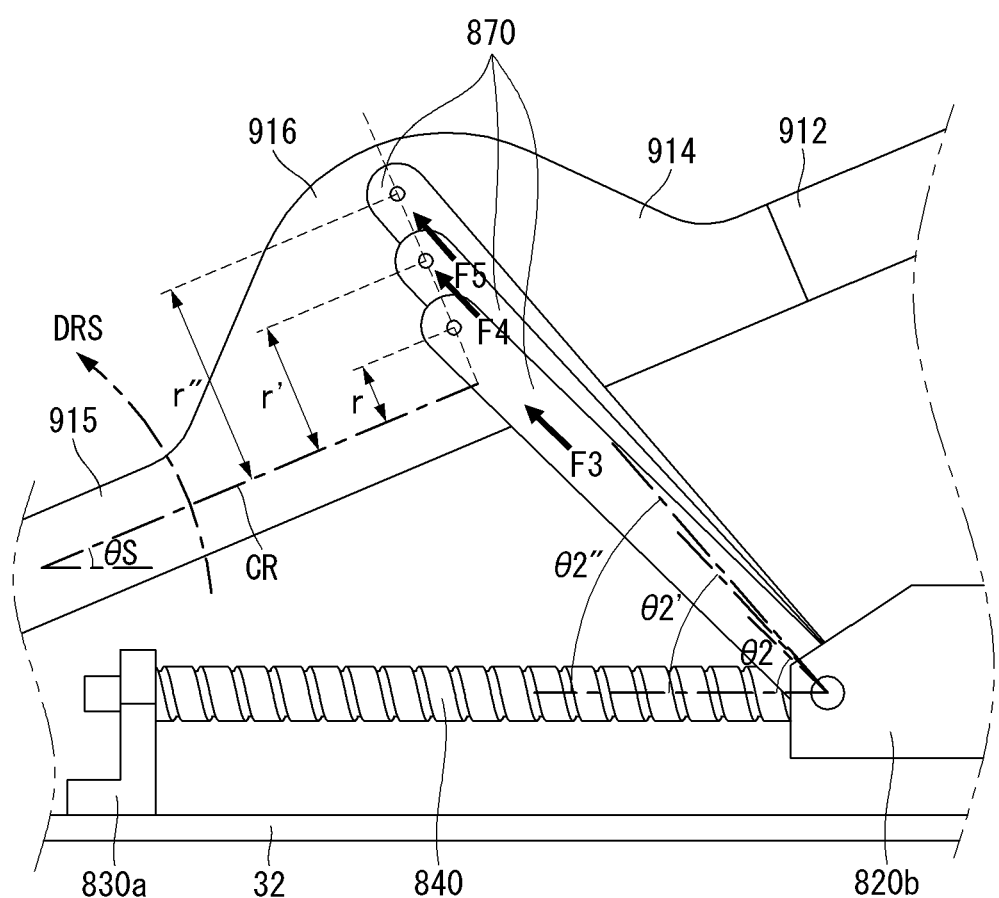

Referring to FIG. 34, the second arm 912 or the third arm 915 may have a central axis CR. When the rod 870 is fastened to the second arm 912 at a position spaced apart from the central axis CR by a distance r, an angle formed between the rod 870 and the second base 32 may be referred to as theta 2, and a minimum force required for the rod 870 to raise the second arm 912 or the third arm 915 may be referred to as F3. When the rod 870 is fastened to the second arm 912 at a position spaced apart from the central axis CR by a distance r', an angle formed between the rod 870 and the second base 32 may be referred to as theta 2', and a minimum force required for the rod 870 to raise the second arm 912 or the third arm 915 may be referred to as F4. When the rod 870 is fastened to the second arm 912 at a position spaced apart from the central axis CR by a distance r'', an angle formed between the rod 870 and the second base 32 may be referred to as theta 2'', and a minimum force required for the rod 870 to raise the second arm 912 or the third arm 915 may be referred to as F5.

Figure 35:
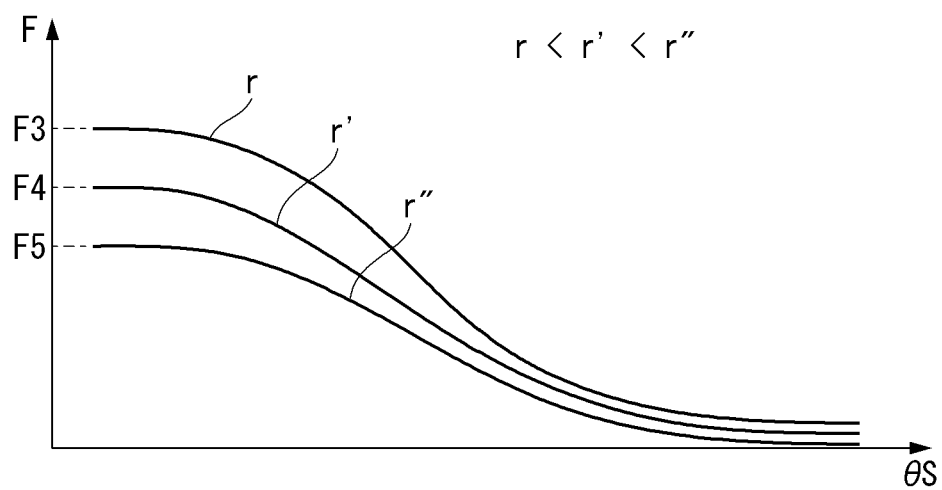

Referring to FIG. 35, if theta S is the same, theta 2'' may be greater than theta 2', and theta 2' may be greater than theta 2. If theta S is the same, F3 may be greater than F4, and F4 may be greater than F5. As the rod 870 is fastened at a position far away from the central axis CR, a force required for raising the second arm 912 may be reduced. As the rod 870 is fastened at a position far away from the central axis CR, load applied to the motor assembly 810 may be reduced.

Figure 36:
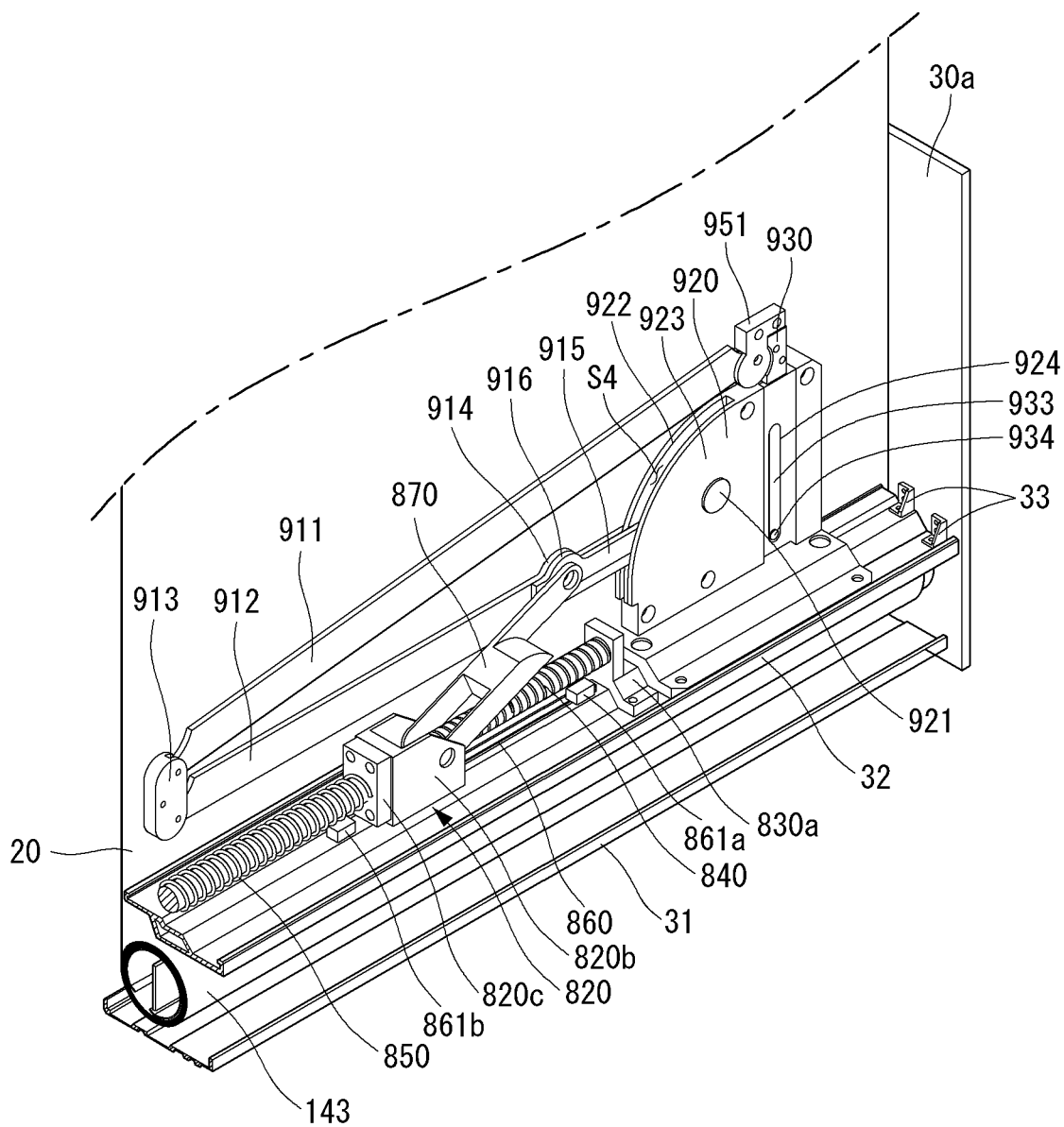

Referring to FIG. 36, the first arm 911 and the second arm 912 may come into contact with or may be disposed close to the rear surface of the display unit 20. As the first arm 911 and the second arm 912 may come into contact with or may be disposed close to the rear surface of the display unit 20, the display unit 20 may be stably rolled on or unrolled from the roller. The link mount 920 may include a first part 922 and a second part 923. The first part 922 and the second part 923 may face each other. A space S4 may be formed between the first part 922 and the second part 923. The first part 922 may face the display unit 20. The first part 922 may be disposed closer to the display unit 20 than the second part 923. The second arm 912 may be pivotally connected to a front surface of the first part 922. A portion of the third arm 915 may be accommodated in the space S4, and may be pivotally connected to the first part 922 or the second part 923.

Figure 37:
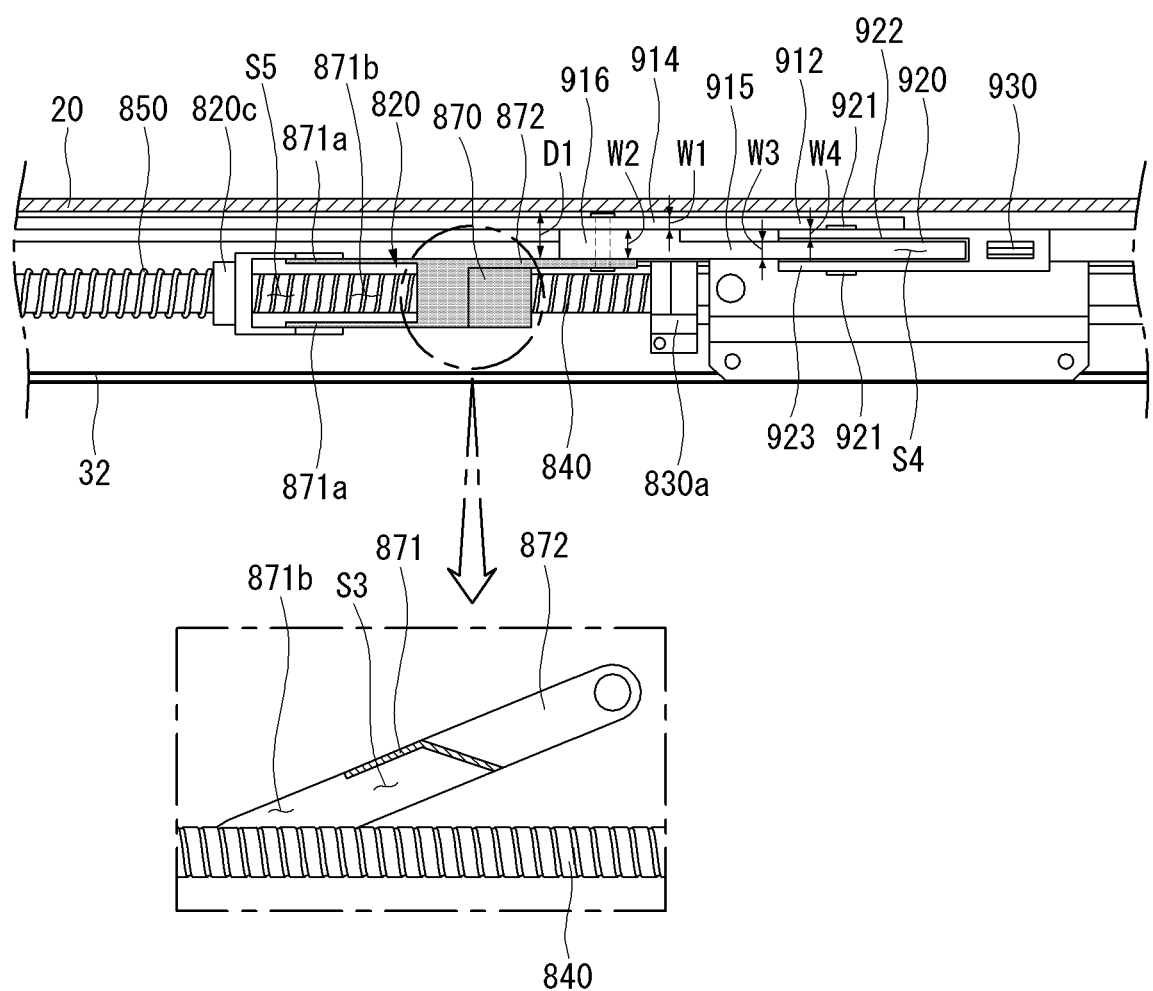

Referring to FIG. 37, the rod 870 may include a first part 871 and a second part 872. The first part 871 may have a connection part 871a formed on a first side thereof. The second part 872 of the slide 820 may have a space S5 formed therein. The connection part 871a may be inserted into the space S5. The connection part 871a may be pivotally connected to the second part 820b (see FIG. 36) of the slide 820. A second side of the first part 871 may be connected to a first side of the second part 872. The second side of the second part 872 may be pivotally connected to the second arm 912 or the third arm 915. The first part 871 may have a space S3 formed therein. The first part 871 may have a hole 871b. The lead screw 840 may be accommodated in the hole 871b or the space S3.

A distance between the second part 872 and the display unit 20 may be D1. The second arm 912 may have a thickness of W1. A portion of the third arm 915 which is accommodated in the space S4 may have a thickness of W3. The thickness W3 may be equal to a distance between the first part 922 and the second part 923. A portion of the third arm 915, which is not accommodated in the space S4, may have a thickness of W2. The first part 922 may have a thickness of W4. The thickness W2 may be greater than the thickness W3. The thickness W2 may be equal to a sum of the thickness W3 and the thickness W4. The distance D1 may be a sum of the thickness W1 and the thickness W2.

The second arm 912 may come into contact with or may be disposed close to the rear surface of the display unit 20. The third arm 915 may be disposed between the second arm 912 and the second part 872. The third arm 915 allows the second part 872 to stably transmit power for raising the second arm 912. In order to stably raise the second arm 912 or the third arm 915, the second part 872 may move forward with respect to a rotation axis of the lead screw 840, to be connected to the first part 871. In this manner, a clearance gap between the second arm 912 and the second part 872 may be minimized.

Figure 38:
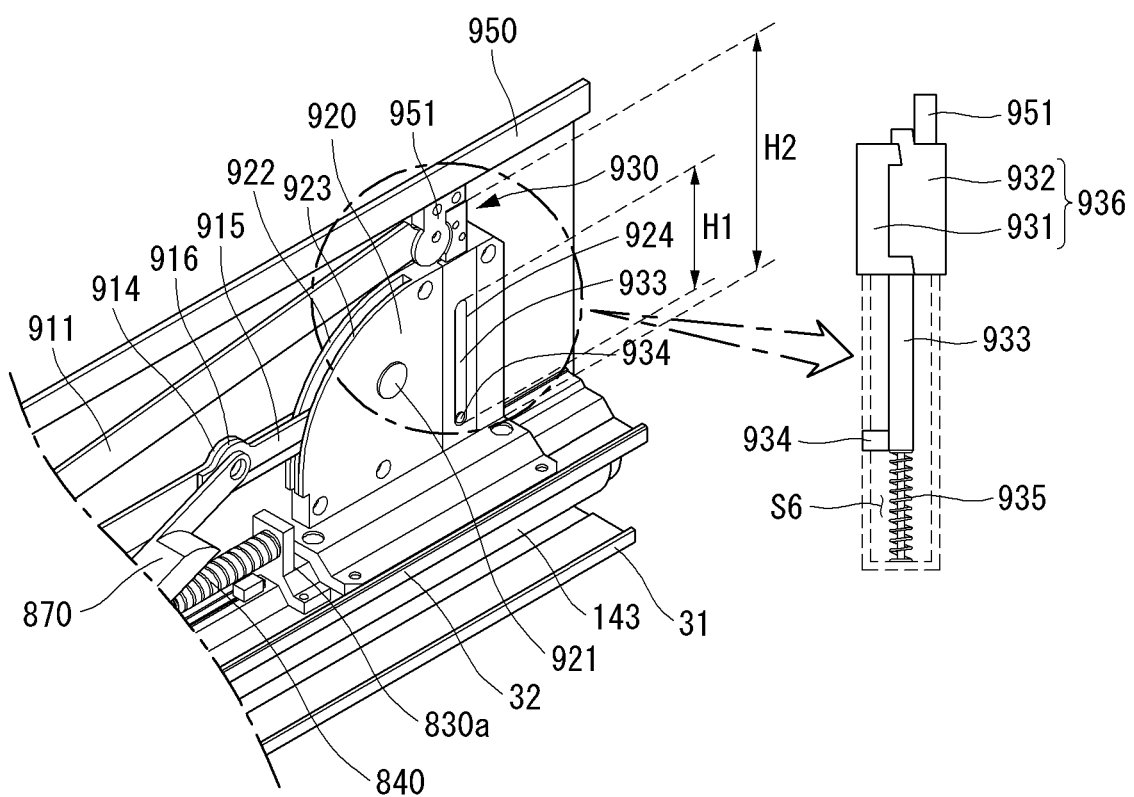

Referring to FIG. 38, a pusher 930 may be mounted to the link mount 920. The pusher 930 may be referred to as a lifter 930. A second part 932 may be fastened to a first part 931. The second part 932 may come into contact with or may be separated from the link bracket 951. The second part 932 may be a material having high elasticity. The first part 931 may be a material having lower elasticity than the second part 932. The first part 931 may be a material having higher rigidity than the second part 932. The first part 931 and the second part 932 may be collectively referred to as a head 936. The head 936 may be disposed at the upper side of the link mount 920.

A third part 933 may be connected to the first part 931. Alternatively, the third part 933 may extend downwardly from the first part 931. The third part 933 may be referred to as a tail 933. A fourth part 934 may protrude from the third part 933. The link mount 920 may have a space S6, and the third part 933 may be accommodated in the space S6. The space S6 may be opened upward. The space S6, in which the third part 933 is accommodated, may be next to the space S4

(see FIG. 37) in which the third arm 915 is accommodated. The second part 932 of the link mount 920 may have a hole 924. The hole 924 may be a long hole which is vertically elongated. The hole 924 may have a length of H1. The fourth part 934 may be inserted into the hole 924. A spring 935 may be accommodated in the space S6. The spring 935 may be disposed under the third part 933. The spring 935 may provide an elastic force to the third part 933 in a vertical direction.

The head 936 may be greater than a diameter of the space S6. When the head 936 is caught by an upper end of the space S6, the head 936 may have a minimum height from the second base 32. The minimum height of the head 936 may be H2. When the head 936 has the minimum height, the fourth part 934 may be caught by a lower end of the space S6. When the head 936 has the minimum height, the spring 935 may provide a maximum elastic force. When the head 936 has the minimum height, a height of the top case 950 may be minimum.

While being in contact with the link bracket 951, the pusher 930 may provide an elastic force to the link bracket 951. In this manner, load applied to the motor assembly 810 to raise the link 910 may be reduced.

Figure 39:
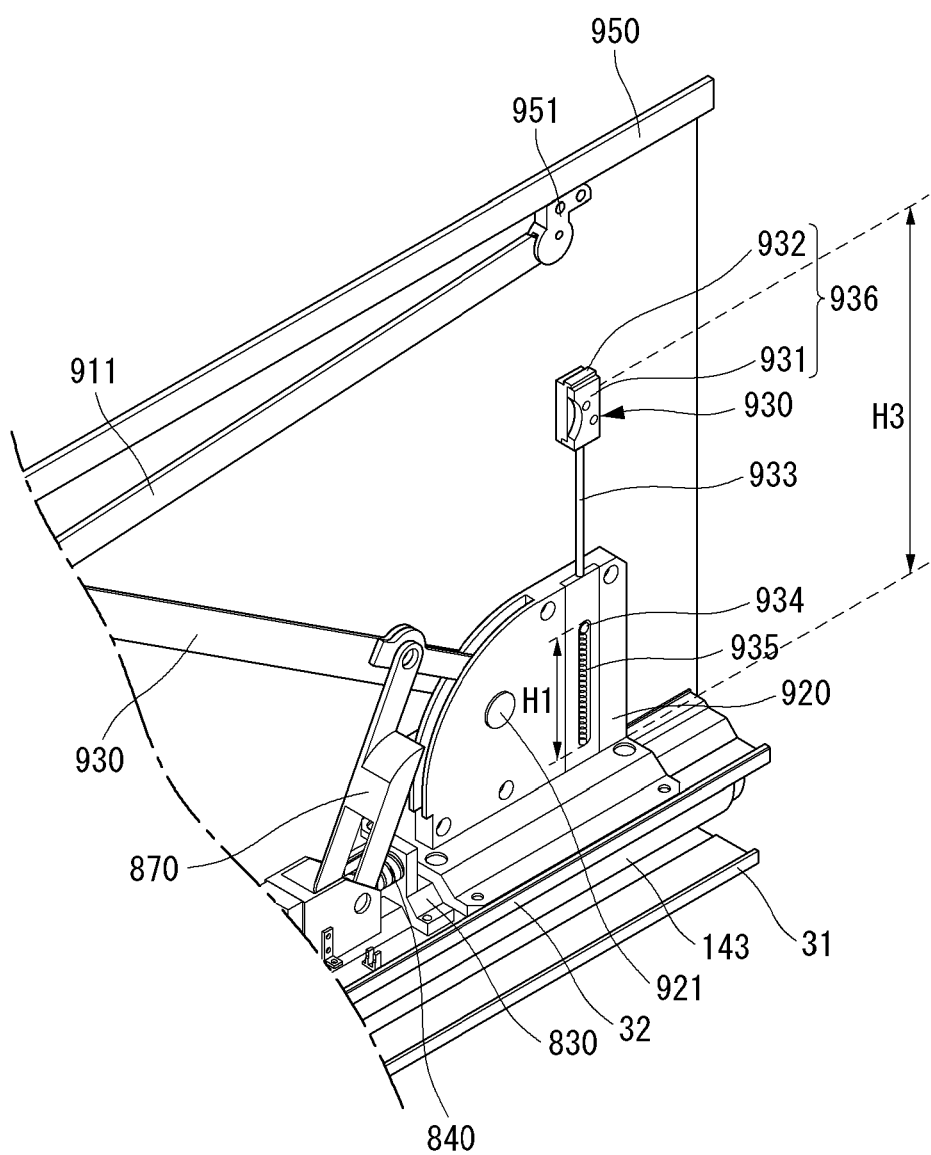

Referring to FIG. 39, when the link 910 is sufficiently raised, the pusher 930 may be separated from the link bracket 951. When the pusher 930 is separated from the link bracket 951, the head 936 has a maximum height from the second base 32. The maximum height of the head 936 may be H3. When the head 936 has the maximum height, the fourth part 934 may be stopped at an upper end of the hole 924 (see FIG. 38). When the head 936 has the maximum height, the spring 935 may be stretched to the maximum. When the head 936 has the maximum height, the spring 935 may provide a minimum elastic force. The maximum height H3 of the head 936 may be substantially equal to a sum of the minimum height H2 of the head 936 and the length H1 of the hole.

Figure 40:
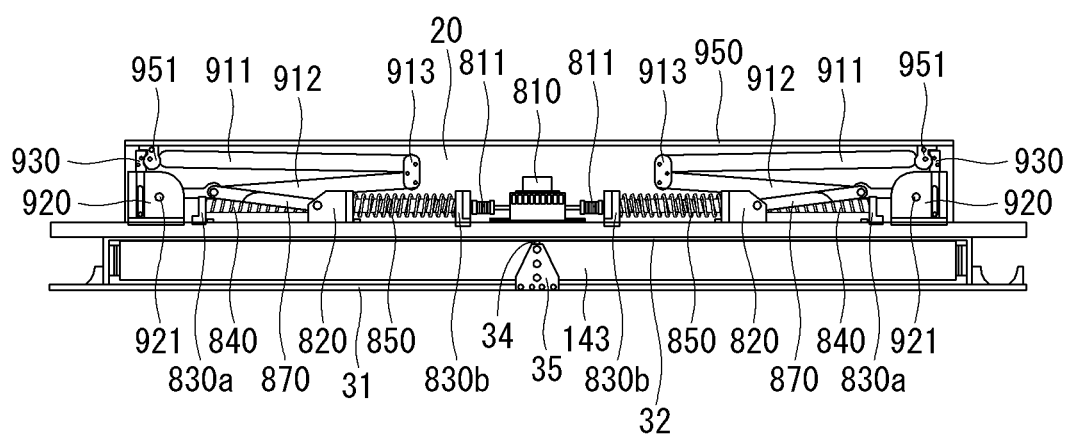

Referring to FIG. 40, the display unit 20 may be rolled on the roller 143 to the maximum. The display device 100 may be symmetric with respect to the motor assembly 810. The top case 950 may have a minimum height. The slide 820 may be at a position closest to the inner bearing 830b. The slide 820 may be stopped by the first stopper 861b. The spring 850 may be compressed to the maximum. The pusher 930 may come into contact with the link bracket 951. The pusher 930 may have a minimum height.

Figure 41:
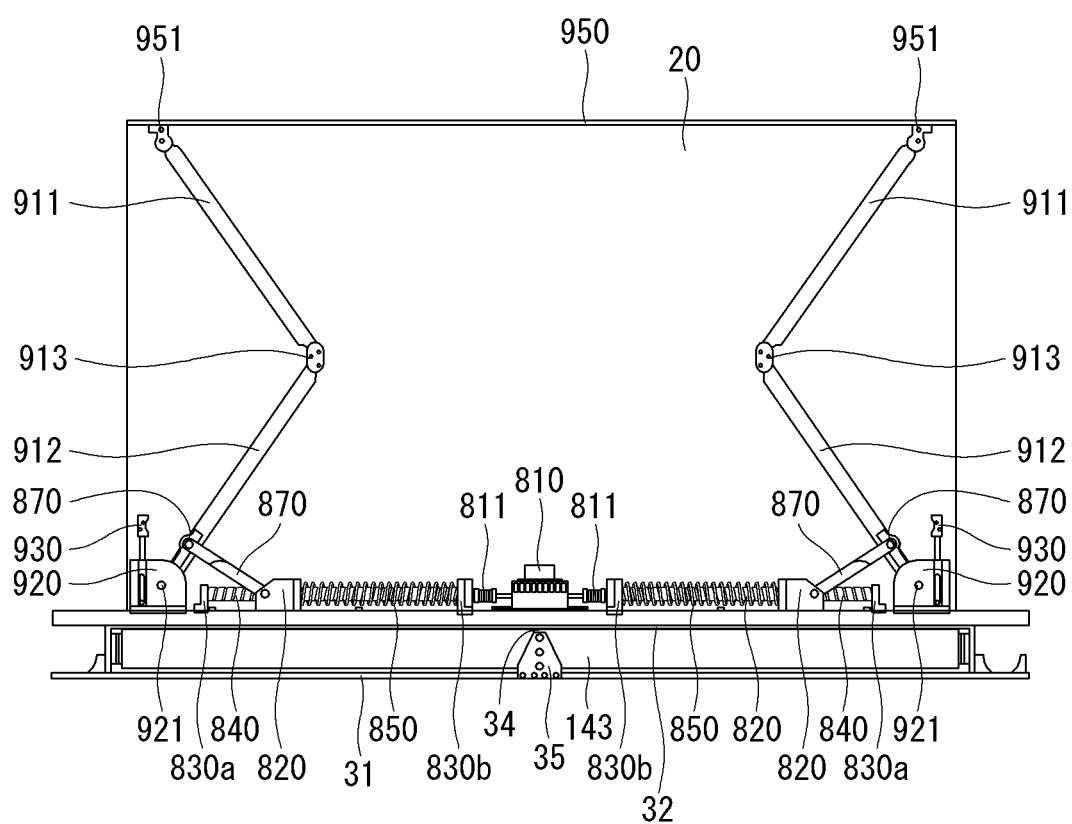

Referring to FIG. 41, about half of the display unit 20 may be rolled on the roller 413. The display device 100 may be symmetric with respect to the motor assembly 810. A half of the display device 100 may be unrolled from the roller 143. The slide 820 may be disposed between the first stopper 861b and the second stopper 861a. The pusher 930 may be separated from the link bracket 951. The pusher 930 may have a maximum height.

Figure 42:
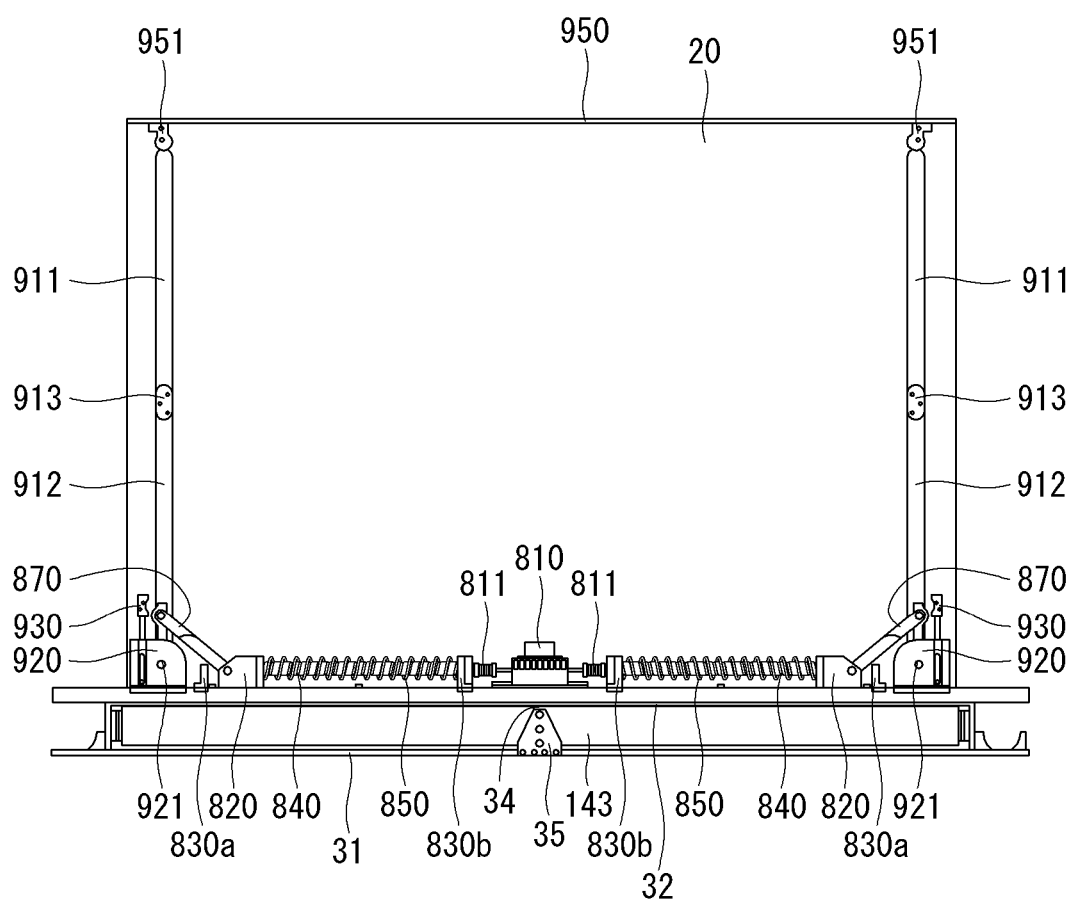
Figure 43:
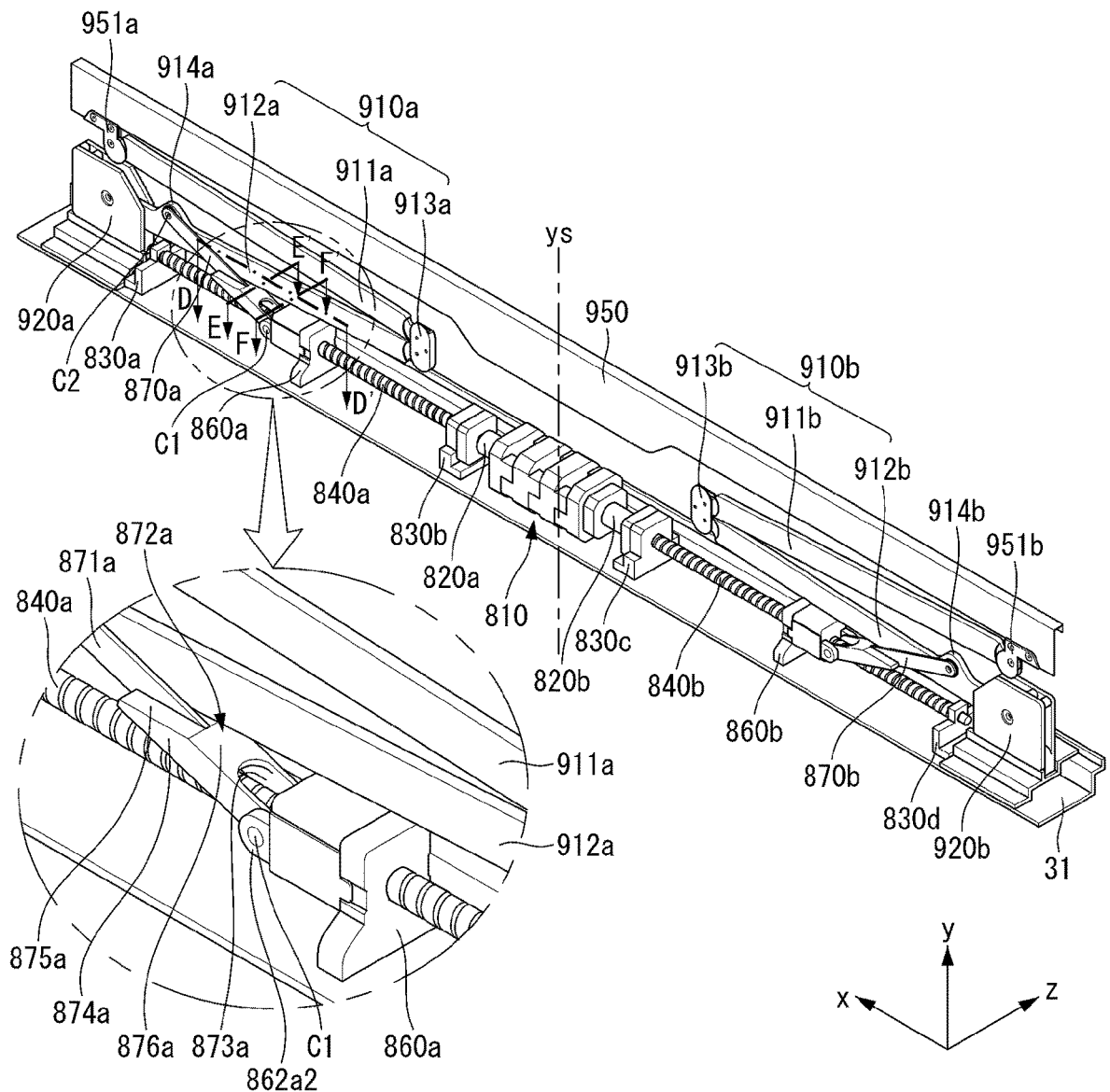
Figure 44:
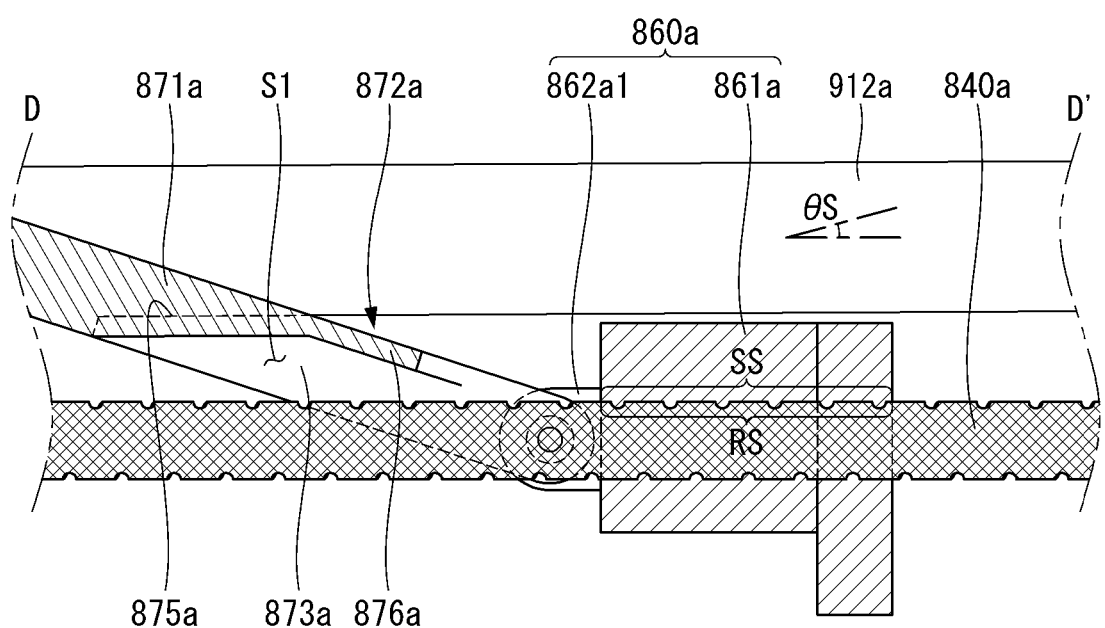
Figure 45:
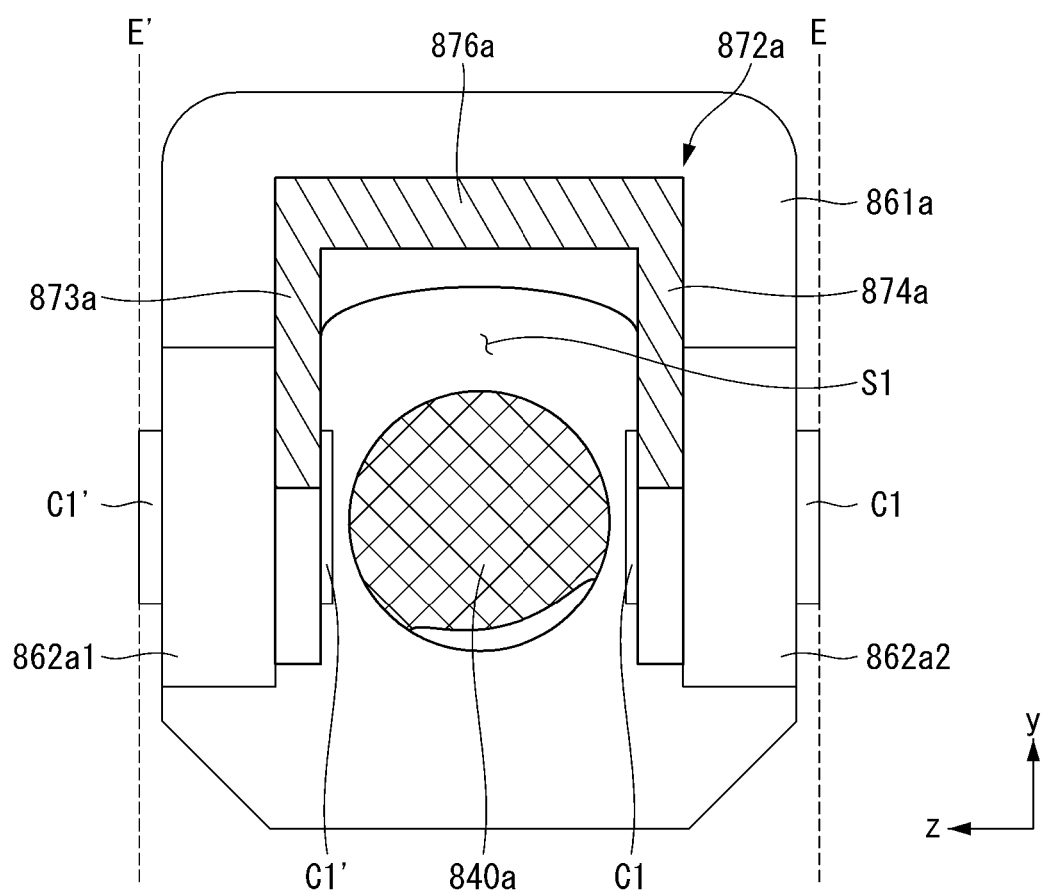
Figure 46:
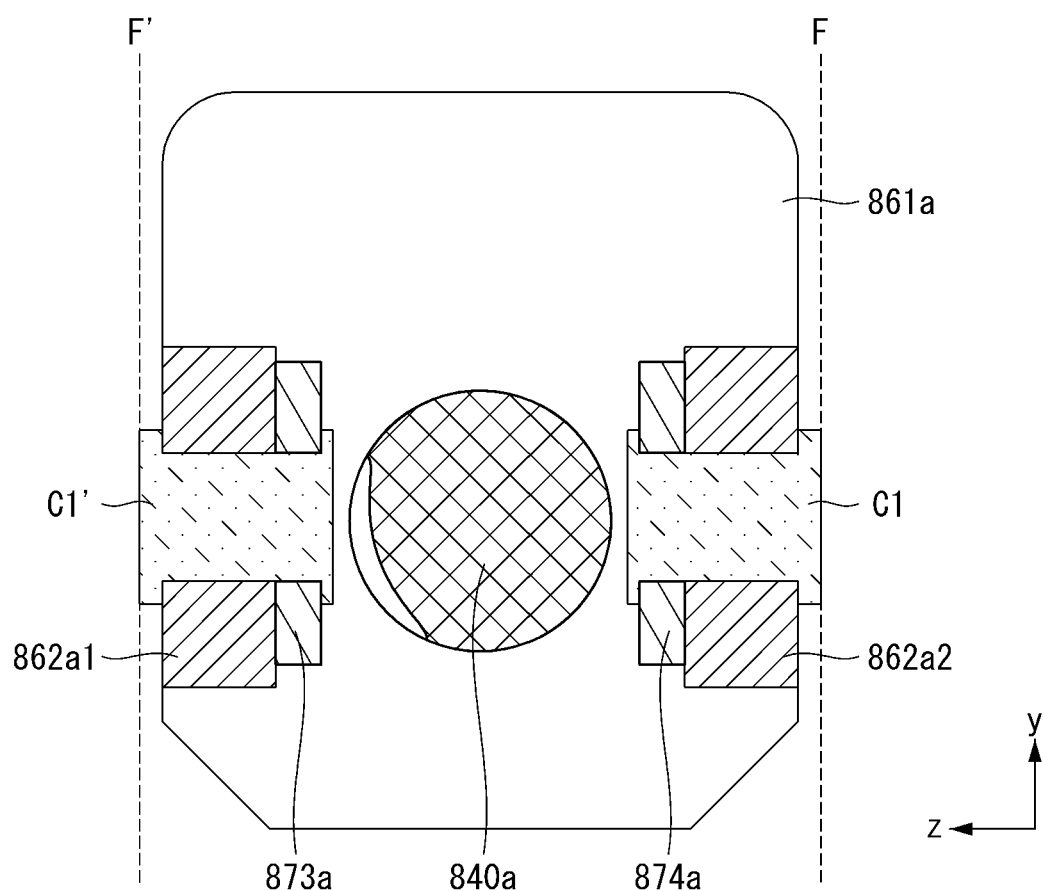

Referring to FIG. 42, the display unit 20 may be unrolled from the roller 143 to the maximum. The display device 100 may be symmetric with respect to the motor assembly 810. The top case 950 may have a maximum height. The slide 820 may be disposed closest to the outer bearing 830a. The slide 820 may be stopped by the second stopper 861a. The spring 850 may be stretched to the maximum. The pusher 930 may be separated from the link bracket 951. The pusher 930 may have a maximum height.

Referring to FIGS. 43 to 46, link mounts 920a and 920b may be mounted on the base 31. The link mounts 920a and 920b may include a right link mount 920a, which is spaced rightwardly from a first right bearing 830a, and a left link mount 920b which is spaced leftwardly from a second left bearing 830d.

Links 910a and 910b may be connected to the link mounts 920a and 920b. The links 910a and 910b may include a right link 910a connected to the right link mount 920a and a left link 910b connected to the left link mount 920b.

The right link 910a may be referred to as a first link. The left link 910b may be referred to as a second link. The right link mount 920a may be referred to as a first link mount 920a. The left link mount 920b may be referred to as a second link mount 920b.

The links 910a and 910b may include first arms 911a and 911b, second arms 912a and 912b, and arm joints 913a and 913b. First sides of the second arms 912a and 912b may be rotatably connected to the link mounts 920a and 920b. Second sides of the second arms 912a and 912b may be rotatably connected to the arm joints 913a and 913b. First sides of the first arms 911a and 911b may be rotatably connected to the arm joints 913a and 913b. Second sides of the first arms 911a and 911b may be rotatably connected to link brackets 951a and 951b.

The link brackets 951a and 951b may include a right link bracket 951a connected to the first arm 911a of the right link 910a, and a left link bracket 951b connected to the first arm 911b of the left link 910b. The link brackets 951a and 951b may be connected to the upper bar 950.

The upper bar 950 may connect the right link bracket 951a and the left link bracket 951b.

Rods 870a and 870b may connect sliders 860a and 860b with the links 910a and 910b. First sides of the rods 870a and 870b may be rotatably connected to the sliders 860a and 860b. Second sides of the rods 870a and 870b may be rotatably connected to the second arms 912a and 912b. The rods 870a and 870b may include a right rod 870a for connecting the right slider 860a and the second arm 912a of the right link 910a, and a left rod 870b for connecting the left slider 860b and the second arm 912b of the left link 910b. The right rod 870a may be referred to as a first rod 870a. The left rod 870b may be referred to as a second rod 870b.

Specifically, a structure formed by a right lead screw 840a, the right slider 860a, the right rod 870a, and the right link 910a will be described below. The right slider 860a may include a body 861a and a rod mount 862a. The body 861a may have a screw thread SS formed on an outer circumference thereof. The screw thread formed on the body 861a may be engaged with a screw thread RS of the right lead screw 840a. The right lead screw 840a may pass through the body 861a.

The rod mount 862a may be formed on the right side of the body 861a. The rod mount 862a may be rotatably connected to a first side of the right rod 870a. The rod mount 862a may include a first rod mount 862a1 and a second rod mount 862a2. The first rod mount 862a1 may be disposed at the front of the right lead screw 840a. The second rod mount 862a2 may be disposed at the rear of the right lead screw 840a. The first rod mount 862a1 and the second rod mount 862a2 may be spaced apart from each other. The second rod mount 862a2 may be spaced apart from the first rod mount 862a1 in the negative z-axis direction. The right lead screw 840a may be disposed between the first rod mount 862a1 and the second rod mount 862a2.

The rod mount 862a may be rotatably connected to a first side of the rod 870a by a connection member C1. The connection member C1 may pass through the rod mount 862a and the right rod 870a.

The right rod 870a may be rotatably connected to the second arm 912a by a connection member C2. The connection member C2 may pass through the second arm 912a and the right rod 870a.

The right rod 870a may include a transmission unit 871a connected to the second arm 912a of the right link 910a, and a cover 872a connected to the rod mount 862a of the right slider 860a. The transmission unit 871a may transmit a force, generated during movement of the right slider 860a along the right lead screw 840a, to the right link 910a.

The cover 872a may include a first plate 873a disposed at the front of the right lead screw 840a. The first plate 873a may be disposed perpendicular to the base 31. Alternatively, the first plate 873a may face the right lead screw 840a.

The cover 872a may include a second plate 874a disposed at the rear of the right lead screw 840a. The second plate 874a may be disposed perpendicular to the base 31. Alternatively, the second plate 874a may face the right lead screw 840a. Alternatively, the second plate 874a may be spaced apart from the first plate 873a. The right lead screw 840a may be disposed between the first plate 873a and the second plate 874a.

The cover 872a may include a third plate 875a connecting the first plate 873a and the second plate 874a. The third plate 875a may be connected to the transmission unit. The third plate 875a may be disposed over the right lead screw 840a.

The cover 872a may include a fourth plate 876a connecting the first plate 873a and the second plate 874a. The fourth plate 876a may be connected to the third plate 875a. The fourth plate 876a may be disposed over the right lead screw 840a.

A first side of the first plate 873a may be connected to the first rod mount 862a1. The first plate 873a may be connected to the first rod mount 862a1 by a connection member C1'. A second side of the first plate 873a may be connected to the third plate 875a.

A first side of the second plate 874a may be connected to the second rod mount 862a2. The second plate 874a may be connected to the second rod mount 862a2 by a connection member C1. A second side of the second plate 874a may be connected to the third plate 875a.

When the right slider 860a moves closer to the motor assembly 810, the right lead screw 840a and the right rod 870a may come into contact with each other. When the right lead screw 840a and the right rod 870a come into contact with each other, mutual interference may occur, and movement of the right slider 860a may be restricted.

The cover 872a may provide the space S1 formed therein. The first plate 873a, the second plate 874a, the third plate 875a, and the fourth plate 876a may form the space S1. When the right slider 860a moves closer to the motor assembly 810, the right lead screw 840a may be accommodated in the space S1 provided by the cover 872a, or may escape. By the space S1 provided by the cover 872a, the right slider 860a may move closer to the motor assembly 810, compared to the case where the cover 872a is not provided. That is, as the cover 872a provides the space S1 formed therein, a movable range of the right slider 860a may be expanded. In addition, as the right lead screw 840a is accommodated in the cover 872a, there is an effect of reducing the size of the housing 30 (see FIG. 2).

Further, the cover 872a may limit a minimum value of an angle theta S formed between the second arm 912a and the base 31. When the angle theta S is sufficiently reduced, the third plate 875a of the cover 872a may come into contact with the second arm 912a and may support the second arm 912a. As the third plate 875a supports the second arm 912a, the minimum value of theta S may be limited, and sagging of the second arm 912a may be prevented. That is, the cover 872a may serve as a stopper for preventing sagging of the second arm 912a. In addition, as the third plate 875a limits the minimum value of theta S, an initial load for raising the second arm 912a may be reduced.

The lead screws 840a and 840b may be driven by one motor assembly 810. As the lead screws 840a and 840b are driven by one motor assembly 810, the second arms 912a and 912b may be raised while being symmetric to each other. However, when the lead screws 840a and 840b are driven by one motor assembly 810, a load applied to the motor assembly 810 for raising the second arms 912a and 912b may be extremely increased. In this case, the third plate 875a limits the minimum value of theta S, thereby reducing the load applied to the motor assembly 810 for raising the second arms 912a and 912b.

A structure formed by the left lead screw 840b, the left slider 860b, the left rod 870b, and the left link 910b may be symmetric to the aforementioned structure formed by the right lead screw 840a, the right slider 860a, the right rod 870a, and the right link 910a. In this case, a symmetry axis may be a symmetry axis ys of the motor assembly 810.

Figure 47:
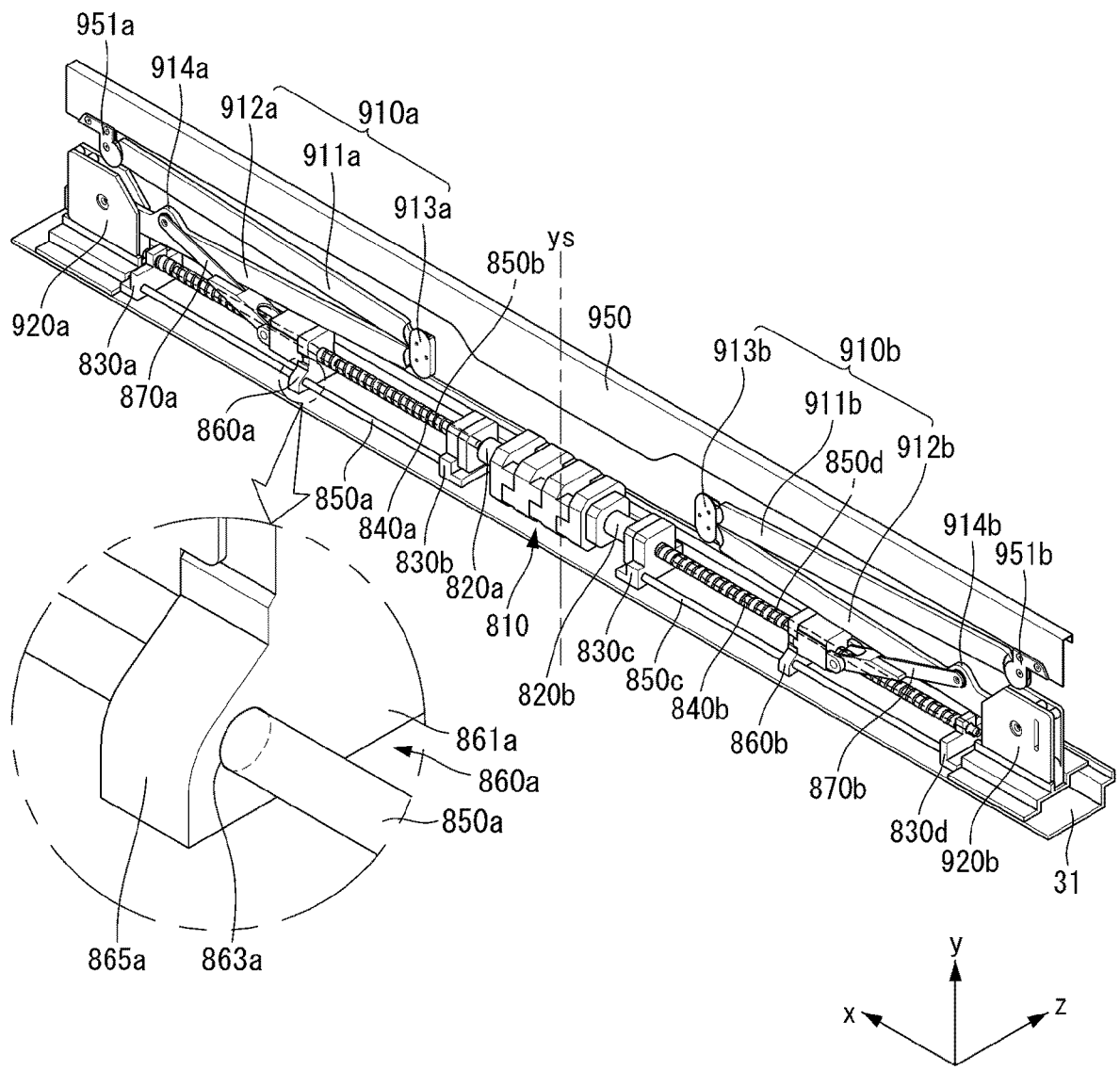

Referring to FIG. 47, guides 850a, 850b, 850c, and 850d may be connected to the bearings 830a, 830b, 830c, and 830d. The guides 850a, 850b, 850c, and 850d may include right guides 850a and 850b disposed on the right side of the motor assembly 810, and left guides 850c and 850d disposed on the left side of the motor assembly 810.

First sides of the right guides 850a and 850b may be connected to the first right bearing 830a, and second sides thereof may be connected to the second right bearing 830b. The right guides 850a and 850b may be disposed parallel to the right lead screw 840a. Alternatively, the right guides 850a and 850b may be spaced apart from the right lead screw 840a.

The right guides 850a and 850b may include a first right guide 850a and a second right guide 850b. The first right guide 850a and the second right guide 850b may be spaced apart from each other. The right lead screw 840a may be disposed between the first right guide 850a and the second right guide 850b.

The right slider 860a may include a protrusion. Alternatively, the display device may include a protrusion formed on the right slider 860a. The protrusion may be formed on the body of the slider. The protrusion may include a front protrusion (not shown) protruding from the body 861a of the right slider 860a in the positive z-axis direction, and a rear protrusion 865a protruding from the body of the slider in the negative z-axis direction.

The first right guide 850a may pass through the rear protrusion 865a. Alternatively, a first hole 863a formed in the rear protrusion may be included, and the first right guide 850a may pass through the first hole 863a. The first hole 863a may be formed in the x-axis direction. The first hole 863a may be referred to as a hole 863a.

The second right guide (not shown) may pass through the front protrusion (not shown). Alternatively, a second hole (not shown) formed in the front protrusion may be included, and the second right guide may pass through the second hole. The second hole may be formed in the x-axis direction.

When the right slider 860a moves along the right lead screw 840a, the right guides 850a and 50b may guide more stable movement. As the right guides 850a and 850b stably guide the right slider 860a, the right slider 860a may move along the right lead screw 840a without rotating with respect to the right lead screw 840a.

A structure formed by the left guides 850c and 850d, the left bearings 830a, 830b, 830c, and 830d, the left slider 860b, and the left lead screw 840b may be symmetric to the aforementioned structure formed by the right guides 850a and 850b, the right bearings 830a, 830b, 830c, and 830d, the right slider 860a, and the right lead screw 840a. In this case, a symmetry axis may be a symmetry axis ys of the motor assembly 810.

Figure 48:
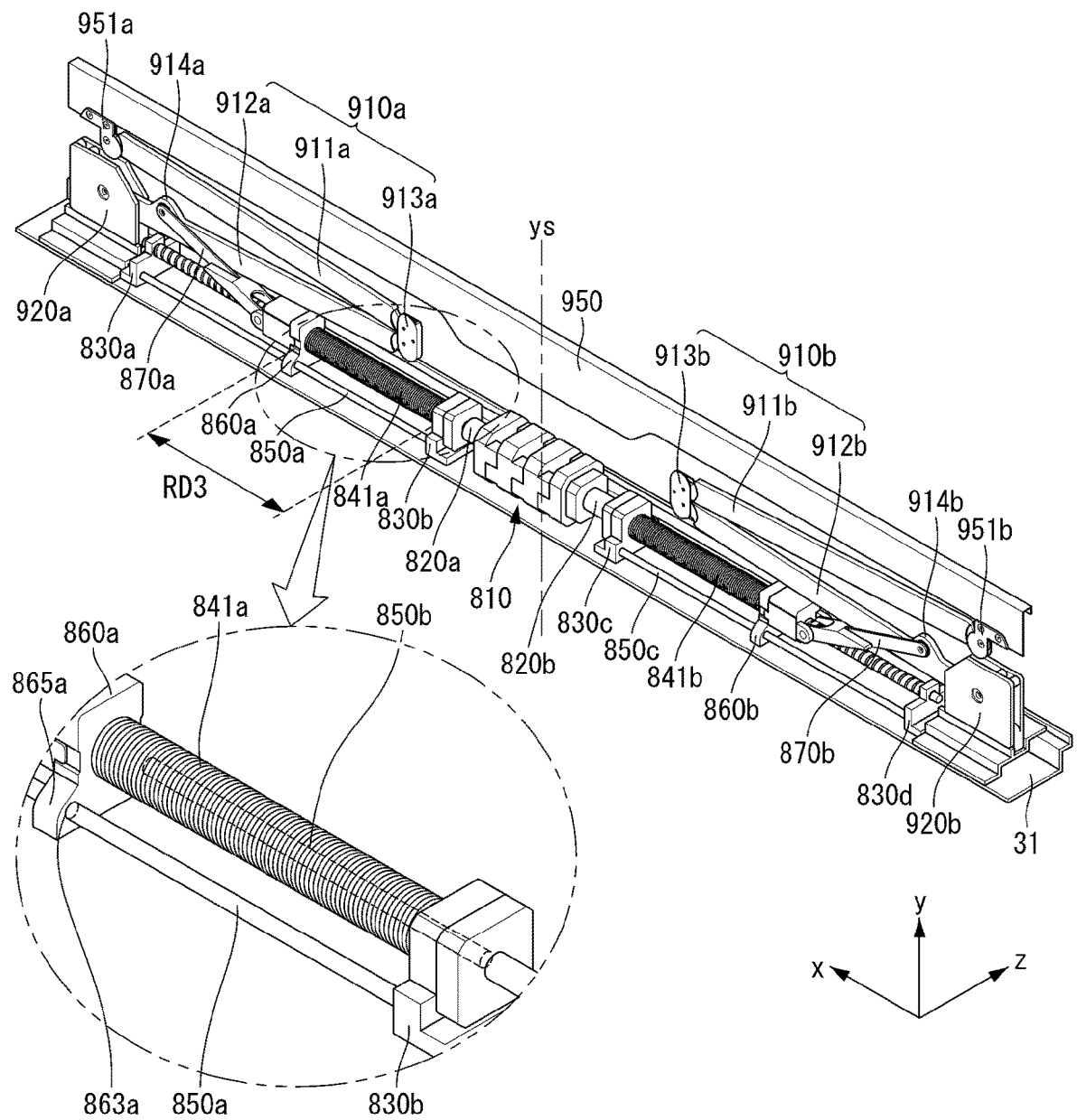

Referring to FIG. 48, first springs 841a and 841b may be inserted into the lead screws 840a and 840b. Alternatively, the lead screws 840a and 840b may pass through the first springs 841a and 841b. The first springs 841a and 841b may include a first right spring 841a disposed on the right side of the motor assembly 810, and a first left spring 841b disposed on the left side of the motor assembly 810.

The first right spring 841a may be disposed between the right slider 860a and the second right bearing 830b. A first end of the first right spring 841a may come into contact or may be separated from the right slider 860a. A second end of the first right spring 841a may come into contact or may be separated from the second right bearing 830b.

When the second arm 912a fully lies with respect to the base 31, a distance between the right slider 860a and the second right bearing 830b may be a distance RD3. While not being compressed or stretched, the first right spring 841a may have a greater length than the distance RD3. Accordingly, when the second arm 912a fully lies with respect to the base 31, the first right spring 841a may be compressed between the right slider 860a and the second right bearing 830b. Further, the first right spring 841a may provide a restoring force to the right slider 860a in the positive x-axis direction.

When the second arm 912a changes from a fully lying position to a raised position with respect to the base 31, the restoring force provided by the first right spring 841a may assist in raising the second arm 912a. As the first right spring 841a assists in raising the second arm 912a, load applied to the motor assembly 810 may be reduced.

The lead screws 840a and 840b may be driven by one motor assembly 810. As the lead screws 840a and 840b are driven by one motor assembly 810, the second arms 912a and 912b may be raised while being symmetric to each other. However, when the lead screws 840a and 840b are driven by one motor assembly 810, a load applied to the motor assembly 810 for raising the second arms 912a and 912b may be extremely increased. In this case, the first right spring 841a assists in raising the second arm 912a, thereby reducing the load on the motor assembly 810 and the load applied to the motor assembly 810 for raising the second arm 912a.

Alternatively, when the second arm 912a changes from a raised position to a fully lying position with respect to the base 31, the restoring force provided by the first right spring 841a may lessen the impact caused when the second arm 912a lies with respect to the base 31. That is, when the second arm 912a lies with respect to the base 31, the first right spring 841a may act as a damper. As the first right spring 841a acts as a damper, the load on the motor assembly 810 may be reduced.

A structure formed by the first left spring 841b, the left bearings 830a, 830b, 830c, and 830d, the left slider 860b, the left lead screw 840b, and the second arm 912a may be symmetric to the aforementioned structure formed by the first right spring 841a, the right bearings 830a, 830b, 830c, and 830d, the right slider 860a, the right lead screw 840a, and the second arm 912a. In this case, a symmetry axis may be a symmetry axis ys of the motor assembly 810.

Figure 49:
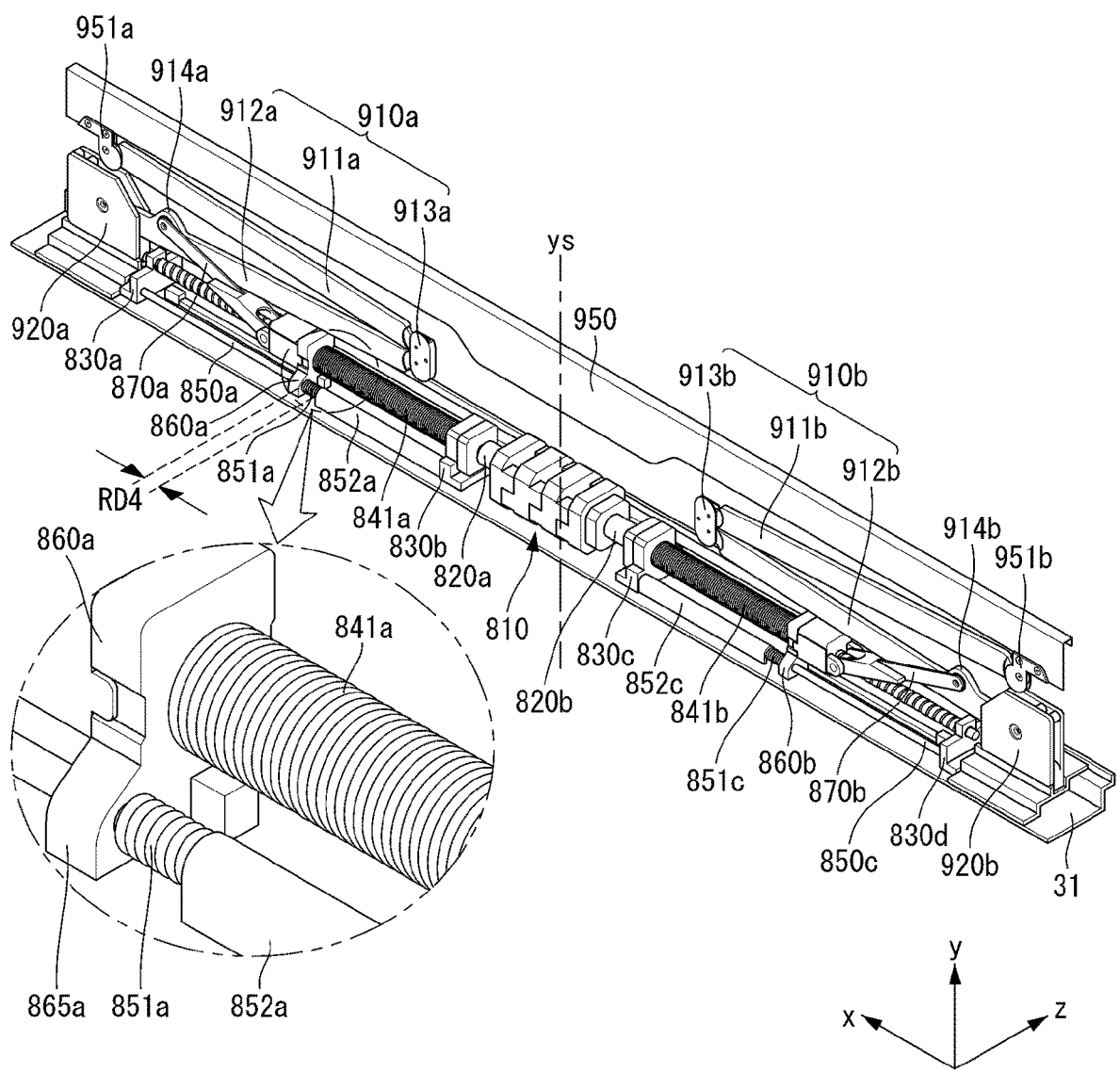

Referring to FIG. 49, the second springs 851a and 851b may be inserted into the guides 850a, 850b, 850c, and 850d. Alternatively, the guides 850a, 850b, 850c, and 850d may pass through the second springs 851a and 851b. The second springs 851a and 851b may include a second right spring 851a disposed on the right side of the motor assembly 810, and a second left spring 851b disposed on the left side of the motor assembly 810.

There may be a plurality of second right springs 851a. The second right springs 851a may include springs 940a and 940b inserted into the first right guide 850a, and springs 940a and 940b inserted into the second right guide 850b. Alternatively, the second right springs 851a may include springs 940a and 940b through which the first right guide 850a passes, and springs 940a and 940b through which the second right guide 850b passes.

The guides 850a, 850b, 850c, and 850d may include stopper protrusions 852a and 852b. The stopper protrusions 852a and 952b may include a right stopper protrusion 852a disposed on the right side of the motor assembly 810, and a left stopper protrusion 852b disposed on the left side of the motor assembly 810.

The right stopper protrusion 852a may be disposed between the right slider 860a and the second right bearing 830b. Further, the second right spring 851a may be disposed between the right slider 860a and the second right bearing 830b. A first end of the second right spring 851a may come into contact with or may be separated from the right slider 860a. A second end of the second right spring 851a may come into contact with or may be separated from the right stopper protrusion 852a.

When the second arm 912a fully lies with respect to the base 31, a distance between the right slider 860a and the right stopper protrusion 852a may be a distance RD4. While not being compressed or stretched, the second right spring 851a may have a greater length than the distance RD4. Accordingly, when the second arm 912a fully lies with respect to the base 31, the second right spring 851a may be compressed between the right slider 860a and the second stopper protrusion 852a. Further, the second right spring 851a may provide a restoring force to the right slider 860a in the positive x-axis direction.

When the second arm 912a changes from a fully lying position to a raised position with respect to the base 31, the restoring force provided by the second right spring 851a may assist in raising the second arm 912a. As the second right spring 851a assists in raising the second arm 912a, load applied to the motor assembly 810 may be reduced.

The lead screws 840a and 840b may be driven by one motor assembly 810. As the lead screws 840a and 840b are driven by one motor assembly 810, the second arms 912a and 912b may be raised while being symmetric to each other. However, when the lead screws 840a and 840b are driven by one motor assembly 810, a load applied to the motor assembly 810 for raising the second arms 912a and 912b may be extremely increased. In this case, the second right spring 851a assists in raising the second arm 912a, thereby reducing the load on the motor assembly 810 and the load applied to the motor assembly 810 for raising the second arm 912a.

Alternatively, when the second arm 912a changes from a raised position to a fully lying position with respect to the base 31, the restoring force provided by the second right spring 851a may lessen the impact caused when the second arm 912a lies with respect to the base 31. That is, when the second arm 912a lies with respect to the base 31, the second right spring 851*a* may act as a damper. As the second right spring 851*a* acts as a damper, the load of the motor assembly 810 may be reduced.

A structure formed by the second left spring 851*b*, the left stopper protrusion 852*b*, the left slider 860*b*, the left guides 850*c* and 850*d*, and the second arm 912*a* may be symmetric to the aforementioned structure formed by the second right spring 851*a*, the right stopper protrusion 852*a*, the right slider 860*a*, the right guides 850*a* and 850*b*, and the second arm 912*a*. In this case, a symmetry axis may be a symmetry axis ys of the motor assembly 810.

Figure 50:
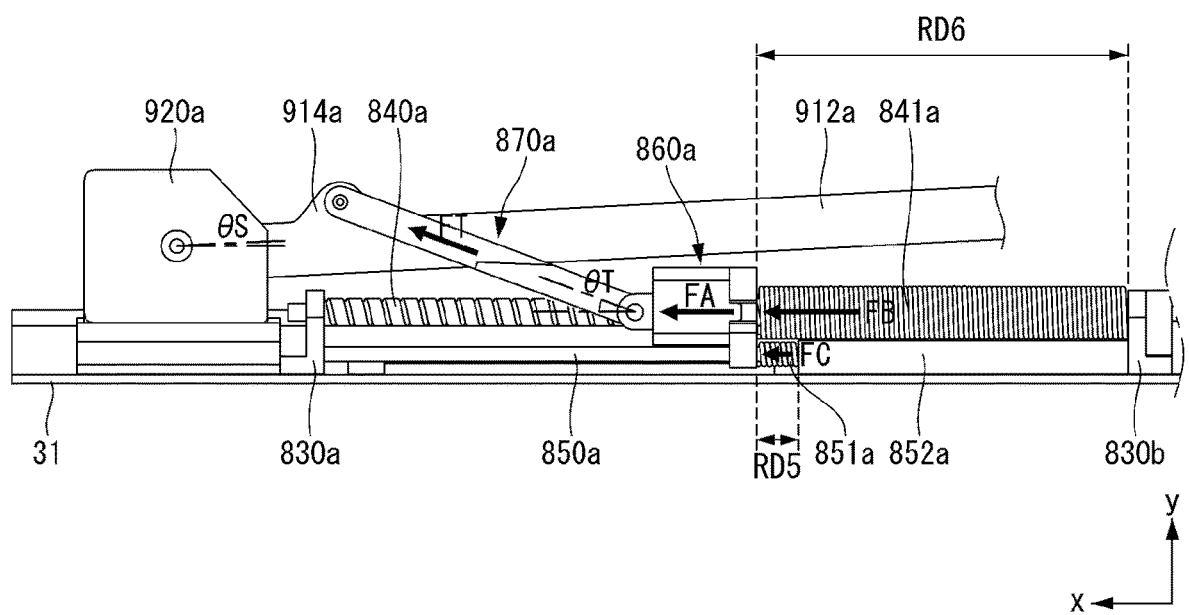
Figure 51:
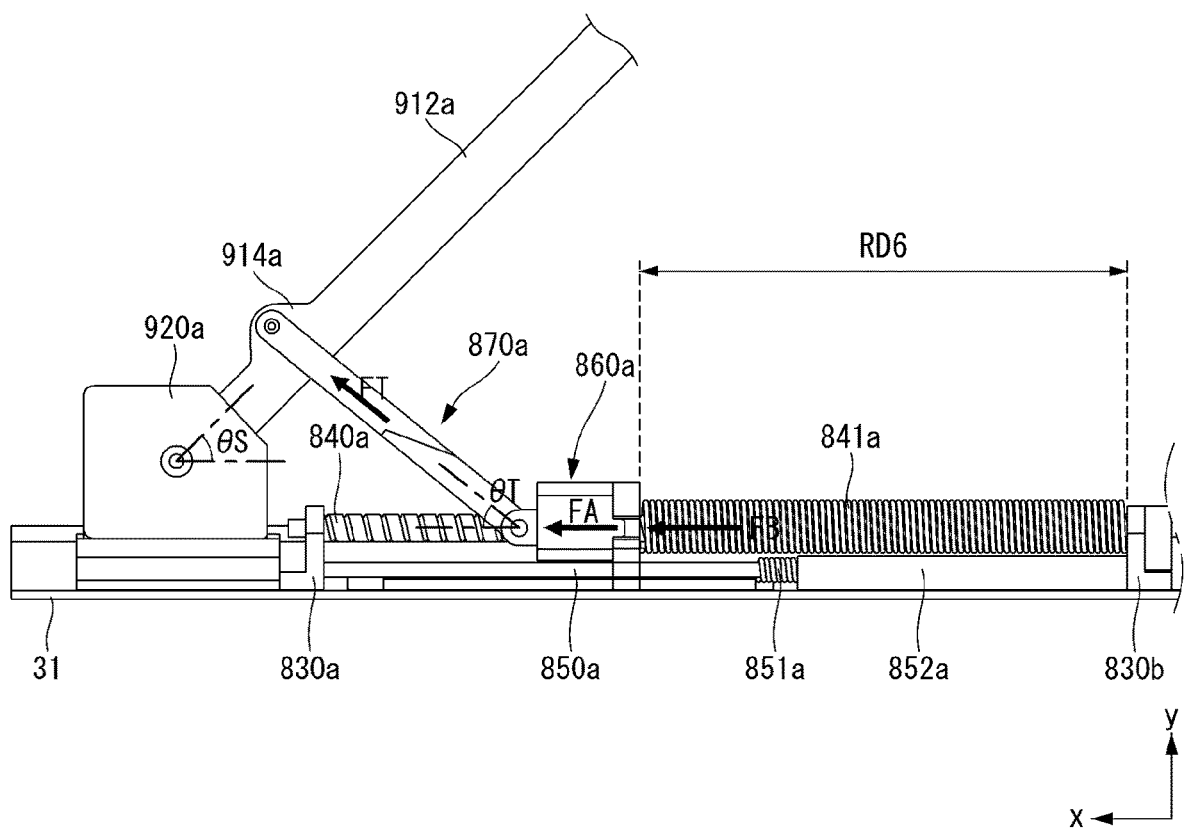
Figure 52:
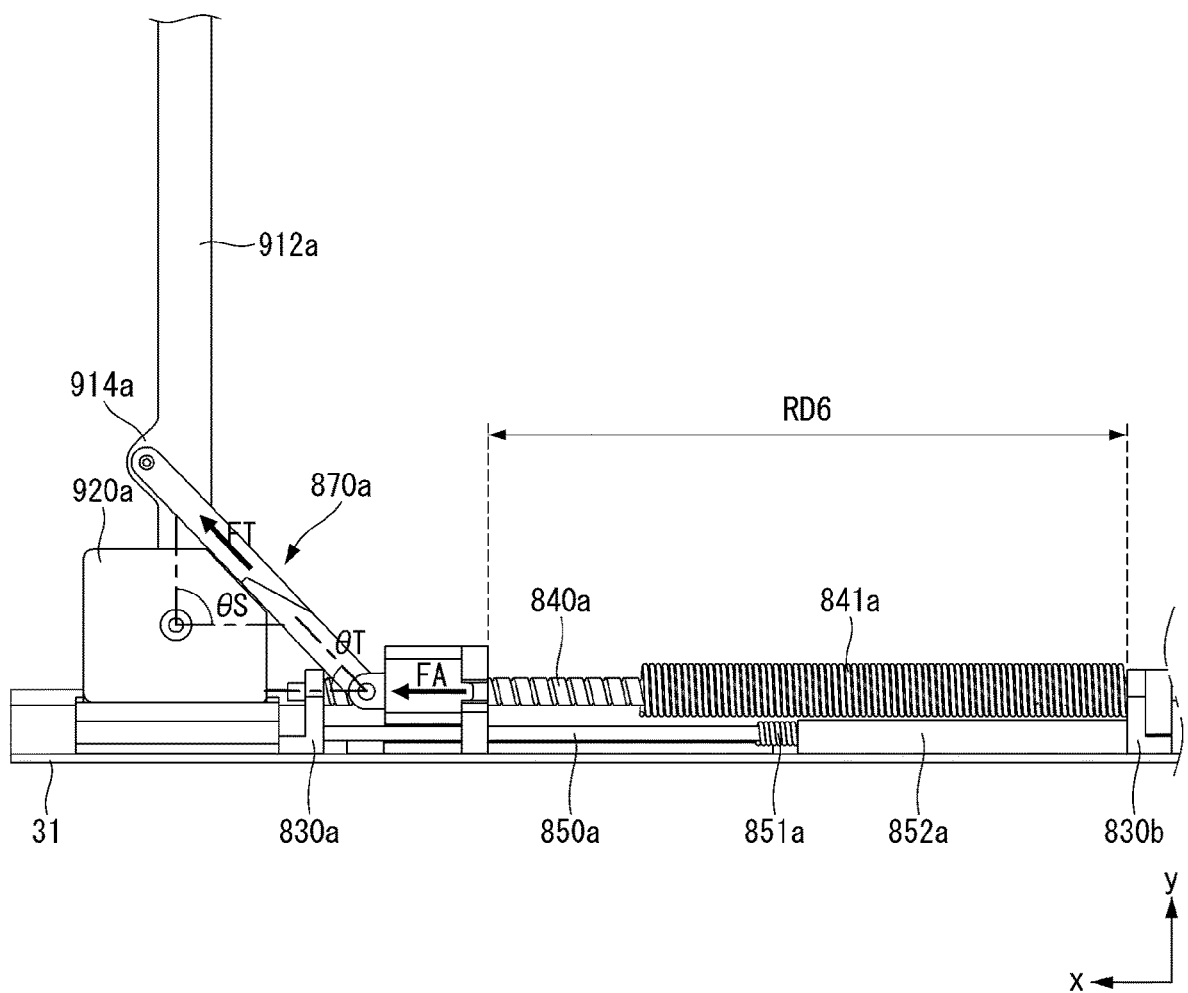

Referring to FIGS. 50 to 52, the second arm 912*a* may be raised by receiving the restoring force from the first right spring 841*a* and the second right spring 851*a*.

An angle formed between the second arm 912*a* and the base 31 may be an angle theta S. An angle formed between the right rod 870*a* and the base 31 may be an angle theta T. A force required for the motor assembly 810 to move the right slider 860*a* in the positive x-axis direction may be FA. A force applied by the first right spring 841*a* to the right slider 860*a* may be FB. A force applied by the second right spring 851*a* to the right slider 860*a* may be FC. A force transmitted by the right rod 870*a* to the second arm 912*a* may be FT.

When the second arm 912*a* fully lies with respect to the base 31, the angles theta S and theta T may have minimum values. When the second arm 912*a* changes from a fully lying position to a raised position with respect to the second base 31, the angles theta S and theta T may gradually increase.

When the second arm 912*a* fully lies with respect to the base 31, the first right spring 841*a* may be compressed. The compressed first right spring 841*a* may provide the restoring force FB to the right slider 860*a*. The restoring force FB may be applied in the positive x-axis direction. When the second arm 912*a* fully lies with respect to the base 31, compression displacement of the first right spring 841*a* may be maximum, and a magnitude of the restoring force FB may have a maximum value. When the second arm 912*a* changes from a fully lying position to a raised position with respect to the base 31, the compression displacement of the first right spring 841*a* may gradually decrease, and the magnitude of the restoring force FB may gradually decrease.

When the second arm 912*a* fully lies with respect to the base 31, the second right spring 851*a* may be compressed. The compressed second right spring 851*a* may provide the restoring force FC to the right slider 860*a*. The restoring force FC may be applied in the positive x-axis direction. When the second arm 912*a* fully lies with respect to the base 31, compression displacement of the second right spring 851*a* may be maximum, and a magnitude of the restoring force FC may have a maximum value. When the second arm 912*a* changes from a fully lying position to a raised position with respect to the base 31, the compression displacement of the second right spring 851*a* may gradually decrease, and the magnitude of the restoring force FC may gradually decrease.

The force FT transmitted by the right rod 870*a* to the second arm 912*a* may be a resultant force composed of the force FA required for the motor assembly 810 to move the right slider 860*a* in the positive x-axis direction, the restoring force FB of the first right spring 841*a*, and the restoring force FC of the second right spring 851*a*.

When the second arm 912*a* starts to be raised after fully lying with respect to the base 31, the motor assembly 810 may be under a maximum load. In this case, a magnitude of the restoring force FB provided by the first right spring 841*a* may be maximum. Further, the restoring force FC provided by the second springs 851*a* and 851*b* may be maximum.

When the second arm 912*a* changes from a fully lying position to a raised position with respect to the base 31, the restoring force provided by the first right spring 841*a* and the second right spring 851*a* may assist in raising the second arm 912*a*. As the first right spring 841*a* and the second right spring 851*a* assist in raising the second arm 912*a*, the load on the motor assembly 810 may be reduced.

The first right spring 841*a* and the second right spring 851*a* may simultaneously provide the restoring force (a resultant force of the restoring force FB and the restoring force FC) to the right slider 860*a*. The restoring force (the resultant force of the restoring force FB and the restoring force FC) may be provided to the right slider 860*a* until a distance RD5 between the right slider 860*a* and the right stopper protrusion 852*a* becomes equal to a length of the second right spring 851*a*.

When the distance RD5 between the right slider 860*a* and the right stopper protrusion 852*a* becomes equal to the length of the second right spring 851*a*, compression displacement of the second right spring 851*a* may become zero. When the compression displacement of the second right spring 851*a* becomes zero, the restoring force FC provided by the second right spring 851*a* to the right slider 860*a* may become zero.

When the distance RD5 between the right slider 860*a* and the right stopper protrusion 852*a* is greater than the length of the second right spring 851*a*, only the first right spring 841*a* may provide the restoring force FB to the right slider 860*a*. The restoring force FB may be provided to the right slider 860*a* until a distance RD6 between the right slider 860*a* and the second right bearing 830*b* becomes equal to a length of the first right spring 841*a*.

When the distance RD6 between the right slider 860*a* and the right second bearing 830*b* becomes equal to the length of the first right spring 841*a*, compression displacement of the first right spring 841*a* may become zero. When the compression displacement of the first right spring 841*a* becomes zero, the restoring force FB provided by the first right spring 841*a* to the right slider 860*a* may become zero.

When the distance RD6 between the right slider 860*a* and the second right bearing 830*b* is greater than the length of the first right spring 841*a*, the motor assembly 810 may raise the second arm 912*a* without receiving the restoring force from the first right spring 841*a* or the second right spring 851*a*.

A structure formed by the first left spring 841*b*, the second left spring 851*b*, the left stopper protrusion 852*b*, the left slider 860*b*, the left guides 850*c* and 850*d*, the left lead screw 840*b*, the left rod 870*b*, and the second arm 912*a* may be symmetric to the aforementioned structure formed by the first right spring 841*a*, the second right spring 851*a*, the right stopper protrusion 852*a*, the right slider 860*a*, the right guides 850*a* and 850*b*, the right lead screw 840*a*, the right rod 870*a*, and the second arm 912*a*. In this case, a symmetry axis may be a symmetry axis ys of the motor assembly 810.

Figure 53:
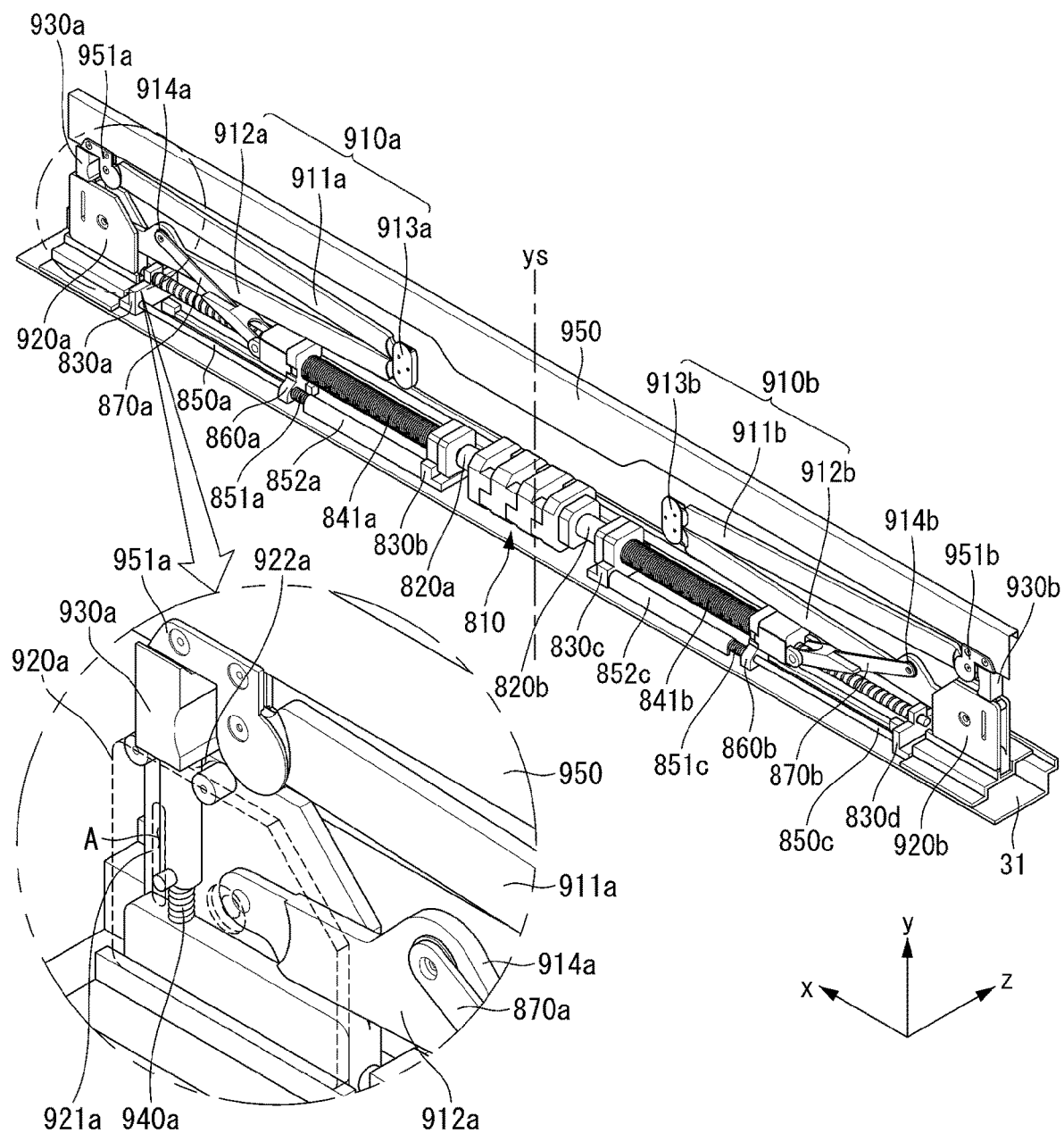

Referring to FIG. 53, pushers 930*a* and 930*b* may be connected to the link mounts 920*a* and 920*b*. The pushers 930*a* and 930*b* may include a right pusher 930*a* disposed on the right side of the motor assembly 810, and a left pusher 930*b* disposed on the left side of the motor assembly 810.

The link mounts 920*a* and 920*b* may form an accommodation space A. The accommodation space A may serve to accommodate the springs 940*a* and 940*b* and the pushers 930*a* and 930*b*. The springs 940*a* and 940*b* may include the right spring 940*a* disposed on the right side of the motor assembly 810, and a left spring 940b disposed on the left side of the motor assembly 810. The accommodation space A may be referred to as an internal space A.

The link mounts 920a and 920b may have a first hole 922a for connecting the accommodation space A and an external space (a first hole corresponding to the link mount 920b is not shown). The first hole 922a may be formed in an upper surface of the link mounts 920a and 920b. The first hole 922a may be referred to as a hole 922a.

The pushers 930a and 930b may be disposed perpendicular to the base 31. Alternatively, the pushers 930a and 930b may be disposed parallel to the y-axis. The springs 940a and 940b may be disposed perpendicular to the base 31. Alternatively, the springs 940a and 940b may be disposed parallel to the y-axis.

The pushers 930a and 930b may include first parts 931a and 931b and second parts 932a and 932b. The second parts 932a and 932b may be connected to lower sides of the first parts 931a and 931b. Lower ends of the second parts 932a and 932b may be connected to the springs 940a and 940b. All or a portion of the second parts 932a and 932b may be accommodated in the accommodation space A formed by the link mounts 920a and 920b. The second parts 932a and 932b may have the same diameter as a diameter of the first hole 922a, or may have a smaller diameter than the diameter of the first hole 922a. The second parts 932a and 932b may pass through the first hole 922a.

The first parts 931a and 931b may be disposed outside of the link mounts 920a and 920b. Alternatively, the first parts 931a and 931b may be disposed outside of the accommodation space A of the link mounts 920a and 920b. The first parts 931a and 931b may have a greater diameter than the diameter of the first hole 922a.

The first parts 931a and 931b may come into contact with or may be separated from the link brackets 951a and 951b. For example, when the second arms 912a and 912b fully lie with respect to the base 31, the first parts 931a and 931b may come into contact with the link brackets 951a and 951b. Alternatively, when second arms 912a and 912b are fully raised with respect to the base 31, the first parts 931a and 931b may be separated from the link brackets 951a and 951b.

When the first parts 931a and 931b come into contact with the link brackets 951a and 951b, the pushers 930a and 930b may receive force from the link brackets 951a and 951b. The pushers 930a and 930b may receive a downward force. The pushers 930a and 930b may receive the force in the negative y-axis direction. Alternatively, the link brackets 951a and 951b may press the pushers 930a and 930b. The link brackets 951a and 951b may downwardly press the pushers 930a and 930b. Alternatively, the link brackets 951a and 951b may press the pushers 930a and 930b in the negative y-axis direction.

When the first parts 931a and 931b receive the force, the springs 940a and 940b may be compressed. The compressed springs 940a and 940b may provide a restoring force to the pushers 930a and 930b. The restoring force may be opposite to a direction of the force applied to the first parts 931a and 931b. Alternatively, the restoring force may be applied in the positive y-axis direction.

The link mounts 920a and 920b may have a second hole 921a (a second hole corresponding to the link mount 920b is not shown). The second hole 921a may connect the accommodation space A and an external space. All or a portion of the springs 940a and 940b may be exposed to the outside through the second hole 921a. All or a portion of the pushers 930a and 930b may be exposed to the outside through the second hole 921a. During maintenance or repair of the display device, service providers may check an operating state of the pushers 930a and 30b through the second hole 921a. The second hole 921a may provide convenience in repair and maintenance for the service providers.

Figure 54:
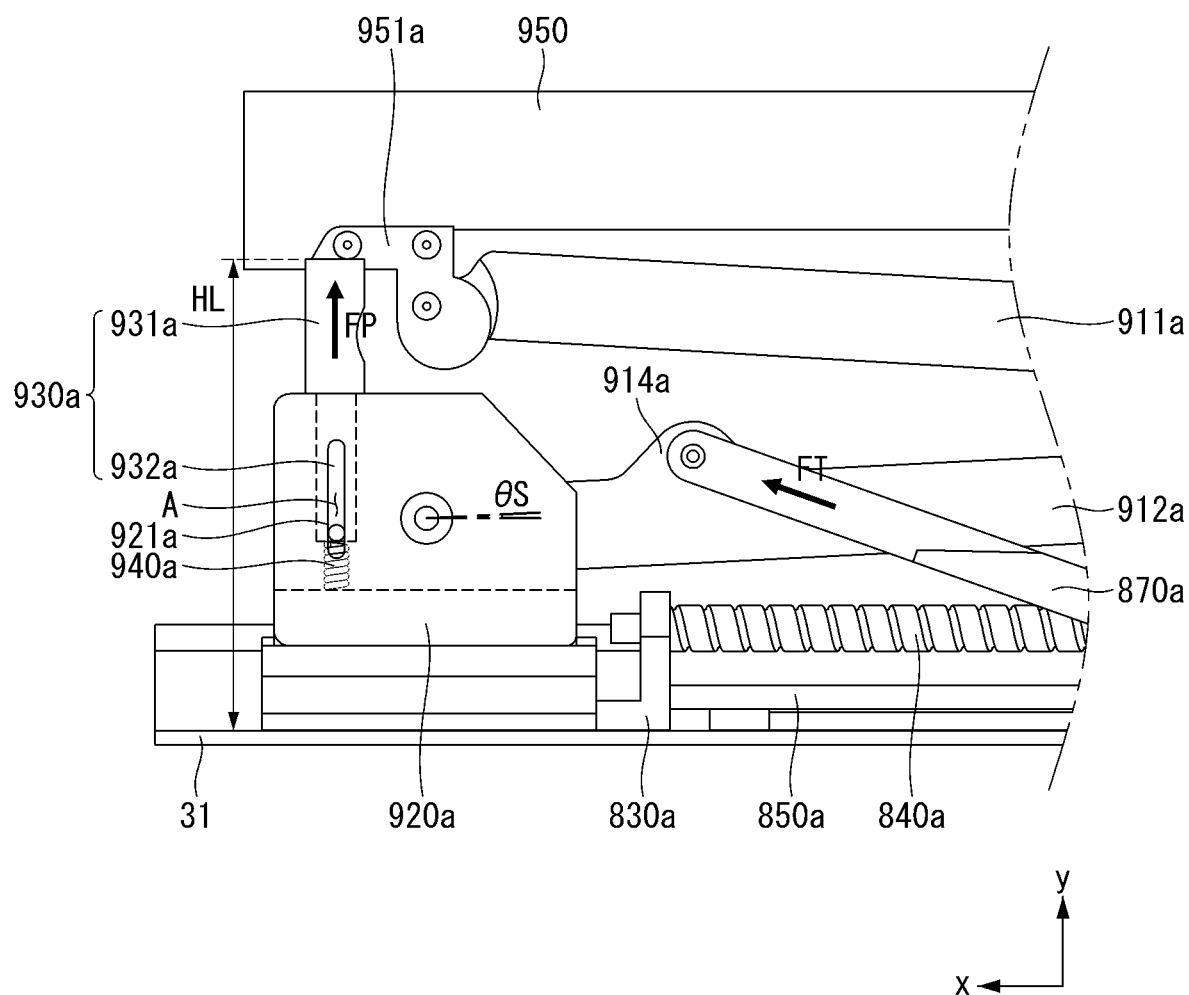
Figure 55:
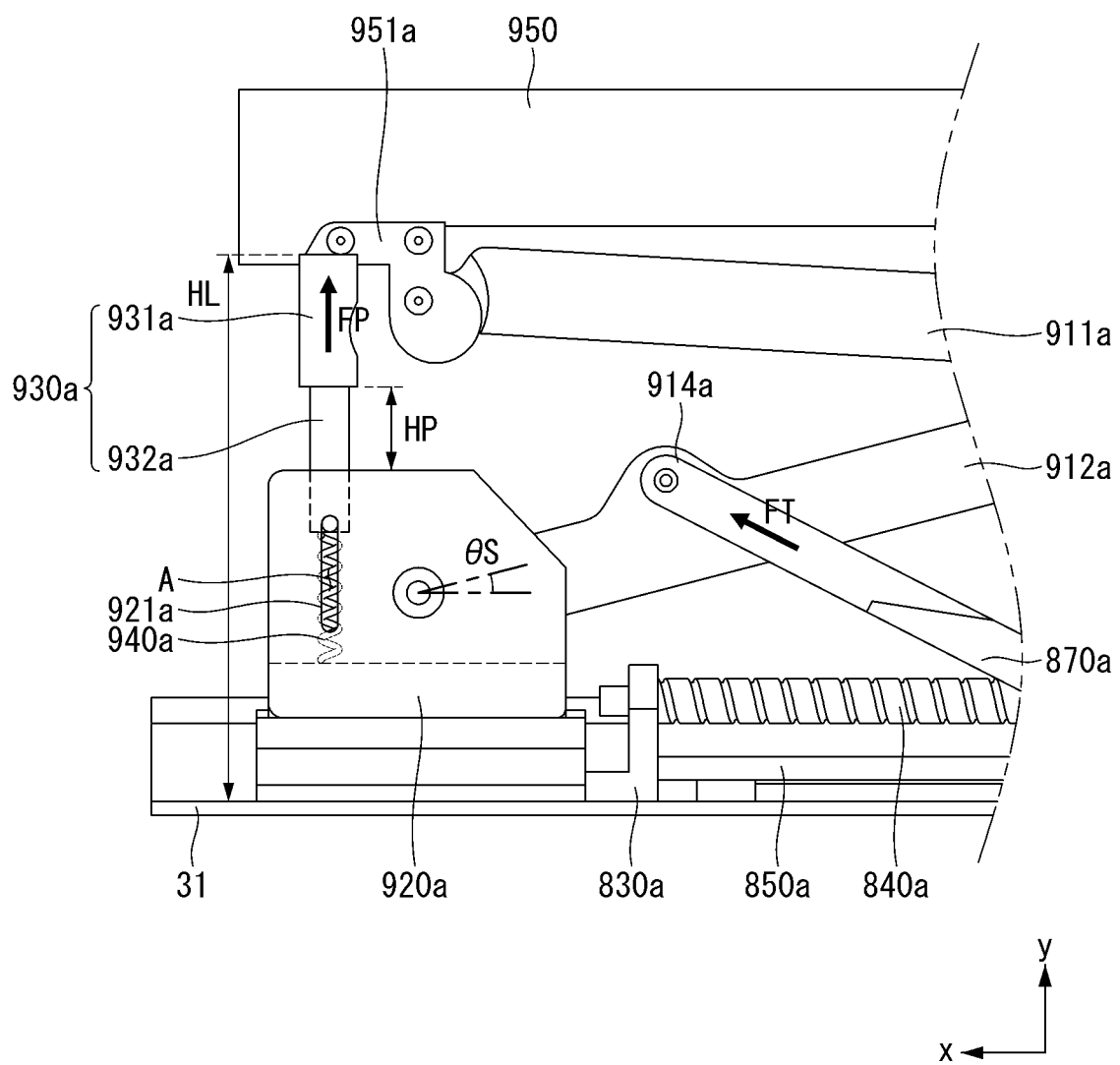
Figure 56:
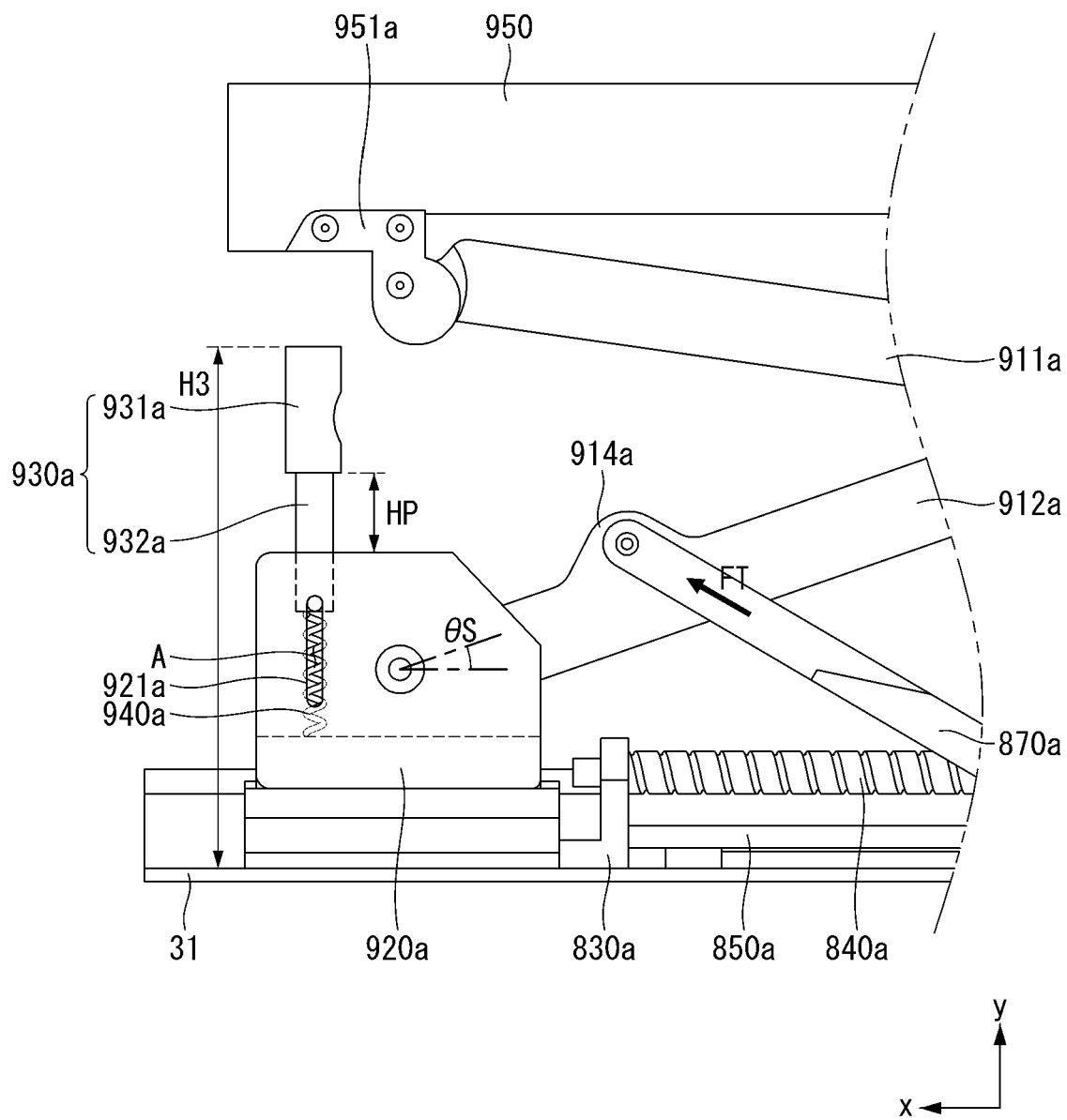

Referring to FIGS. 54 to 56, the right link 910a may be raised by receiving a restoring force from the right pusher 930a. The following description will be given based on the right link 910a.

An angle formed between the second arm 912a and the base 31 may be an angle theta S. A force transmitted by the right rod 870a to the second arm 912a may be FT. A force transmitted by the right pusher 930a to the right link bracket 951a may be FP.

Referring to FIG. 54, when the second arm 912a fully lies with respect to the base 31, the angle theta S may have a minimum value. The right spring 940a connected to the right pusher 930a may be compressed to the maximum, and a magnitude of the restoring force FP may have a maximum value. The compressed right spring 940a may provide the restoring force FP to the right pusher 930a. The right pusher 930a may transmit the restoring force FP to the right link bracket 951a. The restoring force FP may be applied in the positive y-axis direction.

When the second arm 912a fully lies with respect to the base 31, a distance HL from the base 31 to the right pusher 930a may have a minimum value. The first part 931a of the right pusher 930a may protrude to the outside of the right link mount 920a, and all of the second part 932a of the right pusher 930a may be accommodated in an accommodation space 923a of the right link mount 920a.

Referring to FIG. 55, when the second arm 912a changes from a fully lying position to a raised position with respect to the base 31, the angle theta S may gradually increase. Compression displacement of the right spring 940a may gradually decrease, and a magnitude of the restoring force FP may gradually decrease.

As the angle theta S gradually increases, at least a portion of the second part 932a of the right pusher 930a may protrude to the outside of the right link mount 920a. A length of the right pusher 930a that protrudes to the outside of the right link mount 920a may be referred to as a length HP. A distance HL from the base 31 to an upper end of the right pusher 930a may increase by HP, compared to the case where the second arm 912a fully lies with respect to the base 31.

Referring to FIG. 56, while the second arm 912a is raised with respect to the base 31, the right pusher 930a and the right link bracket 951a may be separated from each other. The compression displacement of the right spring 940a may become zero. When the compression displacement of the right spring 940a becomes zero, the restoring force FP provided by the right pusher 930a to the right link bracket 951a may become zero.

In addition, the length HP of the second part 932a of the right pusher 930a that protrudes to the outside of the right link mount 920a, may have a maximum value. Further, the distance HL from the base 31 to the upper end of the right pusher 930a may have a maximum value.

That is, while the right pusher 930a and the right link bracket 951a are in contact with each other, the right pusher 930a applies a restoring force to the right link bracket 951a, thereby assisting in raising the second arm 912a, and reducing the load on the motor assembly 810.

The lead screws 840a and 840b may be driven by one motor assembly 810. As the lead screws 840a and 840b are driven by one motor assembly 810, the second arms 912a and 912b may be raised while being symmetric to each other. However, when the lead screws 840a and 840b are driven by one motor assembly 810, a load applied to the motor assembly 810 for raising the second arms 912a and 912b may be extremely increased. In this case, the right pusher 930a applies the restoring force to the right link bracket 951a, thereby assisting in raising the second arm 912a, and reducing the load on the motor assembly 810.

Alternatively, when the second arm 912a changes from a raised position to a fully lying position with respect to the base 31, the restoring force provided by the right pusher 930a to the right link bracket 951a may lessen the impact caused when the second arm 912a lies with respect to the base 31. That is, the restoring force provided by the right pusher 930a to the right link bracket 951a may act as a damper when the second arm 912a lies with respect to the base 31. As the right pusher 930a acts as a damper, the load on the motor assembly 810 may be reduced.

A structure formed by the left pusher 930b, the left spring 940b, the left link bracket 951b, the left link mount 920b, and the left rod 870b may be symmetric to the aforementioned structure formed by the right pusher 930a, the right spring 940a, the right link bracket 951a, the right link mount 910a, and the right rod 870a. In this case, a symmetry axis may be a symmetry axis ys of the motor assembly 810.

Figure 57:
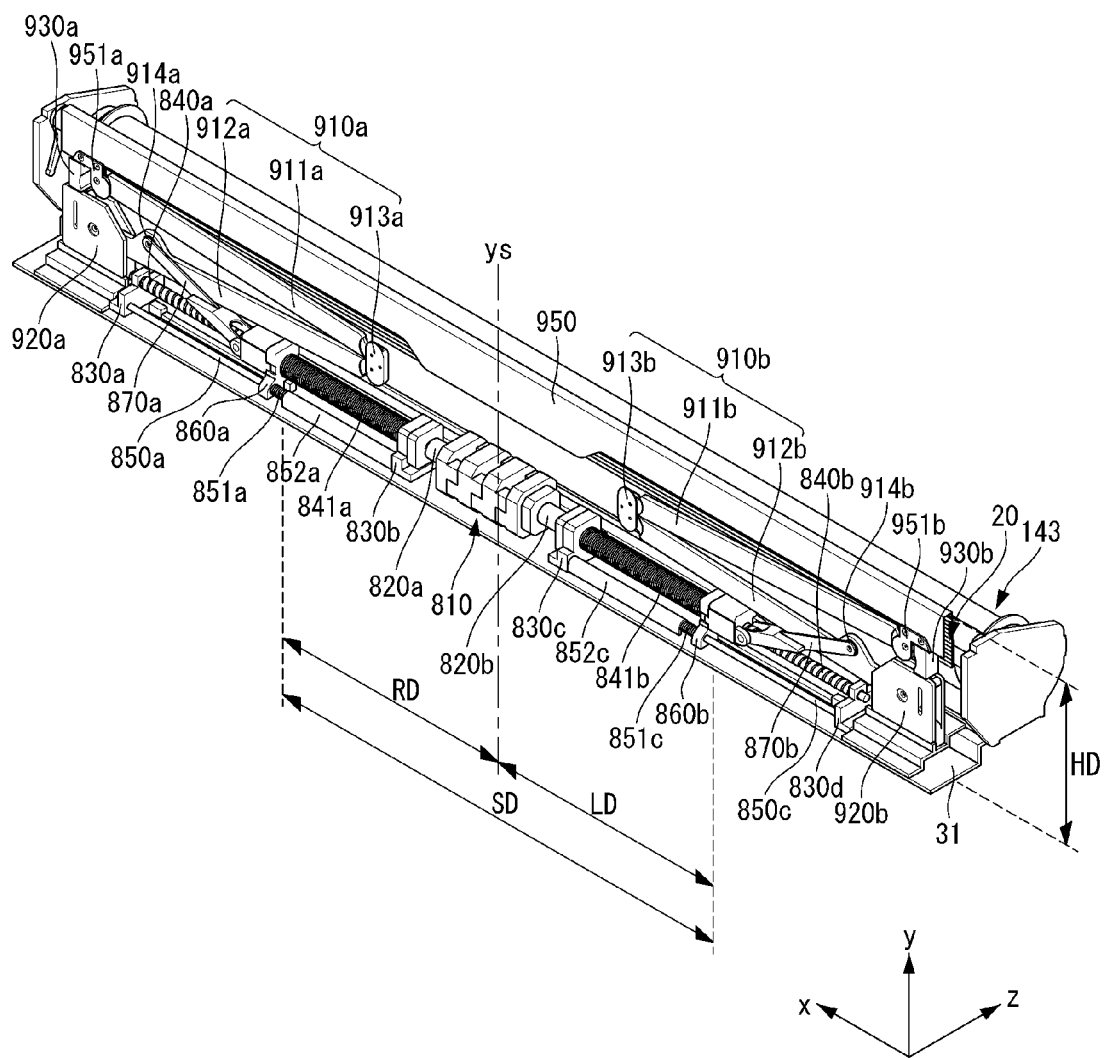
Figure 58:
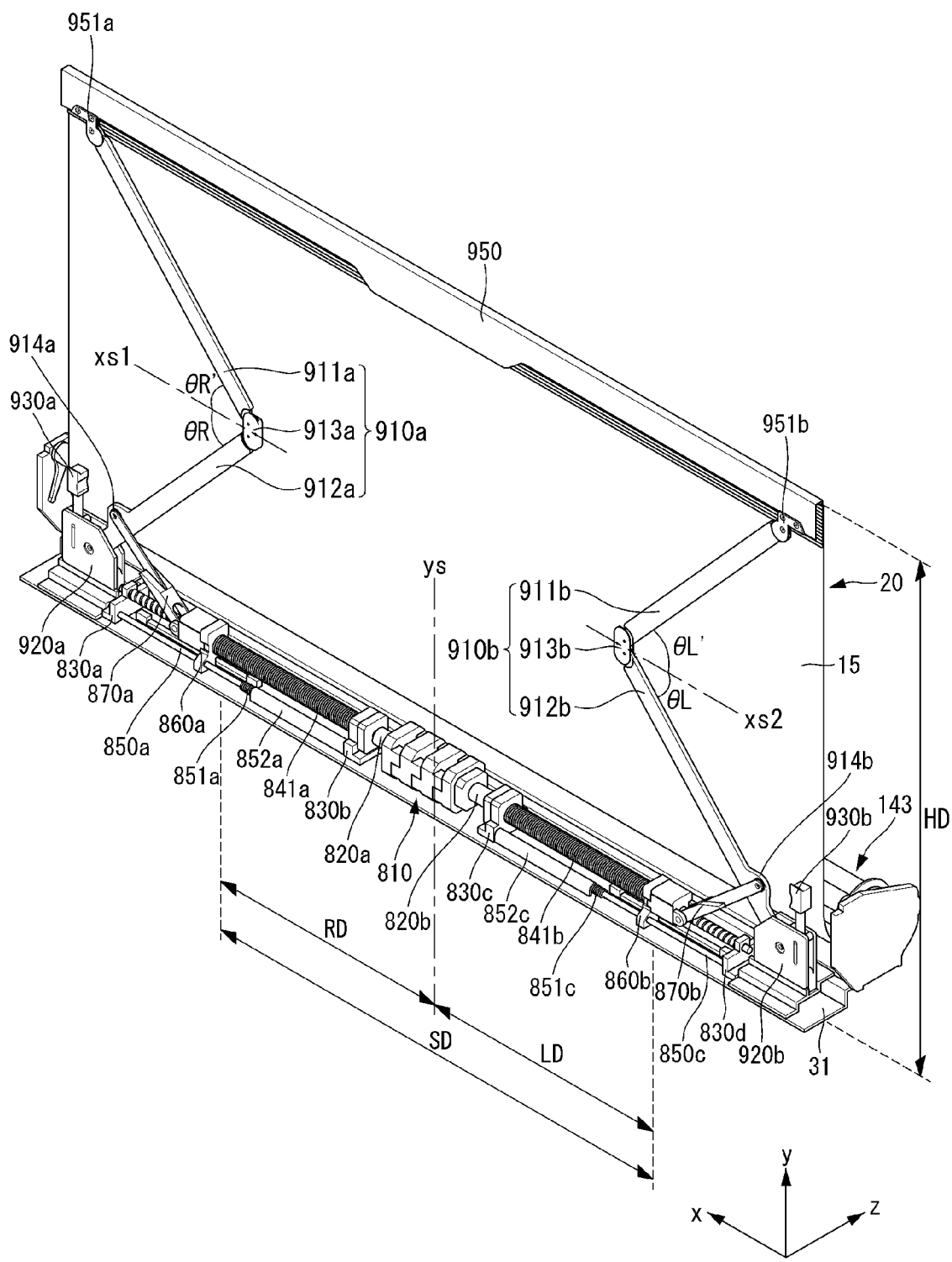
Figure 59:
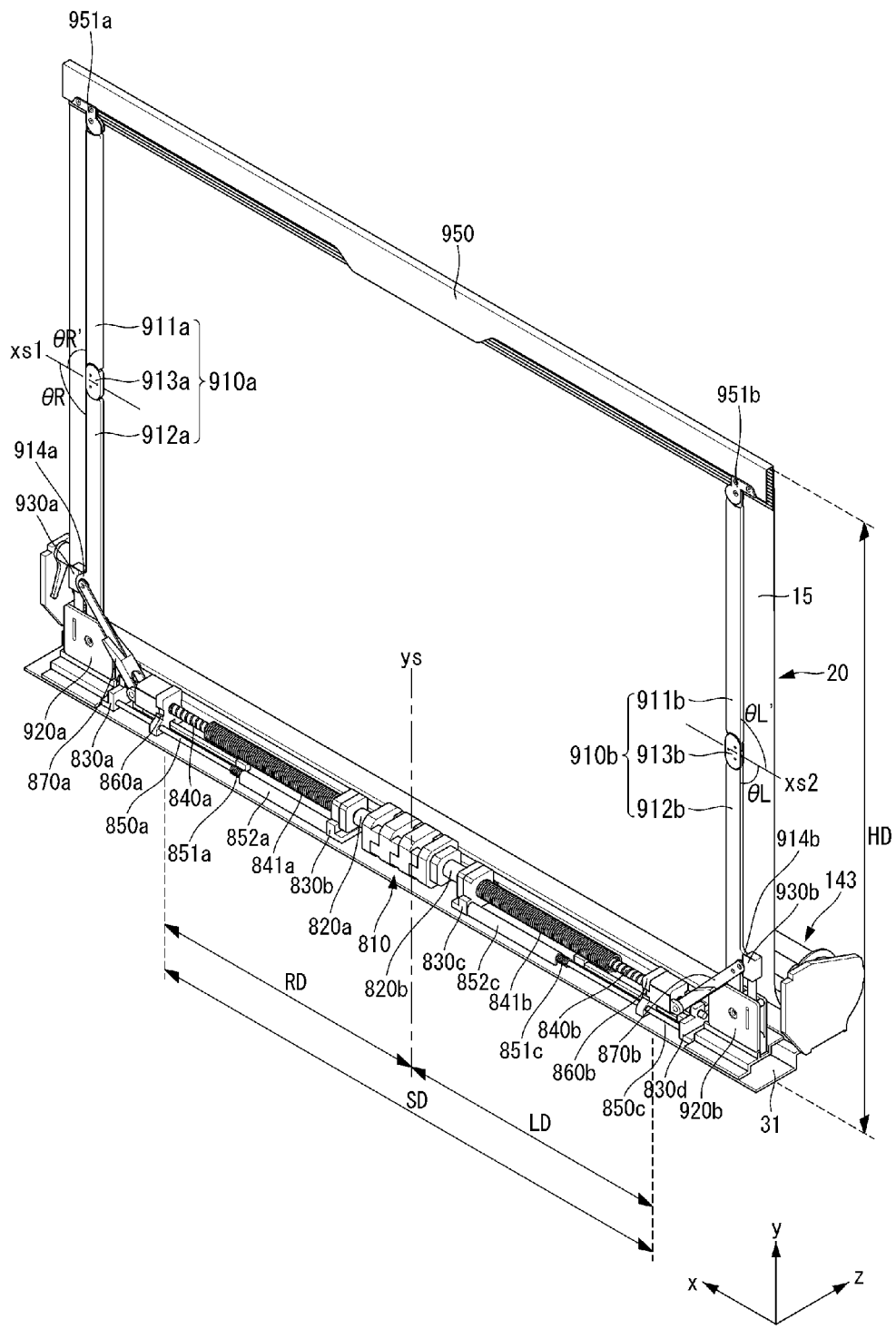

Referring to FIGS. 57 to 59, the panel roller 143 may be mounted on the base 31. The panel roller 143 may be mounted in front of the lead screws 840a and 840b. Alternatively, the panel roller 143 may be disposed parallel to a longitudinal direction of the lead screws 840 and 840b. Alternatively, the panel roller 143 may be spaced apart from the lead screws 840a and 840b.

The display unit 20 may include the display panel 10 and the module cover 15. A lower side of the display unit 20 may be connected to the panel roller 143, and an upper side of the display unit 20 may be connected to the upper bar 75. The display unit 20 may be rolled on or unrolled from the panel roller 143.

A distance from the symmetry axis ys of the motor assembly 810 to the right slider 860a may be a distance RD. A distance from the symmetry axis ys of the motor assembly 810 to the left slider 860b may be a distance LD. A distance from the right slider 860a to the left slider 860b may be a distance SD. The distance SD may be a sum of the distance RD and the distance LD. A distance from the base 31 to the upper end of the display unit 20 may be a distance HD.

Referring to FIG. 57, when the second arms 912a and 912b fully lie with respect to the base 31, the distance SD between the right slider 860a and the left slider 860b may have a minimum value. The distance RD from the symmetry axis ys of the motor assembly 810 to the right slider 860a may be equal to the distance LD from the symmetry axis ys of the motor assembly 810 to the left slider 860b.

When the second arms 912a and 912b fully lie with respect to the base 31, the distance HD from the base 31 to the upper end of the display unit 20 may have a minimum value.

When the second arms 912a and 912b fully lie with respect to the base 31, the first springs 841a and 841b may come into contact with the sliders 860a and 860b. Further, the second springs 851a and 851b may come into contact with the sliders 860a and 860b. In addition, the pushers 930a and 930b may come into contact with the link brackets 951a and 951b.

When the second arms 912a and 912b fully lie with respect to the base 31, an amount of compression of the first springs 841a and 841b may have a maximum value, and a magnitude of the restoring force provided by the first springs 841a and 841b to the sliders 860a and 860b may have a maximum value.

When the second arms 912a and 912b fully lie with respect to the base 31, an amount of compression of the second springs 851a and 851b may have a maximum value, and a magnitude of the restoring force provided by the second springs 851a and 851b to the sliders 860a and 860b may have a maximum value.

When the second arms 912a and 912b fully lie with respect to the base 31, an amount of compression of the springs 940a and 940b may have a maximum value, and a magnitude of the restoring force provided by the springs 940a and 940b to the pushers 930a and 930b may have a maximum value.

When the second arms 912a and 912b start to be raised with respect to the base 31, the second arms 912a and 912b may be raised by receiving the restoring force from the first springs 841a and 841b, the second springs 851a and 851b, and springs 940a and 940b. In this manner, the load applied to the motor assembly 810 may be reduced.

Referring to FIG. 58, while the second arms 912a and 912b are raised with respect to the base 31, the distance SD between the right slider 860a and the left slider 860b may gradually increase. Even when the distance SD increases, the distance LD and the distance RD may be equal to each other. That is, the right slider 860a and the left slider 860b may be disposed symmetrical to each other with respect to the symmetry axis ys of the motor assembly 810. In addition, a raised degree of the second arms 912a and 912b of the right link 910a with respect to the base 31 may be equal to a raised degree of the second arms 912a and 912b of the left link 910b with respect to the base 31.

While the second arms 912a and 912b are raised with respect to the base 31, the distance HD from the base 31 to the upper end of the display unit 20 may gradually increase. The display unit 20 may be unrolled from the panel roller 143. Alternatively, the display unit 20 may be unfolded from the panel roller 143.

When the second arms 912a and 912b are sufficiently raised with respect to the base 31, the first springs 841a and 841b may be separated from the sliders 860a and 860b. In addition, when the second arms 912a and 912b are sufficiently raised with respect to the base 31, the second springs 851a and 851b may be separated from the sliders 860a and 860b. Further, when the second arms 912a and 912b are sufficiently raised with respect to the base 31, the pushers 930a and 930b may be separated from the link brackets 951a and 951b.

Separation of the first springs 841a and 841b from the sliders 860a and 860b, separation of the second springs 851a and 851b from the sliders 860a and 860b, and separation of the pushers 930a and 930b from the link brackets 951a and 951b may be performed independently of each other. That is, a sequence of separation of the first springs 841a and 841b from the sliders 860a and 860b, separation of the second springs 851a and 851b from the sliders 860a and 860b, and separation of the pushers 930a and 930b from the link brackets 951a and 951b may vary.

An angle formed between an axis xs1 parallel to the base 31 and the second arm 912a may be referred to as theta R. Further, an angle formed between the axis xs1 parallel to the base 31 and the first arm 911a may be referred to as theta R'. The axis xs1 may be parallel to the x axis.

When the second arm 912a fully lies with respect to the base 31, or while the second arm 912a is raised with respect to the base 31, or when raising of the second arm 912a with respect to the base 31 is complete, theta R and theta R' may be maintained equal to each other.

An angle formed between an axis xs2 parallel to the base 31 and the second arm 912b may be referred to as theta L. Further, an angle formed between the axis xs2 parallel to the base 31 and the first arm 911b may be referred to as theta L'. The axis xs2 may be parallel to the x axis.

When the second arm 912b fully lies with respect to the base 31, or while the second arm 912b is raised with respect to the base 31, or when raising of the second arm 912a with respect to the base 31 is complete, theta L and theta L' may be maintained equal to each other.

The axis xs1 and the axis xs2 may be the same axis.

Referring to FIG. 59, when the second arms 912a and 912b are fully raised with respect to the base 31, the distance SD between the right slider 860a and the left slider 860b may have a maximum value. Even when the distance SD has the maximum value, the distance LD and the distance RD may be equal to each other.

When the second arms 912a and 912b are fully raised with respect to the base 31, the distance HD from the base 31 to the upper end of the display unit 20 may have a maximum value.

Figure 60:
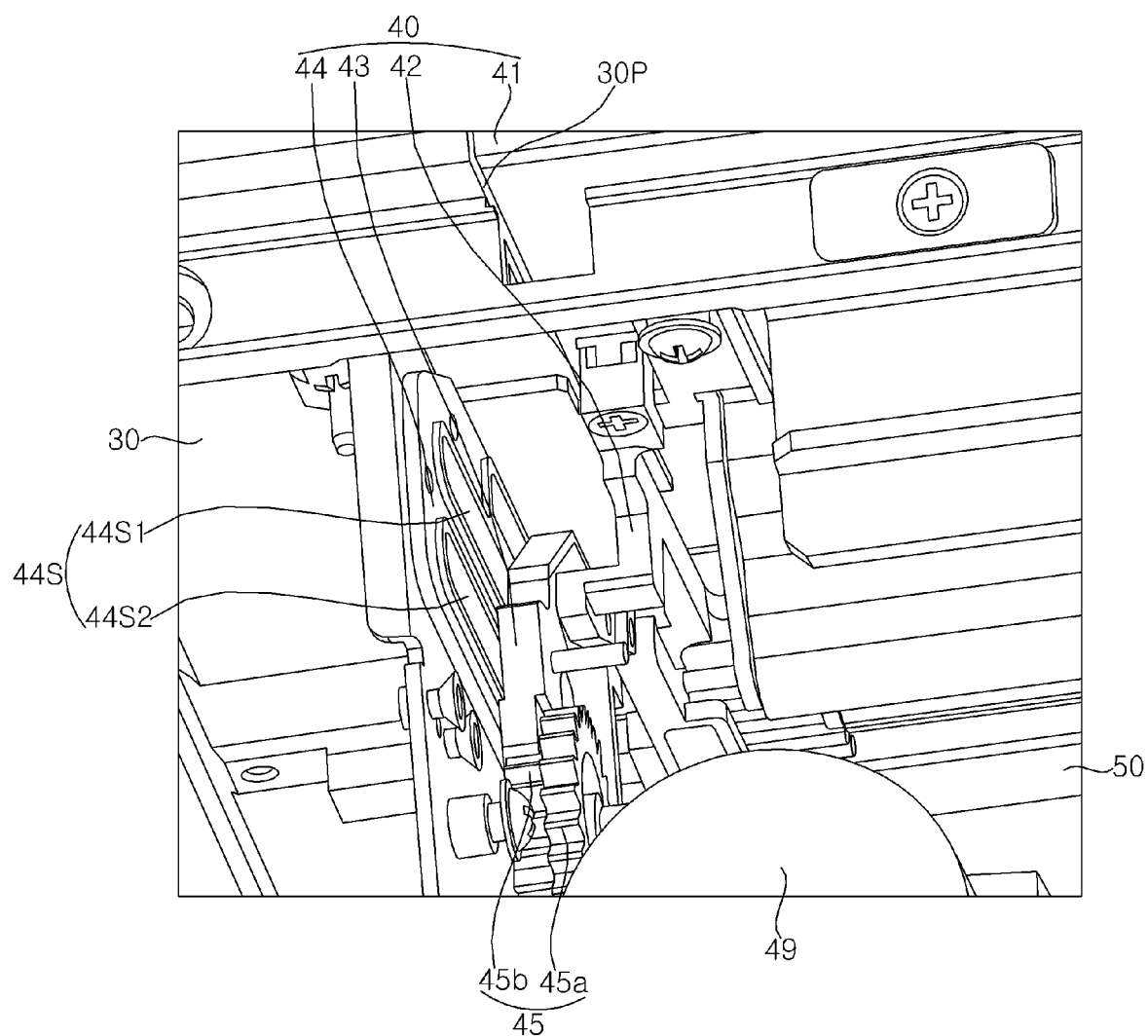
Figure 61:
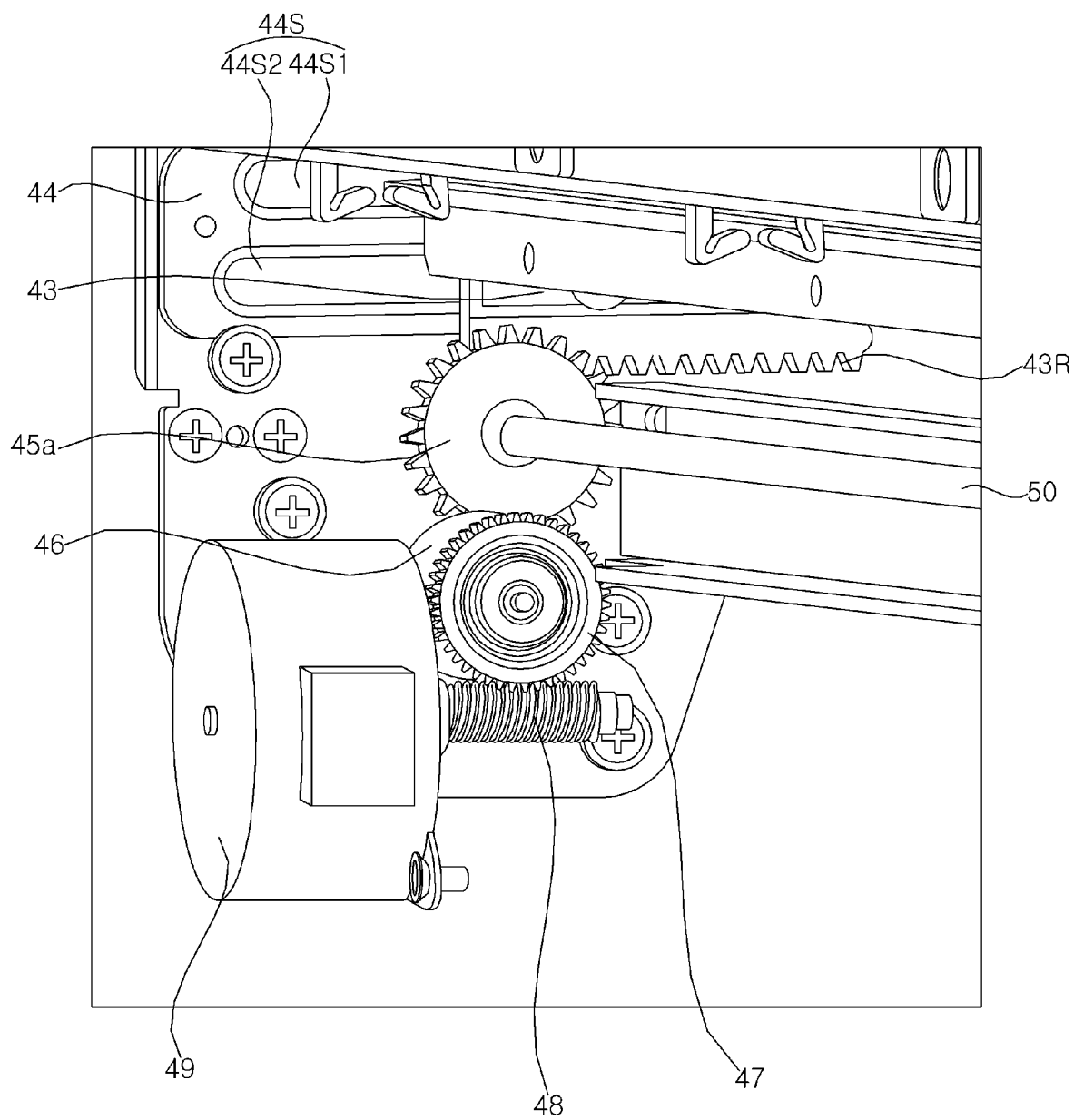

Referring to FIGS. 60 and 61, a door assembly 40 may be mounted in the housing 40 at a position adjacent to an upper plate of the housing 40. A door 41 may cover an opening 30P of the upper plate of the housing 40. The opening 30P of the upper plate of the housing 40 may be elongated in a longitudinal direction of the housing 40 on the upper plate of the housing 40. A door 41 may be an elongated plate. The door 41 may move by sliding in a forward and backward direction of the housing 30. A holder 42 may be coupled to the door 41. A first side of the holder 42 may be fixed to a lower surface of the door 41. In this case, the holder 42 may be disposed adjacent to a right end in a longitudinal direction of the door 41. The holder 42 may be referred to as a door holder 42.

The holder 42 may be coupled to a slider 43. A second side of the holder 42 may be fixed to the slider 43. The slider 43 may move on a rail 44. The rail 44 may be fixed to a lower side of the upper plate of the housing 30. The rail 44 may have slots 44S extending in the forward and backward direction of the housing 30. The slider 43 is inserted into the slots 44S and may move in an extended direction of the slots 44S. A rack gear 43R may be formed on a lower surface of the slider 43.

A shaft gear 45 may include a first gear 45a and a second gear 45b. The first gear 45b may be engaged with the rack gear 43R, and the second gear 45a may be fixed to the first gear 45b. For example, the first gear 45b and the second gear 45a may be integrally formed with each other. A shaft 50 may be inserted into the first gear 45a and the second gear 45b. The shaft 50, the first gear 45a, and the second gear 45b may rotate together.

A motor 49 may provide torque. For example, the motor 49 may provide a torque of 4 kgm. The motor 49 may be mounted in the housing 30. The motor 49 may be connected to a worm 48. When the motor 49 rotates, the worm 48 may rotate. A worm gear 47 may be engaged with the worm 48 connected to the motor 49. The worm gear 47 may be connected to a torque limiter 46. For example, the torque limiter 46 may limit a torque exceeding 2 kgm. The torque limiter 46 may be connected to the shaft gear 45. For example, the torque limiter 46 may be engaged with the second gear 45a of the shaft gear 45.

When the motor 49 rotates, the worm 48 may provide power to the worm gear 47. Accordingly, when driving of the door 41 is interrupted, it is possible to prevent damage to the mechanism and injury caused when a user's hand is caught, and the like.

Figure 62:
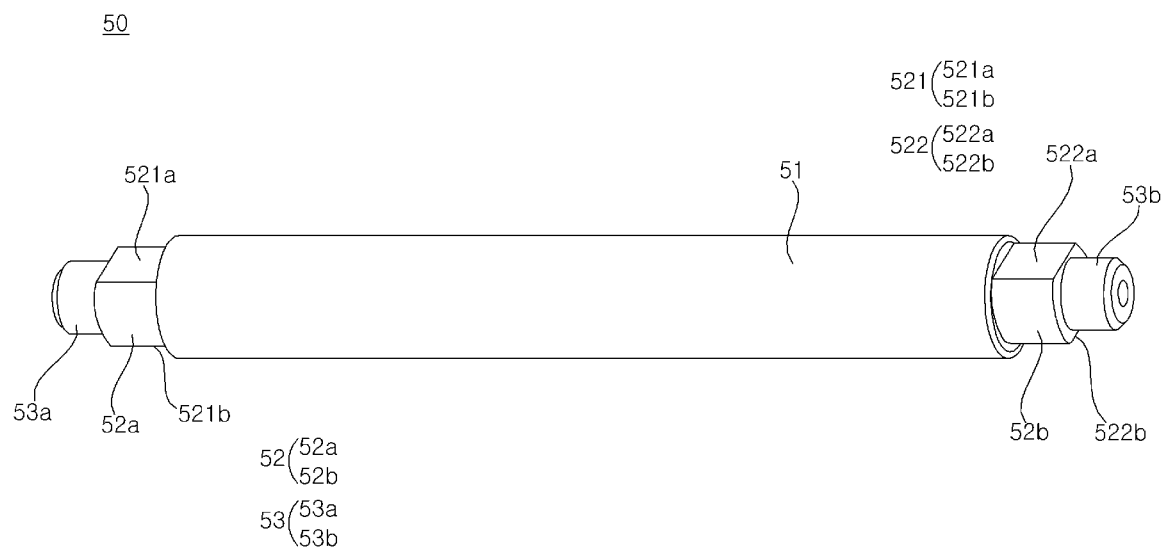

Referring to FIGS. 61 and 62, the shaft 50 may be elongated in the longitudinal direction of the housing 30 (see FIG. 1). The shaft gear 45 (see FIG. 60) may be coupled to both ends of the shaft 50. The shaft 50 may include a shaft body 51 and gear coupling parts 52 and 53. The gear coupling parts 52 and 53 may include a first part 52 and a second part 53. The first part 52 may have a smaller diameter than a diameter of the shaft body 51. The first part 52 may include fixing parts 521 and 522. The fixing parts 521 and 522 may be formed by cutting out an outer circumferential surface of the first part 52. The second part 53 may have a smaller diameter than a diameter of the first part 52.

The gear coupling parts 52 and 53 may include first gear coupling parts 52a and 52a and second gear coupling parts 52b and 53b. The first gear coupling parts 52a and 53a may be formed at a first end of the shaft body 51, and the second gear coupling parts 52b and 53b may be formed at a second end of the shaft body 51. For example, the gear coupling parts 52 and 53 may be sequentially processed. As a second end of the shaft 50 is fixed to a shelf jig, the first gear coupling parts 52a and 53a may be formed at a first end of the shaft 50. After the first gear coupling parts 52a and 53a are formed, the first end of the shaft 50 is fixed to the shelf jig, and then the second gear coupling parts 52b and 53b may be formed at the second end of the shaft 50. In this case, it may be difficult for the first gear coupling parts 52a and 53a and the second gear coupling parts 52b and 53b to have a concentric axis. In this case, vibration and noise may occur during rotation of the shaft 50.

In the case where the shaft 50 is formed as a polygonal shaft having a polygonal cross-section, a concentric axis may be provided when the aforementioned shaft 50 is formed, but there may be a problem in that when the shaft 50 rotates, the shaft 50 may be caught by a holder 60H (see FIG. 68) holding the shaft 50.

Figure 63:
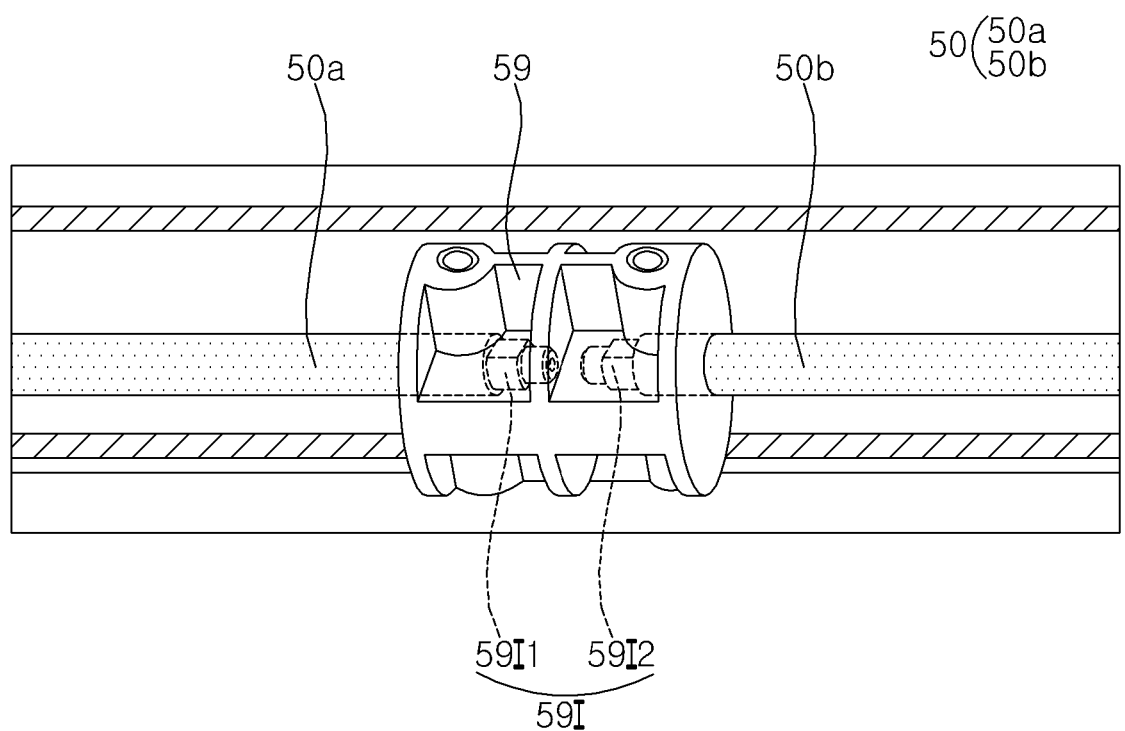

Referring to FIG. 63, if the shaft 50 is reduced in length, vibration and noise occurring during rotation of the shaft 50 may be reduced even when the gear coupling parts 52 and 53 do not have a concentric axis. The first shaft 50a may be coupled to the second shaft 50b by a joint 59. The joint 59 may include an insertion-fixing portion 591, into which the first coupling parts 52a and 53a and the second coupling parts 52b and 53b are inserted and fixed. Here, when torque applied to the shaft 50 increases, the shafts 50 run idle in the joint 59, thereby leading to a loss of power.

Figure 64:
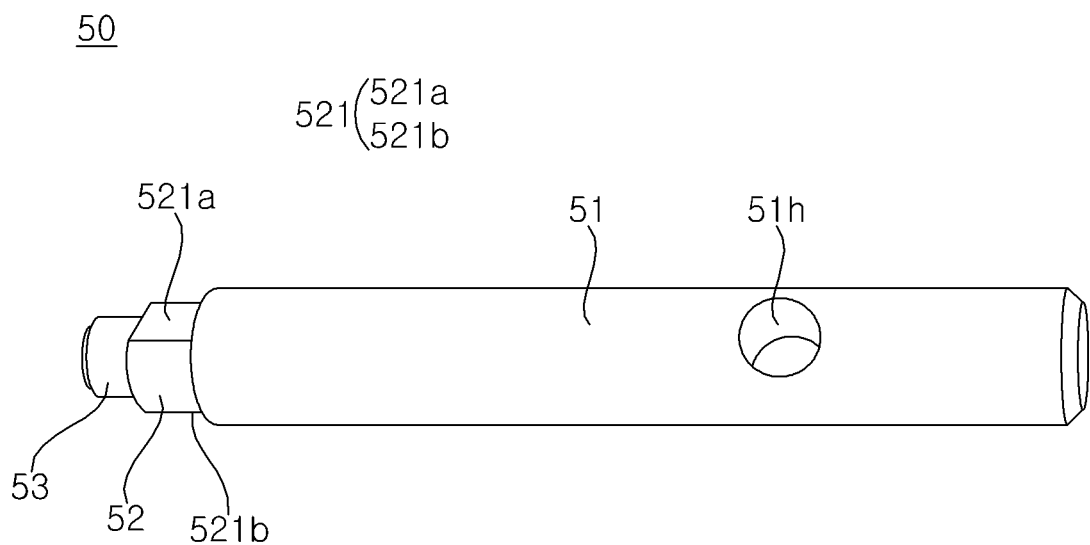

Referring to FIG. 64, the shaft 50 may include the shaft body 51, the gear coupling parts 52 and 53, and a joint hole 51h. The shaft body 51 may be an elongated bar. The gear coupling parts 52 and 53 may be formed at the first end of the shaft body 51. The gear coupling parts 52 and 53 may include the first part 52 and the second part 53. The first part 52 may have a smaller diameter than a diameter of the shaft body 51. The first part 52 may include a fixing part 521. The fixing part 521 may be formed by cutting out an outer circumferential surface of the first part 52. The fixing part 521 may include a first fixing part 521a formed by cutting out a portion of the outer circumferential surface of the first part 52, and a second fixing part 521b formed opposite to the first fixing prat 521a with respect to a central axis of the first part 52. The second part 53 may have a smaller diameter than a diameter of the first part 52.

The joint hole 51*h* may be formed at a position adjacent to the second end of the shaft body 51. The joint hole 51*h* may be formed by passing through both sides of the outer circumferential surface of the shaft body 51. The joint hole 51*h* may be formed in a direction perpendicular to a central axis of the shaft body 51.

Figure 65:
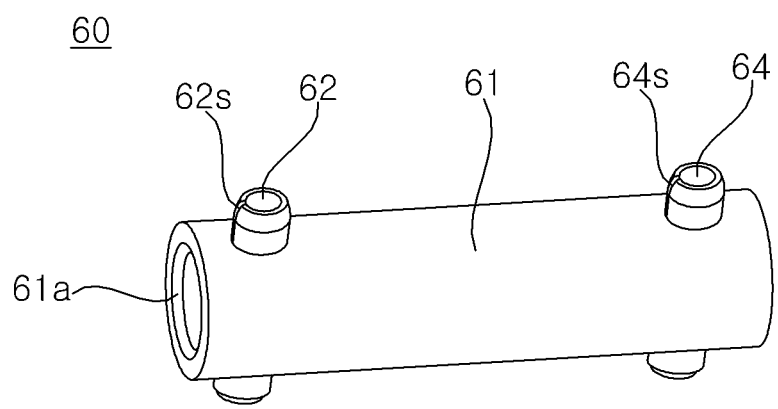
Figure 66:
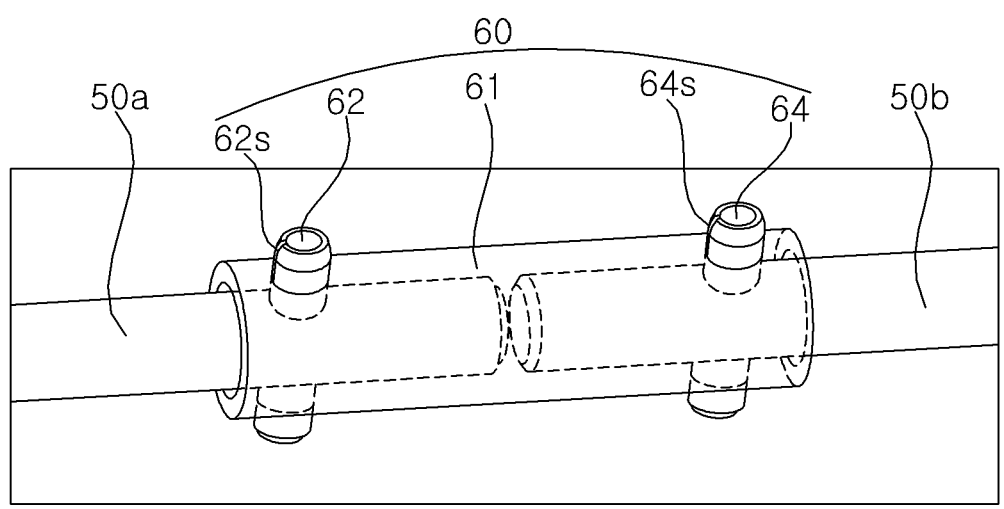

Referring to FIGS. 65 and 66, a joint 60 may include a body 61 and locking pins 62 and 64. The body 61 may have an elongated cylindrical shape. An inclined surface 61*a* may be formed between an upper surface and an inner circumferential surface at both ends of the body 61. Accordingly, the shaft 50 (see FIG. 64) may be easily inserted.

The locking pins 62 and 64 may pass through the outer and inner circumferential surfaces of the body 61 in a direction perpendicular to an axial direction of the body 61. First ends of the locking pins 62 and 64 may protrude to the outer circumferential surface on a first side of the body 61, and second ends of the locking pints 62 and 64 may protrude to the outer circumferential surface on a second side of the body 61. The first ends of the locking pins 62 and 64 may be disposed opposite to the second ends of the locking pins 62 and 64 with respect to the body 61. The locking pins 62 and 64 may have slits 62*s* and 64*s*. The slits 62*s* and 64*s* may be formed by cutting the outer and inner circumferential surfaces of the locking pins 62 and 64 in a longitudinal direction of the locking pins 62 and 64. There may be a plurality of locking pins 62 and 64. A first locking pin 62 may be disposed adjacent to a first end of the body 61, and a second locking pin 64 may be disposed adjacent to a second end of the body 61.

The first shaft 50*a* may be inserted into the joint 60 in a longitudinal direction of the joint 60. The second shaft 50*b* may be inserted into the joint 60 in the longitudinal direction of the joint 60. The first shaft 50*a* may be disposed opposite to the second shaft 50*b* with respect to the joint 60. An end surface of the first shaft 50*a* may face an end surface of the second shaft 50*b*. The joint holes 51*h* (see FIG. 64) of the shafts 50*a* and 50*b* may be aligned at positions of the locking pins 62 and 64.

Figure 67:
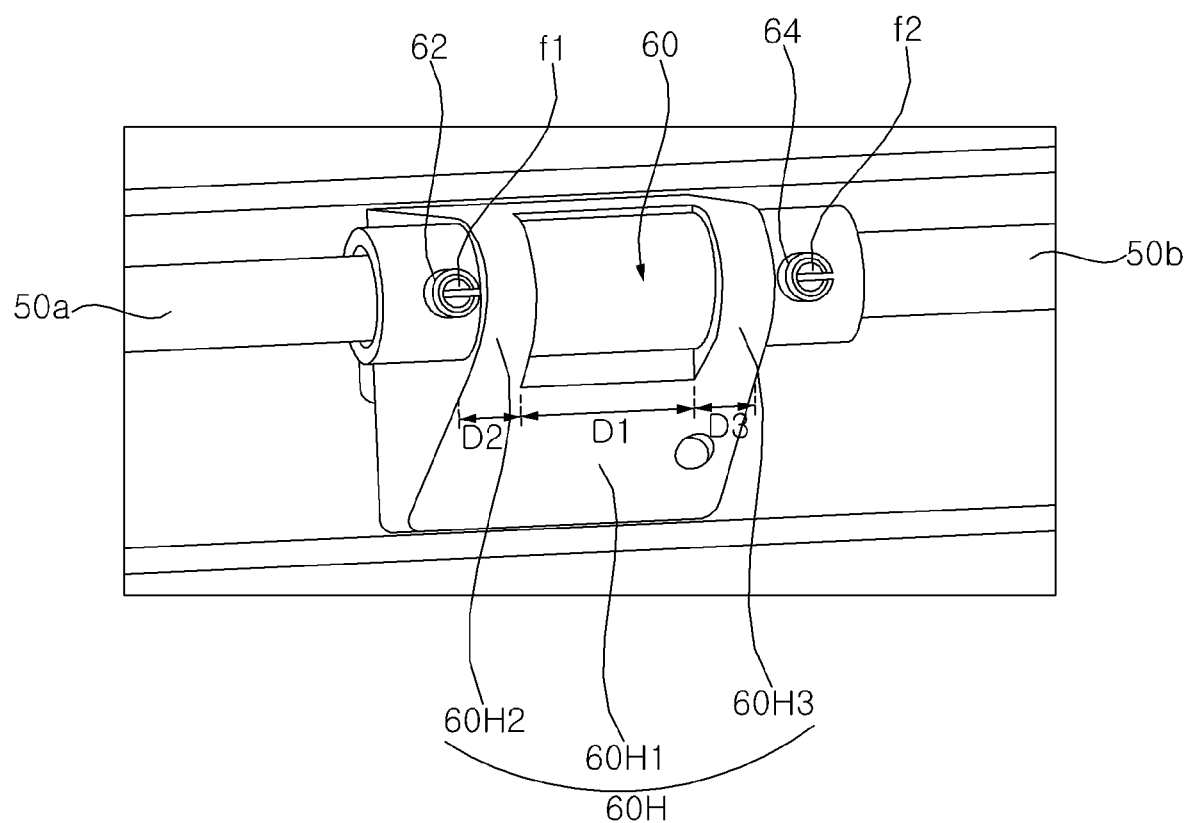

Referring to FIG. 67, press-fit pins f1 and f2 may be inserted into the locking pins 62 and 64. A diameter of the press-fit pins f1 and f2 may be greater than an inner diameter of the locking pins 62 and 64. As the press-fit pins f1 and f2 are inserted into the locking pins 62 and 64, the locking pins 62 and 64 may increase in diameter. Accordingly, the locking pins 62 and 64 may firmly fix the body 61 of the joint 60 and the shafts 50*a* and 50*b*. The joint 60 may be held in the holder 60H. The joint 60 may be rotated in the holder 60H.

The holder 60H may include a body 60H1 and hangers 60H2 and 60H3.

The hangers 60H2 and 60H3 may be formed at the body 60H1. An inner diameter of the hangers 60H2 and 60H3 may correspond to an outer diameter of the joint 60. The hangers 60H2 and 60H3 may hold the joint 60, and the joint 60 may be rotated at a position fixed by the hangers 60H2 and 60H3. A first hanger 60H2 may be formed in an arch shape on one surface of the body 60H1. A second hanger 60H3 may be formed in an arch shape on the other surface of the body 60H1. The second hanger 60H3 may be spaced apart from the first hanger 60H2 by a first distance D1. The first hanger 60H2 may have a first width D2, and the second hanger 60H3 may have a second width D3. A sum of the first width D2, the second width D3, and the first distance D1 may be smaller than a gap between the locking pins f1 and f2.

Figure 68:
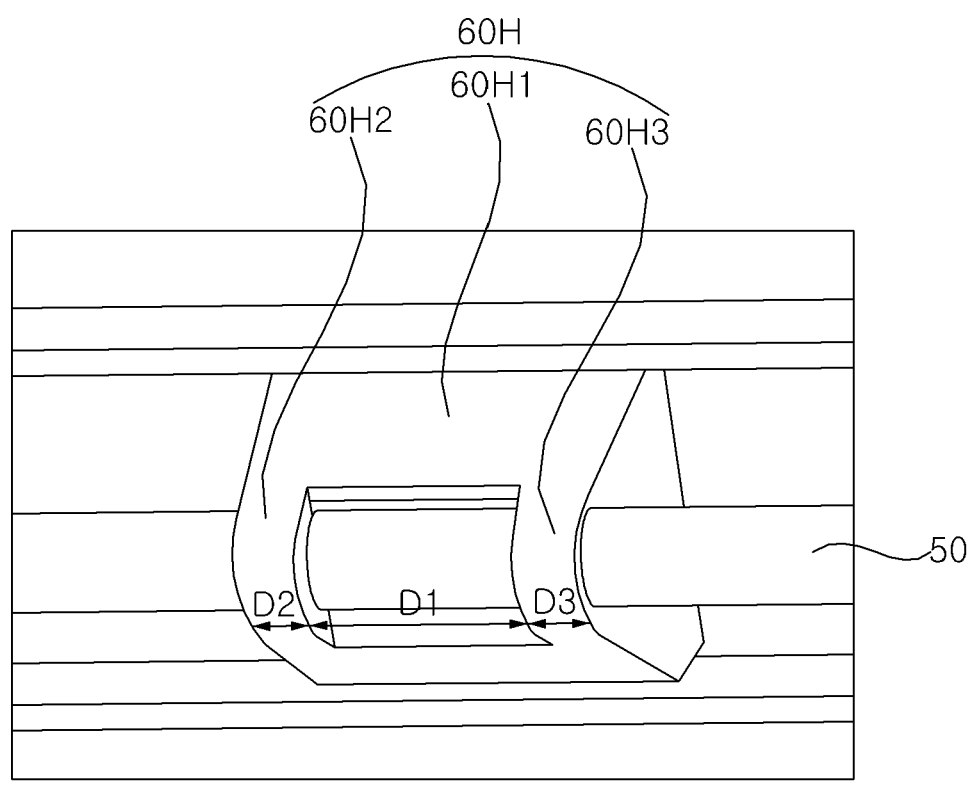

Referring to FIG. 68, the shaft 50 may be rotated in the holder 60H. The shaft 50 may be held in the holder 60H. The holder 60H may include the body 60H1 and the hangers 60H2 and 60H3. The hangers 60H2 and 60H3 may be formed at the body 60H1. An inner diameter of the hangers 60H2 and 60H3 may correspond to an outer diameter of the shaft 50. The hangers 60H2 and 60H3 may hold the shaft 50, and the shaft 50 may be rotated at a position fixed by the hangers 60H2 and 60H3. The first hanger 60H2 may be formed in an arch shape on one surface of the body 60H1. The second hanger 60H3 may be formed in an arch shape on the other surface of the body 60H1. The second hanger 60H3 may be spaced apart from the first hanger 60H2 by a first distance D1. The first hanger 60H2 may have a first width D2, and the second hanger 60H3 may have a second width D3.

Figure 69:
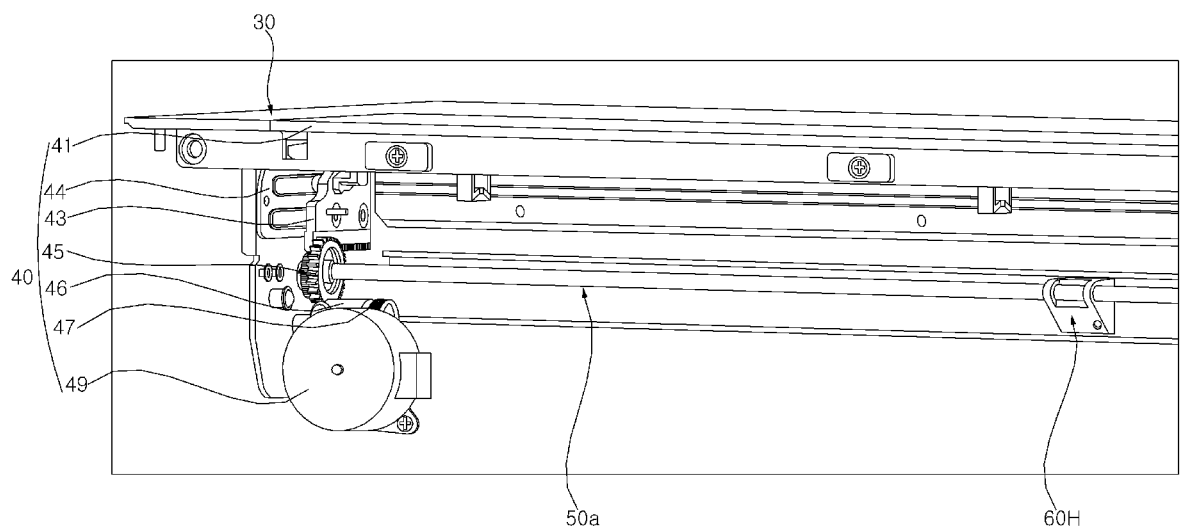
Figure 70:
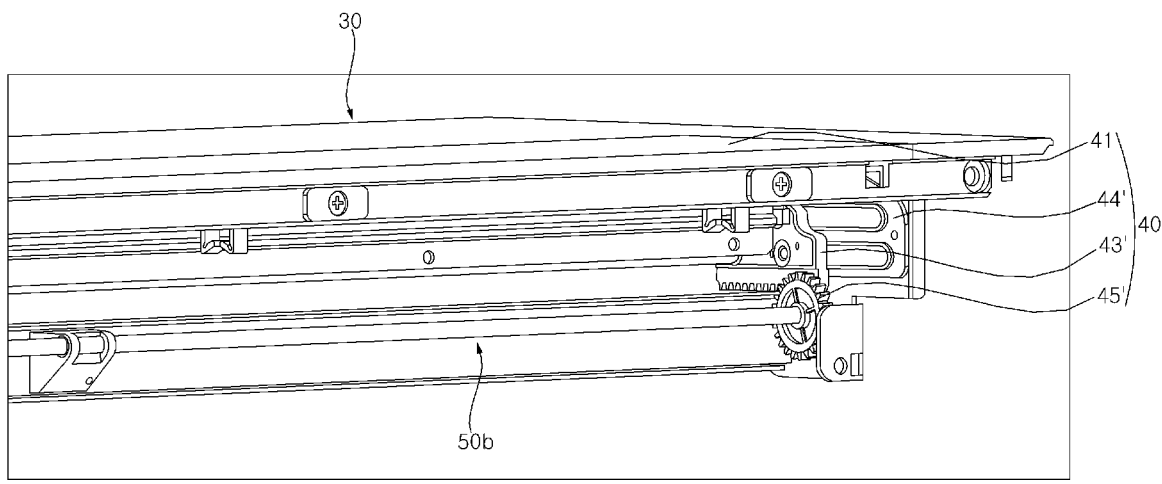

Referring to FIGS. 69 and 70, a first shaft gear 45 may be mounted adjacent to the motor 49 and may receive a driving force from the motor 49. The first shaft gear 45 may be fixed to the first shaft 50*a* to provide torque to the first shaft 50*a*. The first shaft 50*a* may be elongated in the left-to-right direction of the housing 30 and may be held by the first holder 60H.

A second shaft gear 45' may be mounted on a second side which is opposite to a first side of the housing 30 on which the motor 49 is disposed, and may be fixed to the second shaft 50*b*. The second shaft gear 45' may be rotated by the rotation of the second shaft 50*b*. The first shaft 50*a* may be connected or coupled to the second shaft 50*b* by the joint 60 (see FIGS. 65 to 67). FIG. 67 may be a diagram illustrating connection of the first shaft 50*a* and the second shaft 50*b* between FIG. 69 and FIG. 70. The shafts 50 may be two or more in number. When the number of the shafts 50 increases to n, the number of the joints 60 may increase accordingly to n−1.

The door 41 may be opened and closed in such a manner that the first shaft gear 45 moves the first slider 43 in the forward and backward direction of the housing 30, and the second shaft gear 45' moves the second slider 43' in the forward and backward direction of the housing 30.

Accordingly, the door 41 may be opened and closed as the shafts 50 rotate without being caught by the holder 60H or causing noise and/or vibration.

Figure 71:
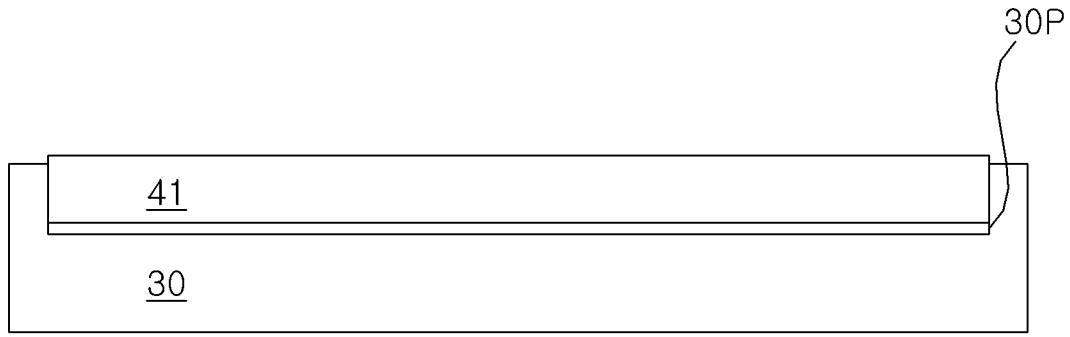
Figure 72:
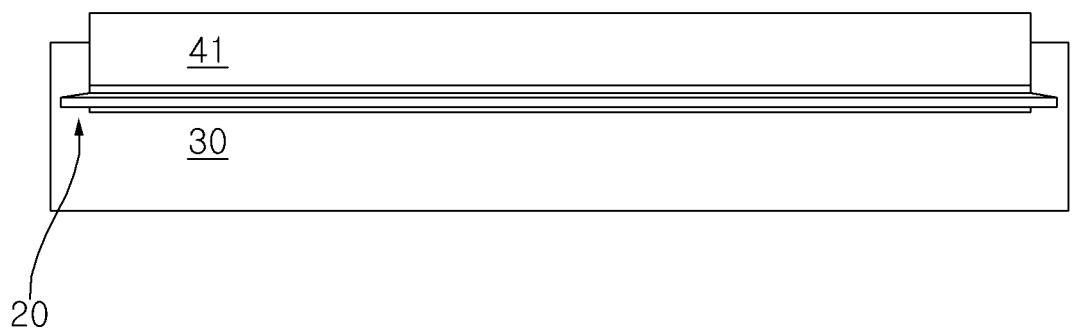

Referring to FIG. 71, an example is illustrated in which the door 41 mounted on the upper plate of the housing 30 is opened by the rotation of the shaft 50. Referring to FIG. 72, an example is illustrated in which a display unit 20P moves upward through the opening 30P of the upper plate which is opened by movement of the door 41.

According to one aspect of the present disclosure, there is provided a display device including: a flexible display panel; a roller around which the display panel is rolled or unrolled; a housing having an opening through which the display panel passes, and providing an internal accommodation space, the roller rotatably mounted in the internal accommodation space; and a door assembly mounted in the internal accommodation space at a position adjacent to the opening of the housing, and opening and closing the opening, wherein the door assembly includes: a door for opening and closing the opening; a motor for providing power to the door; a first shaft gear disposed between the motor and the door, and transmitting the power, provided by the motor, to the door; a first shaft having a first end connected to the first shaft gear, and rotating together with the first shaft gear; a joint connected to a second end of the first shaft; a second shaft having a first end connected to the joint, and rotating together with the first shaft; and a second shaft gear connected to a second end of the second shaft, and transmitting power to the door.

In addition, according to another aspect of the present disclosure, the first shaft may include: an elongated first shaft body; a first gear coupling part formed at a first end of the first shaft body, the first gear coupling part having the first shaft gear fixed thereto, and a first part having a smaller diameter than a diameter of the first shaft body, the first part having an outer circumferential surface which is partially cut out; and a first joint hole disposed adjacent to a second end of the first shaft body, and formed by passing through the first shaft body in a diametral direction of the first shaft body.

In addition, according to another aspect of the present disclosure, the joint may include: a body which has an elongated cylindrical shape, and into which another side of the first shaft body is inserted; a first locking pin having an elongated cylindrical shape, and passing through the body in a diametral direction of the body at a position corresponding to the first joint hole; and a first press-fit pin inserted into the first locking pin and the first joint hole.

In addition, according to another aspect of the present disclosure, the first locking pin may further include slits formed in a longitudinal direction of the first locking pin, wherein a gap between the slits of the first locking pin increases when the first press-fit pin may be inserted.

In addition, according to another aspect of the present disclosure, the second shaft may include: an elongated second shaft body; a second gear coupling part formed at a second end of the second shaft body, the second gear coupling part having the second shaft gear fixed thereto, and a second part having a smaller diameter than a diameter of the second shaft body, the second part having an outer circumferential surface which is partially cut out; and a second joint hole disposed adjacent to a first end of the second shaft body, and formed by passing through the second shaft body in a diametral direction of the second shaft body.

In addition, according to another aspect of the present disclosure, the joint may include: a second locking pin having an elongated cylindrical shape and passing through the body of the joint in the diametral direction of the body at a position corresponding to the second joint hole of the second shaft inserted into the body of the joint; and a second press-fit pin inserted into the second locking pin and the second joint hole.

In addition, according to another aspect of the present disclosure, the second locking pin may further include slits formed in a longitudinal direction of the second locking pin, wherein a gap between the slits of the second locking pin increases when the second press-fit pin is inserted.

In addition, according to another aspect of the present disclosure, there is further included a holder which is fixed to an inside of the housing, and in which the joint is held, wherein the holder may include: a body; and hangers surrounding the joint so that the joint may be rotated in the body of the holder.

In addition, according to another aspect of the present disclosure, the hangers may be formed between the first locking pin and the second locking pin.

In addition, according to another aspect of the present disclosure, the door assembly may further include: a door holder fixed to a lower side of the door; a slider coupled to the door holder and moving in a forward and rearward direction of the housing; and a rack gear formed on the slider in the forward and rearward direction of the housing, wherein the first shaft gear may be engaged with the rack gear.

In addition, according to another aspect of the present disclosure, the door assembly may further include: a worm fixed to a rotating shaft of the motor; a worm gear engaged with the worm; and a torque limiter engaged with the first shaft gear and the work gear.

In addition, according to another aspect of the present disclosure, when the door opens an opening of the housing, the display panel may be unrolled from the roller by moving out of the housing through the opening, and when the display panel is rolled on the roller to move into the housing, the door may close the opening of the housing.

In addition, according to another aspect of the present disclosure, the roller and the housing may be elongated in a longitudinal direction of a bottom side of the display panel, wherein the first shaft and the second shaft may be elongated in the longitudinal direction of the housing and may be disposed in series, and the joint may be disposed between the first shaft and the second shaft.

In addition, according to another aspect of the present disclosure, the motor may be disposed adjacent to a left side or a right side of the display panel.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a flexible display panel;
   a roller on or from which the flexible display panel is rollable or unrollable;
   a housing having an opening through which the flexible display panel is able to pass, and providing an internal accommodation space, wherein the roller is rotatably mounted in the internal accommodation space; and
   a door assembly mounted in the internal accommodation space at a position adjacent to the opening of the housing, and configured to open and close the opening,
   wherein the door assembly comprises:
   a door configured to open and close the opening;
   a motor configured to provide power to the door;
   a first shaft gear disposed between the motor and the door, and configured to deliver the power, provided by the motor, to the door;
   a first shaft having a first end coupled to the first shaft gear, and configured to rotate together with the first shaft gear;
   a joint coupled to a second end of the first shaft;

a second shaft having a first end coupled to the joint, and configured to rotate together with the first shaft; and a second shaft gear coupled to a second end of the second shaft, and configured to deliver the power to the door.

2. The display device of claim 1, wherein the first shaft comprises:

a first shaft body that is elongated;

a first gear coupling portion at a first end of the first shaft body, to which the first shaft gear is fixed, the first gear coupling portion including a first portion having a diameter smaller than a diameter of the first shaft body, the first portion further having an outer circumferential surface which is partially cut out; and a first joint hole disposed adjacent to a second end of the first shaft body, and passing through the first shaft body along a diametral direction of the first shaft body.

3. The display device of claim 2, wherein the joint comprises:

a body which has an elongated cylindrical shape, and into which a side of the first shaft body is inserted;

a first locking pin having an elongated cylindrical shape, and passing through the body along a diametral direction of the body at a position corresponding to the first joint hole; and a first press-fit pin inserted into the first locking pin and the first joint hole.

4. The display device of claim 3, wherein the first locking pin further has slits extending along a longitudinal direction of the first locking pin, and wherein a gap between the slits of the first locking pin increases when the first press-fit pin is inserted into the first locking pin.

5. The display device of claim 4, wherein the second shaft comprises:

a second shaft body that is elongated;

a second gear coupling portion at a second end of the second shaft body, to which the second shaft gear is fixed, the second gear coupling portion including a second portion having a diameter smaller than a diameter of the second shaft body, the second portion further having an outer circumferential surface which is partially cut out; and a second joint hole disposed adjacent to a first end of the second shaft body, and passing through the second shaft body along a diametral direction of the second shaft body.

6. The display device of claim 5, wherein the joint further comprises:

a second locking pin having an elongated cylindrical shape and passing through the body of the joint along the diametral direction of the body at a position corresponding to the second joint hole of the second shaft inserted into the body of the joint; and a second press-fit pin inserted into the second locking pin and the second joint hole.

7. The display device of claim 6, wherein the second locking pin further has slits extending along a longitudinal direction of the second locking pin, and wherein a gap between the slits of the second locking pin increases when the second press-fit pin is inserted into the second locking pin.

8. The display device of claim 7, further comprising a holder which is fixed to an inside of the housing, and configured to hold the joint, wherein the holder comprises:

a body; and hangers surrounding the joint so that the joint is rotatable in the body of the holder.

9. The display device of claim 8, wherein the hangers are located between the first locking pin and the second locking pin.

10. The display device of claim 1, wherein the door assembly further comprises:

a door holder fixed to a lower side of the door;

a slider coupled to the door holder and configured to move along a forward direction or a rearward direction of the housing; and a rack gear located on the slider to extend along the forward direction and the rearward direction of the housing, wherein the first shaft gear is configured to engage with the rack gear.

11. The display device of claim 10, wherein the door assembly further comprises:

a worm fixed to a rotatable shaft of the motor;

a worm gear configured to engage with the worm; and a torque limiter configured to engage with the first shaft gear and the worm gear.

12. The display device of claim 11, wherein:

when the door opens the opening of the housing, the flexible display panel is unrolled from the roller by moving out of the housing through the opening; and when the flexible display panel is rolled on the roller to move into the housing, the door closes the opening of the housing.

13. The display device of claim 12, wherein:

the roller and the housing are elongated along a longitudinal direction of a bottom side of the display panel;

the first shaft and the second shaft are elongated along the longitudinal direction of the housing and are disposed such that an end of the first shaft is adjacent to an end of the second shaft; and the joint is disposed between the first shaft and the second shaft.

14. The display device of claim 13, wherein the motor is disposed adjacent to a left side or a right side of the flexible display panel.

* * * * *